US011391358B2

(12) United States Patent
Segawa et al.

(10) Patent No.: US 11,391,358 B2
(45) Date of Patent: Jul. 19, 2022

(54) WORM GEAR REDUCER

(71) Applicant: NSK LTD., Tokyo (JP)

(72) Inventors: Toru Segawa, Maebashi (JP); Toru Ishii, Maebashi (JP); Souta Matsumoto, Maebashi (JP)

(73) Assignee: NSK LTD., Tokyo (JP)

( * ) Notice: Subject to any disclaimer, the term of this patent is extended or adjusted under 35 U.S.C. 154(b) by 773 days.

(21) Appl. No.: 16/318,575

(22) PCT Filed: Jul. 18, 2017

(86) PCT No.: PCT/JP2017/025983
§ 371 (c)(1),
(2) Date: Jan. 17, 2019

(87) PCT Pub. No.: WO2018/016493
PCT Pub. Date: Jan. 25, 2018

(65) Prior Publication Data
US 2019/0285157 A1    Sep. 19, 2019

(30) Foreign Application Priority Data

Jul. 19, 2016  (JP) .............................. JP2016-141370
Aug. 12, 2016  (JP) .............................. JP2016-158373
May 9, 2017  (JP) .............................. JP2017-092969

(51) Int. Cl.
| F16H 1/16 | (2006.01) |
| F16H 55/22 | (2006.01) |
| F16C 27/06 | (2006.01) |
| F16C 35/077 | (2006.01) |
| B62D 5/04 | (2006.01) |
| F16F 1/14 | (2006.01) |
| F16H 57/021 | (2012.01) |

(52) U.S. Cl.
CPC .......... *F16H 55/22* (2013.01); *F16C 27/066* (2013.01); *F16C 35/077* (2013.01); *F16H 1/16* (2013.01);
(Continued)

(58) Field of Classification Search
CPC ...... F16H 1/16; F16H 57/12; F16H 2057/126; F16H 2057/127; B62D 5/0409
(Continued)

(56) References Cited

U.S. PATENT DOCUMENTS 6,269,709 B1 *  8/2001  Sangret ..................... F16H 1/16
                                                           74/400
9,080,646 B2 *  7/2015  Fuechsel .................. F16H 1/16
(Continued)

FOREIGN PATENT DOCUMENTS

JP    2002-154443 A    5/2002
JP    2008-174024 A    7/2008
(Continued)

OTHER PUBLICATIONS

International Search Report (PCT/ISA/210) dated Sep. 19, 2017 issued by the International Searching Authority in International Application No. PCT/JP2017/025983.
(Continued)

*Primary Examiner* — William C Joyce
(74) *Attorney, Agent, or Firm* — Sughrue Mion, PLLC

(57) ABSTRACT

A worm reduction gear, including: an inner diameter side holder in which a bearing is internally fitted and held; an outer diameter side holder which includes a holder holding part in which the inner diameter side holder is internally fitted and held so as to be able to be relatively rotated and moved and to be displaced in a direction orthogonal to a center axis of a worm wheel and a center axis of a worm, and which is internally fitted and held in a holding recessed part of a housing; and an elastic urging member in a circumferential direction which elastically urges the inner diameter side holder against the outer diameter side holder in a direction of rotating in the circumferential direction.

10 Claims, 37 Drawing Sheets

(52) U.S. Cl.
CPC ........ *B62D 5/0409* (2013.01); *F16C 2326/24* (2013.01); *F16C 2361/61* (2013.01); *F16C 2380/27* (2013.01); *F16F 1/14* (2013.01); *F16H 2057/0213* (2013.01)

(58) Field of Classification Search
USPC .................................................. 74/409, 440
See application file for complete search history.

(56) References Cited

U.S. PATENT DOCUMENTS

| | | | | |
|---|---|---|---|---|
| 9,097,333 | B2* | 8/2015 | Boussaguet | ........... F16H 57/021 |
| 2013/0291671 | A1* | 11/2013 | Boussaguet | ............. F16H 57/12 |
| | | | | 74/409 |

| | | |
|---|---|---|
| 2017/0144695 | A1 | 5/2017 Segawa |
| 2017/0210412 | A1 | 7/2017 Segawa |

FOREIGN PATENT DOCUMENTS

| | | |
|---|---|---|
| JP | 4381024 B2 | 12/2009 |
| WO | 2016/038927 A1 | 3/2016 |
| WO | 2016/047189 A1 | 3/2016 |

OTHER PUBLICATIONS

Written Opinion (PCT/ISA/237) dated Sep. 19, 2017 issued by the International Searching Authority in International Application No. PCT/JP2017/025983.

* cited by examiner

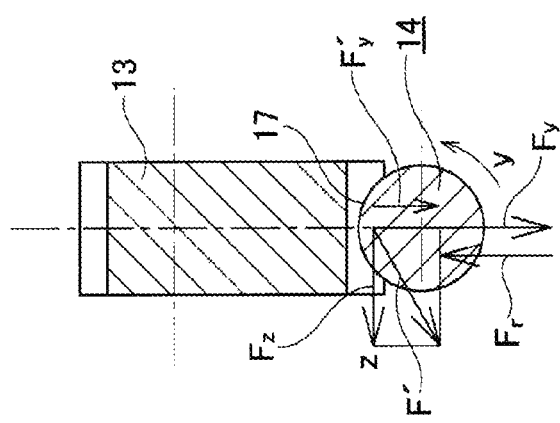
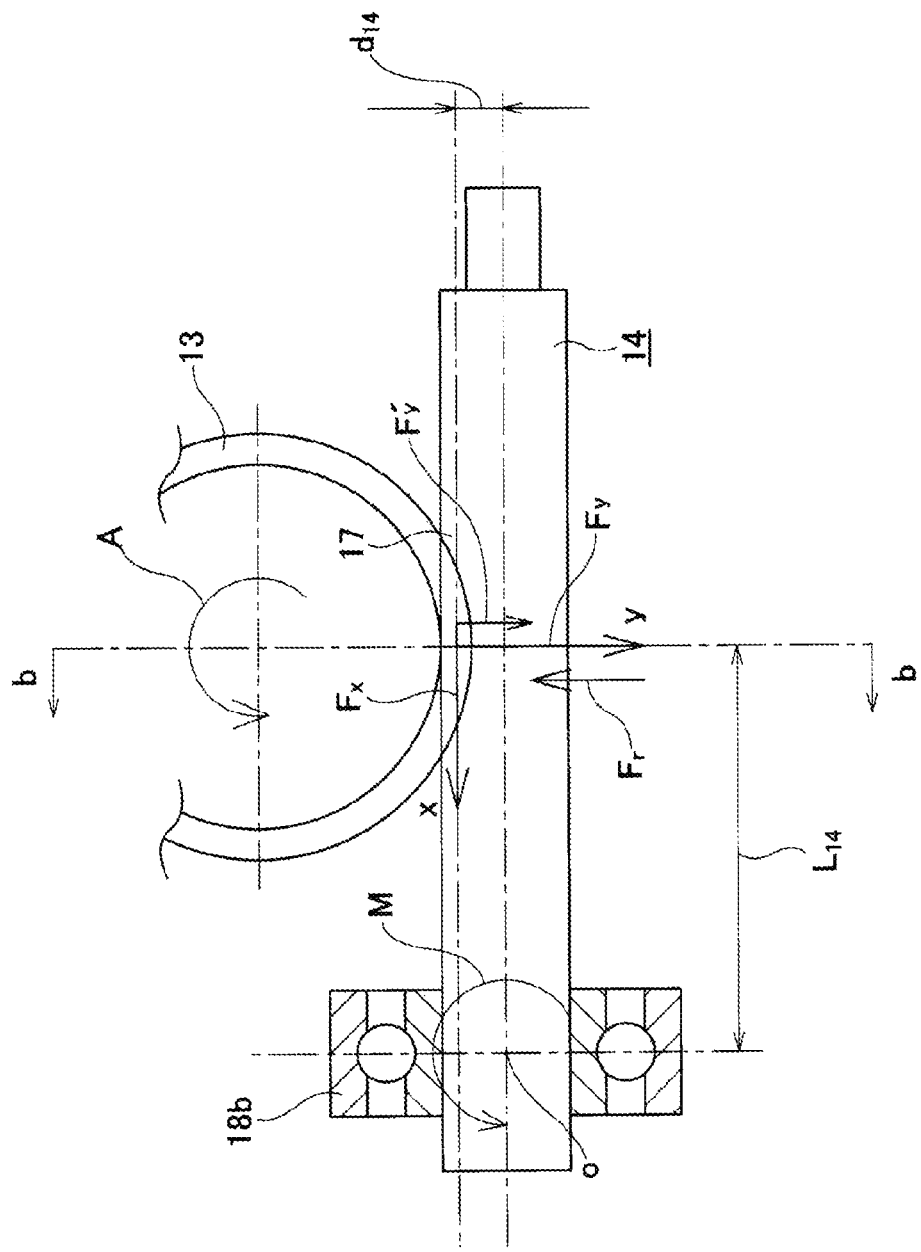

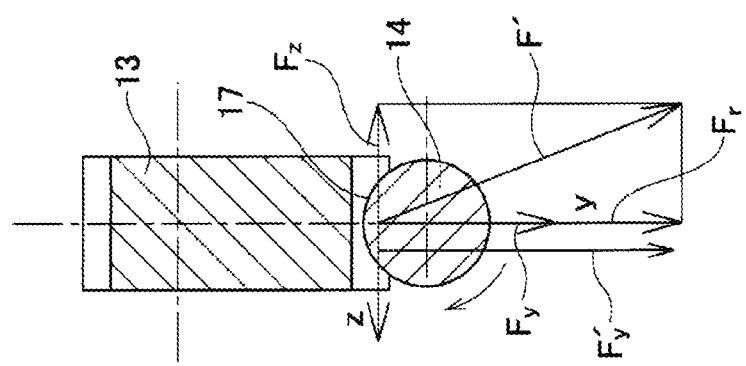
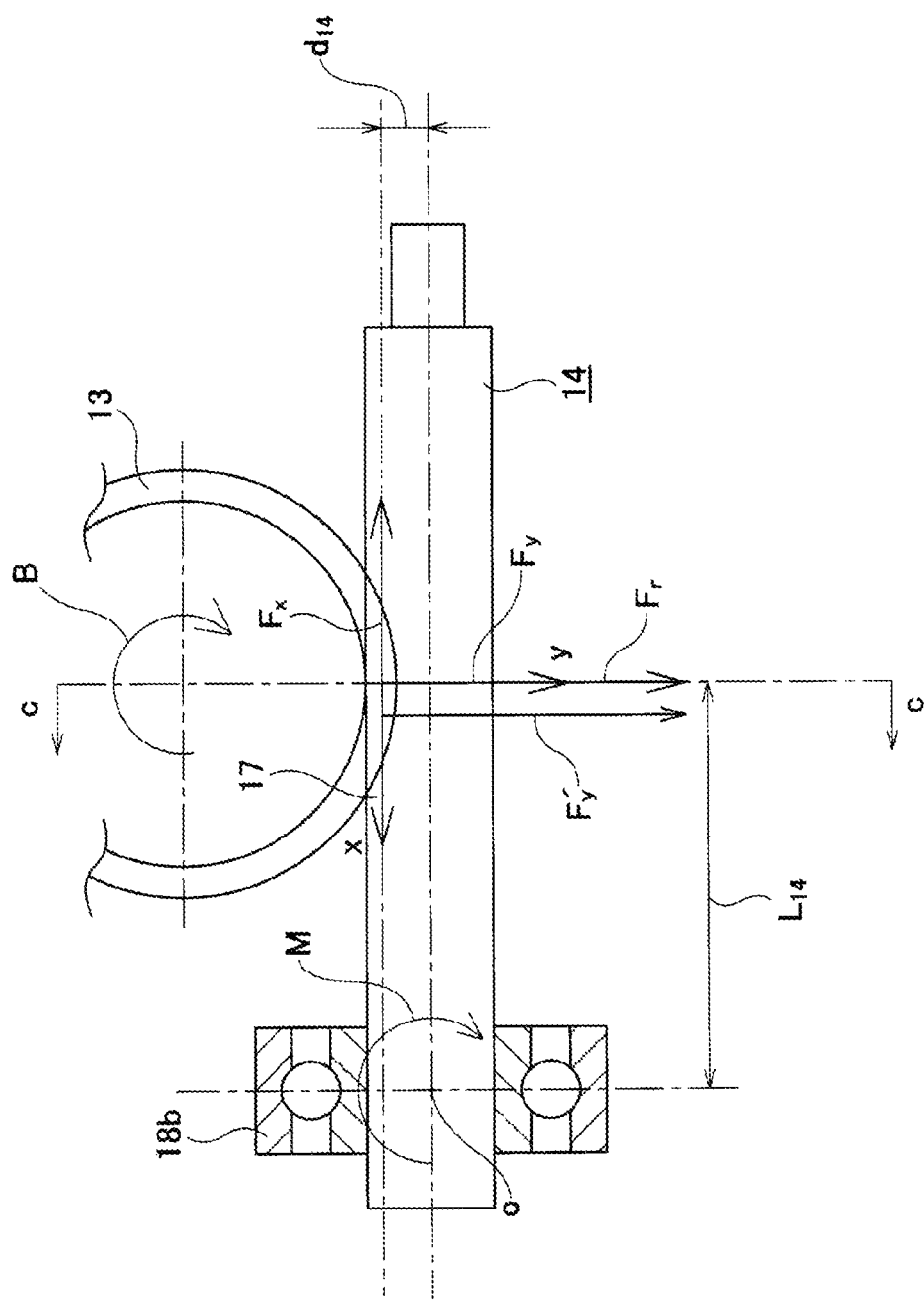
FIG. 13A
FIG. 13B

WORM GEAR REDUCER

TECHNICAL FIELD

The present invention relates to a worm reduction gear, for example, incorporated in an electric power steering apparatus.

BACKGROUND ART

FIG. 39 illustrates one example of a structure of a related art of a steering apparatus for an automobile. Rotation of a steering wheel 1 is transmitted to an input shaft 3 of a steering gear unit 2, and a pair of left-and-right tie rods 4 are pushed and pulled in accordance with the rotation of the input shaft 3, whereby a steering angle is imparted to a front wheel. The steering wheel 1 is supported and fixed at a rear end part of a steering shaft 5, and the steering shaft 5 is rotatably supported at a steering column 6 in a state of being inserted into the cylindrical steering column 6 in an axial direction. A front end part of the steering shaft 5 is connected to a rear end part of an intermediate shaft 8 through a universal joint 7, and a front end part of the intermediate shaft 8 is connected to the input shaft 3 through another universal joint 9.

In an example shown in the drawing, an electric power steering apparatus is incorporated for reducing a force required for operating the steering wheel 1 using an electric motor 10 as an auxiliary power source. A reduction gear is incorporated in the electric power steering apparatus, and as the reduction gear, a worm reduction gear having a large lead angle and reversibility with a respect to a power transmission direction is generally used. FIG. 40 illustrates one example of a structure of a related art of a worm reduction gear described in Japanese Patent No. 4381024. The worm reduction gear 11 is provided with a housing 12, a worm wheel 13, and a worm 14.

The housing 12 is supported and fixed with respect to the electric motor 10, and includes a wheel housing part 15 and a worm housing part 16 which exists at a position twisted with respect to the wheel housing part 15 and in which an intermediate part in the axial direction is opened in the wheel housing part 15. The worm wheel 13 has wheel teeth 48 on an outer circumferential surface, and is supported and fixed coaxially with the steering shaft 5 at a portion near a front end of the steering shaft 5 (refer to FIG. 39), which is a driven shaft rotatably supported inside the wheel housing part 15.

The worm 14 has worm teeth 17 meshed with the wheel teeth 48 on an outer circumferential surface of the intermediate part in the axial direction. In the worm 14, two positions in the axial direction sandwiching the worm teeth 17 are rotatably supported on the inside of the worm housing part 16 by a pair of rolling bearings 18a and 18b such as a deep groove type ball bearing. Out of the pair of rolling bearings 18a and 18b, an outer ring of the rolling bearing 18a on the tip side of the worm 14 is press-fitted into a holder 19 that is internally fitted to the inner side of a portion near a deep end of the worm housing part 16 with interference fitting. Further, an inner ring of the rolling bearing 18a on the tip side of the worm 14 is externally fitted to a large diameter part 20 provided at a portion separated from the worm teeth 17 at a portion near the tip of the worm 14 through a bush 21 constituted of an elastic material. On the other hand, an outer ring of the rolling bearing 18b on the base end side of the worm 14 is press-fitted into an opening part of the worm housing part 16, and an inner ring of the rolling bearing 18b on the base end side of the worm 14 is externally fitted to a base end part of the worm 14 with clearance fitting. In the worm 14, an output shaft of the electric motor 10, which is a driving shaft, is connected to the base end part (a left end part in FIG. 40). That is, the worm 14 can be rotatably driven by the electric motor 10.

In a worm reduction gear 11 of the related art, there exists an inevitable backlash exists in a meshing part between the wheel teeth 48 and the worm teeth 17 based upon a dimensional error, an assembly error, and the like of respective members constituting the worm reduction gear 11. When a rotating direction of the steering shaft 5 is changed based upon existence of the backlash, a harsh teeth striking sound may be generated at the meshing part. On the other hand, in an example illustrated in the drawings, a minute gap is provided between an inner circumferential surface of the inner ring of the rolling bearing 18b on the base end side and an outer circumferential surface of the base end part of the worm 14, and the base end part of the worm 14 is supported with respect to the worm housing part 16 so as to be able to be slightly shaken and displaced. A minute gap is provided between an outer circumferential surface of the large diameter part 20 provided at the portion near the tip of the worm 14 and an inner circumferential surface of the bush 21. A preload pad 22 constituted of a synthetic resin is externally fitted to the tip part of the worm 14 by the interference fitting, and a torsion coil spring 23 is provided between the preload pad 22 and the holder 19. The tip part of the worm 14 is elastically pressed against a side of the worm wheel 13 (an upper side in FIG. 40) in a direction (an up-and-down direction in FIG. 40) orthogonal to a center axis of the worm wheel 13 and a center axis of the worm 14 through the preload pad 22 by the torsion coil spring 23. As a result, the backlash between the wheel teeth 48 and the worm teeth 17 is suppressed, and thus occurrence of the teeth striking sound is suppressed. However, there exists room for improvement from a viewpoint of more effectively suppressing generation of the teeth striking sound at the meshing part between the worm teeth 17 and the wheel teeth 48.

RELATED ART REFERENCE

Patent Document

Patent Document 1: Japanese Patent No. 4381024

SUMMARY OF THE INVENTION

Problems to be Solved by the Invention

In consideration of the above-mentioned circumstances, the present invention has been made in an effort to provide a structure capable of more effectively suppressing generation of a teeth striking sound at a meshing part between wheel teeth and worm teeth.

Means for Solving the Problems

A worm reduction gear of the present invention may include a housing, a worm wheel, a worm, a bearing, an inner diameter side holder, an outer diameter side holder, and an elastic urging member in a circumferential direction.

The housing may include a holding recessed part on an inner circumferential surface.

The worm wheel may include wheel teeth on an outer circumferential surface.

The worm may include worm teeth meshed with the wheel teeth on an outer circumferential surface.

The bearing may be externally fitted to a tip part of the worm.

The inner diameter side holder may include a bearing holding part in which the bearing is internally fitted and held.

The outer diameter side holder may include a holder holding part and may be internally fitted and held in the holding recessed part. The holder holding part may internally fit and hold the inner diameter side holder so as to be able to be relatively rotated and moved and to be displaced in a direction orthogonal to a center axis of the worm wheel and a center axis of the worm.

The elastic urging member in the circumferential direction may be configured to elastically urge the inner diameter side holder against the outer diameter side holder in a direction of rotating in the other circumferential direction.

Further, when the inner diameter side holder rotates in the circumferential direction with respect to the outer diameter side holder, an outer circumferential surface of the inner diameter side holder and an inner circumferential surface of the outer diameter side holder may be formed so that the bearing may be displaced in the direction orthogonal to the center axis of the worm wheel and the center axis of the worm.

Further, the worm reduction gear of the present invention may include a housing, a worm wheel, a worm, a bearing, an inner diameter side holder, an outer diameter side holder, and an elastic urging member in a circumferential direction.

The housing may include a holding recessed part on an inner circumferential surface.

The worm wheel may include wheel teeth on an outer circumferential surface.

The worm may include worm teeth meshed with the wheel teeth on an outer circumferential surface.

The bearing may be externally fitted to a tip part of the worm.

The inner diameter side holder may include a bearing holding part and an inner diameter side curved surface. The bearing holding part may internally fit and hold the bearing. The inner diameter side curved surface part, an outer diameter of which becomes larger as moving toward one circumferential, may be provided at a portion positioned at a side far from a meshing part between the wheel teeth and the worm teeth in a direction orthogonal to a center axis of the worm wheel and a center axis of the worm direction among outer circumferential surfaces of the inner diameter side holder.

The outer diameter side holder may include a holder holing part and an outer diameter side curved surface part, and may be internally fitted and held in the holding recessed part. The holder holding part may internally fit and hold the inner diameter side holder so as to be able to be relatively rotated and moved and to be displaced in the direction orthogonal to the center axis of the worm wheel and the center axis of the worm. The outer diameter side curved surface part may be provided at a portion opposite to the inner diameter side curved surface part among inner circumferential surfaces of the holder holding part, and may come into contact with the inner diameter side curved surface part when the inner diameter side holder rotates in a circumferential direction with respect to the holder holding part.

The elastic urging member in the circumferential direction may be configured to elastically urge the inner diameter side holder against the outer diameter side holder in a direction of rotating in the other circumferential direction.

Further, the worm reduction gear of the present invention may include a housing, a worm wheel, a worm, a bearing, an inner diameter side holder, an outer diameter side holder, an elastic urging member in a circumferential direction.

The housing may include a holding recessed part on an inner circumferential surface.

The worm wheel may include wheel teeth on an outer circumferential surface.

The worm may include worm teeth meshed with the wheel teeth on an outer circumferential surface.

The bearing may be externally fitted to a tip part of the worm.

The inner diameter side holder may include a bearing holding part and an inner diameter side curved surface. The bearing holding part may internally fit and hold the bearing. The inner diameter side curved surface part, an outer diameter of which becomes larger as moving toward one circumferential direction, may be provided at a portion positioned at a side far from a meshing part between the wheel teeth and the worm teeth, in a direction orthogonal to a center axis of the worm wheel and a center axis of the worm among outer circumferential surfaces of the inner diameter side holder.

The outer diameter side holder may include a holder holing part and an outer diameter side curved surface part, and may be internally fitted and held in the holding recessed part. The holder holding part may internally fit and hold the inner diameter side holder so as to be able to be shaken centering on the center axis of the worm and to be displaced in the direction orthogonal to the center axis of the worm wheel and the center axis of the worm. The outer diameter side curved surface part may be provided at a portion opposite to the inner diameter side curved surface part among inner circumferential surfaces of the holder holding part, and an inner diameter thereof may become larger as moving toward one circumferential direction, and curvature of the inner diameter may be smaller than curvature of the outer diameter of the inner diameter side curved surface part.

The elastic urging member in the circumferential direction may be configured to elastically urge the inner diameter side holder against the outer diameter side holder in a direction of rotating in the other circumferential direction.

Further, as the bearing, for example, a rolling bearing provided with an outer ring having an outer ring raceway on the inner circumferential surface, an inner ring having an inner ring raceway on the outer circumferential surface, and a rolling element disposed freely to roll between the outer ring raceway and inner ring raceway may be used. When the rolling bearing is used as the bearing, more specifically, a radial ball bearing, a radial roller bearing, a radial tapered roller bearing, and the like may be used. Alternatively, a sliding bearing may be used as the bearing.

According to the embodiment of the present invention, for example, the inner circumferential surface of the holder holding part and the outer circumferential surface of the inner diameter side holder may include an abutting part between the inner diameter side curved surface part and the outer diameter side curved surface and the other abutting part provided on a side opposite to the abutting part with respect to a side far from the meshing part between the wheel teeth and the worm teeth and a surface passing through the center axis of the worm wheel and the center axis of the worm; and the abutting part and the other abutting part may be provided so that a direction of a meshing reaction force applied to the worm from the meshing part may be positioned when the worm wheel rotates in opposite directions in a region of an inferior angle formed by two lines connected to the center axis of the worm.

According to the embodiment of the present invention, a gap in a diameter direction may be provided at an end part on the side far from the meshing part in the direction orthogonal to the center axis of the worm wheel and the center axis of the worm in a state where the meshing reaction force is not applied to the worm from the meshing part, that is the worm and the worm wheel does not rotate. In this case, it may be desirable that an elasticity imparting member in the diameter direction which imparts elasticity in a direction toward a side of the worm wheel in the direction orthogonal to the center axis of the worm wheel and the center axis of the worm is provided in the outer diameter side holder. Specifically, the elasticity imparting member in the diameter direction may be a leaf spring provided in the gap in the outer diameter direction. More specifically, for example, opposite ends in the circumferential direction of the leaf spring may be configured to be elastically pressed against the inner circumferential surface of the housing, and a center part in the circumferential direction may be configured to be elastically pressed against the outer circumferential surface of the outer diameter side holder. Alternatively, the elasticity imparting member in the diameter direction may be an O-ring locked on the outer circumferential surface of the outer diameter side holder.

A protruding part may be provided on one circumferential surface out of the outer circumferential surface of the outer diameter side holder and the inner circumferential surface of the housing; a recessed part may be provided on the other circumferential surface; and the protruding part and the recessed part may be engaged with each other.

The elastic urging member in the circumferential direction may be a torsion coil spring bridged between the inner diameter side holder and the outer diameter side holder. Specifically, for example, the torsion coil spring has a pair of arm parts, and out of the pair of arm parts, one arm part may be configured to be elastically pressed against a part of the inner diameter side holder, and the other arm part may be configured to be elastically pressed against a part of the outer diameter side holder.

The elastic urging member in the circumferential direction may be installed on the side of the worm wheel, that is, the side of the meshing part, out of opposite side portions in the axial direction of the bearing.

According to the embodiment of the present invention, for example, a positioning means for relatively positioning the outer diameter side holder and the inner diameter side holder may be provided at the outer diameter side holder and the inner diameter side holder.

Further, in the specification, the term "internally fitted and held, or internally fit and hold" includes a case in which a portion where two parts abut on each other is held inside at one portion in a circumferential direction and a gap is formed at the other portion in the circumferential direction.

Advantages of the Invention

In the above-mentioned worm reduction gear of the present invention, when the inner diameter side holder rotates in a circumferential direction with respect to the outer diameter side holder, the outer circumferential surface of the inner diameter side holder and the inner circumferential surface of the outer diameter side holder may be formed so that the bearing is displaced in the direction orthogonal to the center axis of the worm wheel and the center axis of the worm. That is, the elastic urging member is capable of converting a force which elastically urges the inner diameter side holder against the outer diameter side holder in a direction of rotating in the other side circumferential direction into a force in which the inner diameter side holder is elastically urged against the worm wheel side in the direction orthogonal to the center axis of the worm wheel and the center axis of the worm. Therefore, it is possible not only to suppress a backlash, but also to suppress a variation of a meshing position between the wheel teeth and the worm teeth. As a result, it is possible to effectively prevent generation of a teeth striking sound at the meshing part between the worm teeth and the wheel teeth.

Further, in the worm reduction gear of the present invention, the inner diameter side curved surface, the outer diameter of which becomes larger as moving toward one circumferential direction, may be provided at a portion positioned at the side far from the meshing part between the wheel teeth and the worm teeth in the direction orthogonal to the center axis of the worm wheel and the center axis of the worm among outer circumferential surfaces of the inner diameter side holder, and the outer diameter side curved surface part contacting the inner diameter side curved surface may be provided when the inner diameter side holder rotates in the circumferential direction with respect to the holder holding part at a portion opposite to the inner diameter side curved surface part among the inner circumferential surfaces of the holder holding part of the outer diameter side holder. Accordingly, the elastic urging member is capable of converting a force which elastically urges the inner diameter side holder against the outer diameter side holder in a direction of rotating in the other side circumferential direction into a force in which the inner diameter side holder is elastically urged against the worm wheel side in the direction orthogonal to the center axis of the worm wheel and the center axis of the worm. Therefore, it is possible not only to suppress a backlash, but also to suppress a variation of a meshing position between the wheel teeth and the worm teeth. As a result, it is possible to effectively prevent generation of a teeth striking sound at the meshing part between the worm teeth and the wheel teeth.

Further, in the worm reduction gear of the present invention, the inner diameter side curved surface, the outer diameter of which becomes larger as moving toward one circumferential direction, may be provided at a portion positioned at the side far from the meshing part between the wheel teeth and the worm teeth in the direction orthogonal to the center axis of the worm wheel and a center axis of the worm among outer circumferential surfaces of the inner diameter side holder, and the outer diameter side curved surface part may be provided at a portion opposite to the inner diameter side curved surface part among inner circumferential surfaces of the holder holding part of the inner diameter holder, and an inner diameter thereof may become larger as moving toward one circumferential direction, and curvature of the inner diameter may be smaller than curvature of the outer diameter of the inner diameter side curved surface part. Accordingly, the elastic urging member is capable of converting a force which elastically urges the inner diameter side holder against the outer diameter side holder in a direction of rotating in the other side circumferential direction into a force in which the inner diameter side holder is elastically urged against the worm wheel side in the direction orthogonal to the center axis of the worm wheel and the center axis of the worm. Therefore, it is possible not only to suppress a backlash, but also to suppress a variation of a meshing position between the wheel teeth and the worm teeth. As a result, it is possible to effectively prevent generation of a teeth striking sound at the meshing part between the worm teeth and the wheel teeth.

BRIEF DESCRIPTION OF THE DRAWINGS

FIG. 12A is a schematic cross-sectional diagram illustrating a direction of a meshing reaction force applied to the worm from a worm wheel when an electric motor is rotationally driven in a predetermined direction, and FIG. 12B is a cross-sectional diagram taken along the line b-b of FIG. 12A.

FIG. 13A is a schematic cross-sectional diagram illustrating a direction of a meshing reaction force applied to the worm from the worm wheel when the electric motor is rotationally driven in a direction opposite to the predetermined direction, and FIG. 13B is a cross-sectional diagram taken along the line c-c of FIG. 13A.

MODES FOR CARRYING OUT THE INVENTION

First Embodiment

Figure 30A:
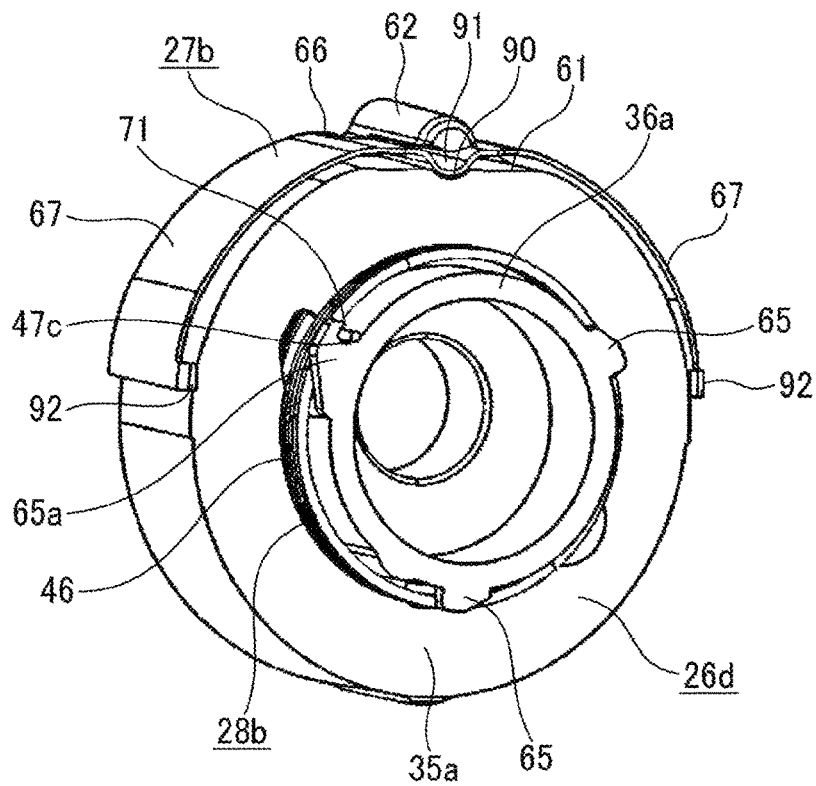
FIG. 30A is a perspective diagram illustrating an outer diameter side holder on which a leaf spring and a torsion coil spring are mounted in a worm reduction gear according to a fifth embodiment of the present invention.
Figure 30B:
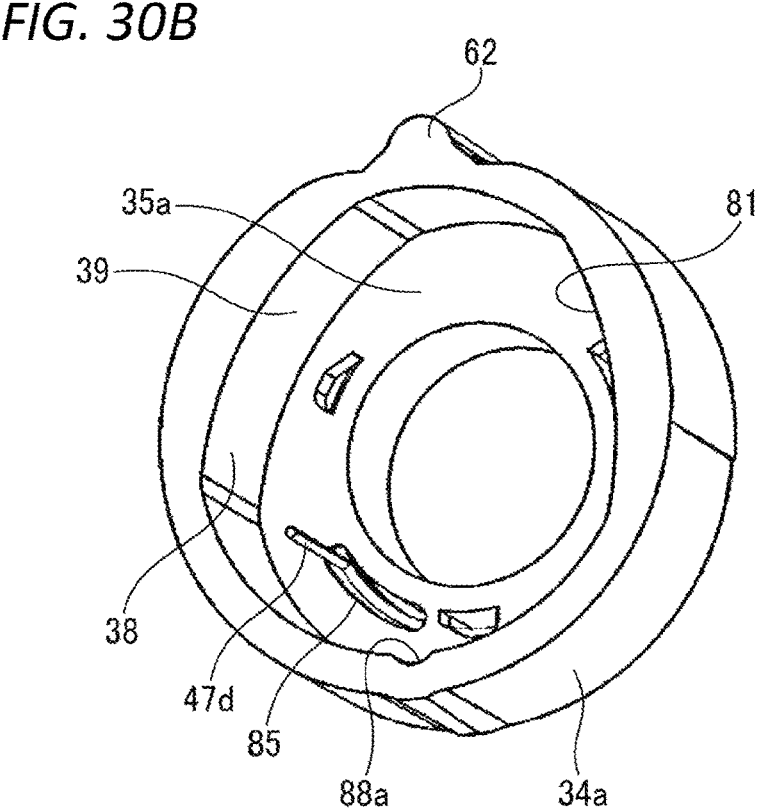
FIG. 30B is a perspective diagram of the outer diameter side holder when viewed from an opposite side to FIG. 30A in an axial direction.
Figure 31:
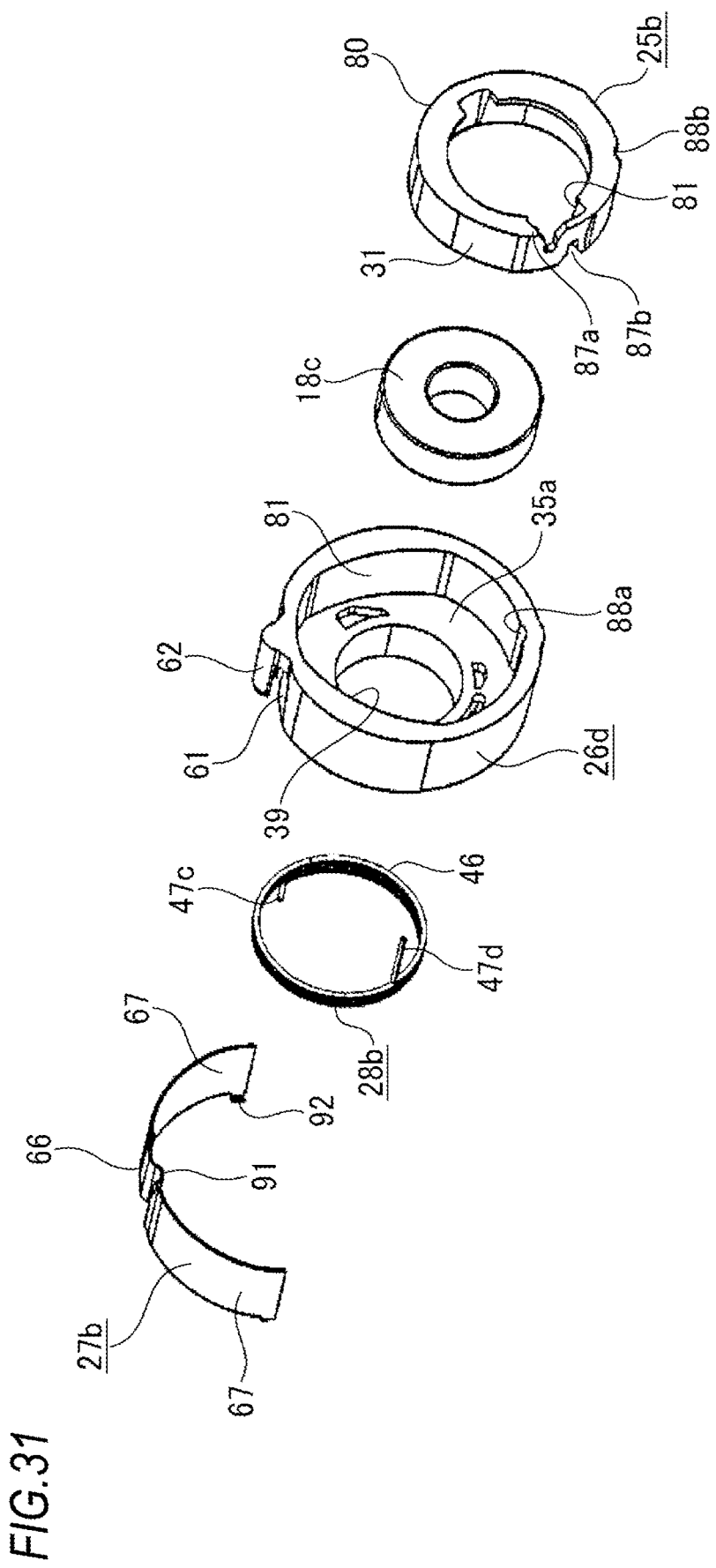
FIG. 31 is an enlarged perspective diagram of main parts illustrating a state in which members constituting the worm reduction gear according to the fifth embodiment of the present invention are respectively disassembled.

FIGS. 1 to 9 illustrate a first embodiment of the present invention. A worm reduction gear of the embodiment is provided with a housing 12a, a worm wheel 13, and a worm 14 in the same manner as those of a worm reduction gear 11 of a structure of a related art shown in FIGS. 30A and 30B. The housing 12a includes a wheel housing part 15 and a worm housing part 16a existing at a position twisted with respect to the wheel housing part 15 and having an intermediate part in the axial direction opened to the inside of the wheel housing part 15. An annular holding recessed part 24 is provided on an inner circumferential surface of one end part in the axial direction (a left end part in FIG. 2) of the worm housing part 16a. Further, the worm reduction gear of the embodiment will describe a case where worm teeth 17 of the worm 14 is a right hand helix.

The worm wheel 13 includes wheel teeth 48 on an outer circumferential surface, and is supported and fixed coaxially with the steering shaft 5 at a portion near a front end of the steering shaft 5 (refer to FIGS. 29A and 29B), which is a driven shaft, rotatably supported at the inside of the wheel housing part 15. For example, the worm wheel 13 that is formed by connecting and fixing the wheel teeth 48 constituted of a synthetic resin around a disc-shaped member constituted of a metallic material can be used. Alternatively, the whole worm wheel 13 may be constituted of a metallic material or a synthetic resin.

The worm 14 is constituted of the metallic material and a based end part of the worm 14 is connected to an output shaft of the electric motor 10 so as to be able to transmit torque in a state where the worm teeth 17 provided at the intermediate part in the axial direction is meshed with the wheel teeth 48. In the worm housing part 16a of the housing 12a, the worm 14 is rotatably, supported and also displaceably supported with the base end part as a center. For this reason, a pair of rolling bearings 18b and 18c are externally fitted to two positions on opposite sides in an axial direction by which the worm teeth 17 in the worm 14 is sandwiched. Further, the pair of rolling bearings 18b and 18c are respectively constituted of a radial ball bearing of a single row deep groove type, a radial roller bearing, a radial tapered roller bearing, or the like.

A specific structure for supporting the worm 14 rotatably, and also displaceably with the base end part as a center in the worm housing part 16 will be described with reference to FIG. 40 which is related to a technology of the related art. A bearing fitting part 49 is provided at an opening part of the worm housing part 16a, and a housing side step part 50 directed to the other side in the axial direction is provided at one end part in the axial direction (a right end part in FIG. 40) of the bearing fitting part 49. One side surface in the axial direction of an outer ring 51 constituting a rolling bearing 18b on a base end side abuts against the housing side step part 50, and an outer circumferential surface of the outer ring 51 is internally fitted to the bearing fitting part 49 by interference fitting. In the opening part of the worm housing part 16a, one side surface in the axial direction of a retaining ring 52 locked to a portion adjacent to the other side in the axial direction of the bearing fitting part 49 abuts against the other side surface in the axial direction (a left side surface in FIG. 40) of the outer ring 51. As a result, axial displacement of the outer ring 51 is restricted. A small diameter part 53 is provided at the base end part of the worm 14, and a worm side step part 54 directed to the other side in the axial direction is provided at one end part in the axial direction of the small diameter part 53. One side surface in the axial direction of an inner ring 57 constituting the rolling bearing 18b on the base end side abuts against the worm side step part 54 through an elastic body 55 such as a disc spring, and an inner circumferential surface of the inner ring 57 is externally fitted to the small diameter part 53 by clearance fitting. A tip surface (one side surface in the axial direction) of a nut 56 screwed to the other end part in the axial direction of the small diameter part 53 abuts against the other side surface in the axial direction of the inner ring 57 through the elastic body 55. In other words, the inner ring 57 is elastically sandwiched between the worm side step part 54 and the nut 56 through the pair of elastic bodies 55 in a state of being externally fitted to the small diameter part 53 with clearance fitting. Accordingly, the base end part of the worm 14 is supported with respect to the opening part of the worm housing part 16a through the rolling bearing 18b on the base end side.

However, a structure in which the worm 14 is supported in the worm housing part 16a so as to be able to be shaken and displaced with the base end part as a center is not limited to the structure of the embodiment. That is, for example, the worm 14 can be configured so as to be able to be shaken and displaced with the base end part as a center by increasing an internal gap of the rolling bearing 18b on the base end side. Alternatively, a bearing may not be provided around the base end part of the worm 14, but the output shaft of the electric motor 10 and the base end part of the worm 14 may be connected to each other via a joint provided with an elastic member which is elastically deformable in the diameter direction.

Figure 19:
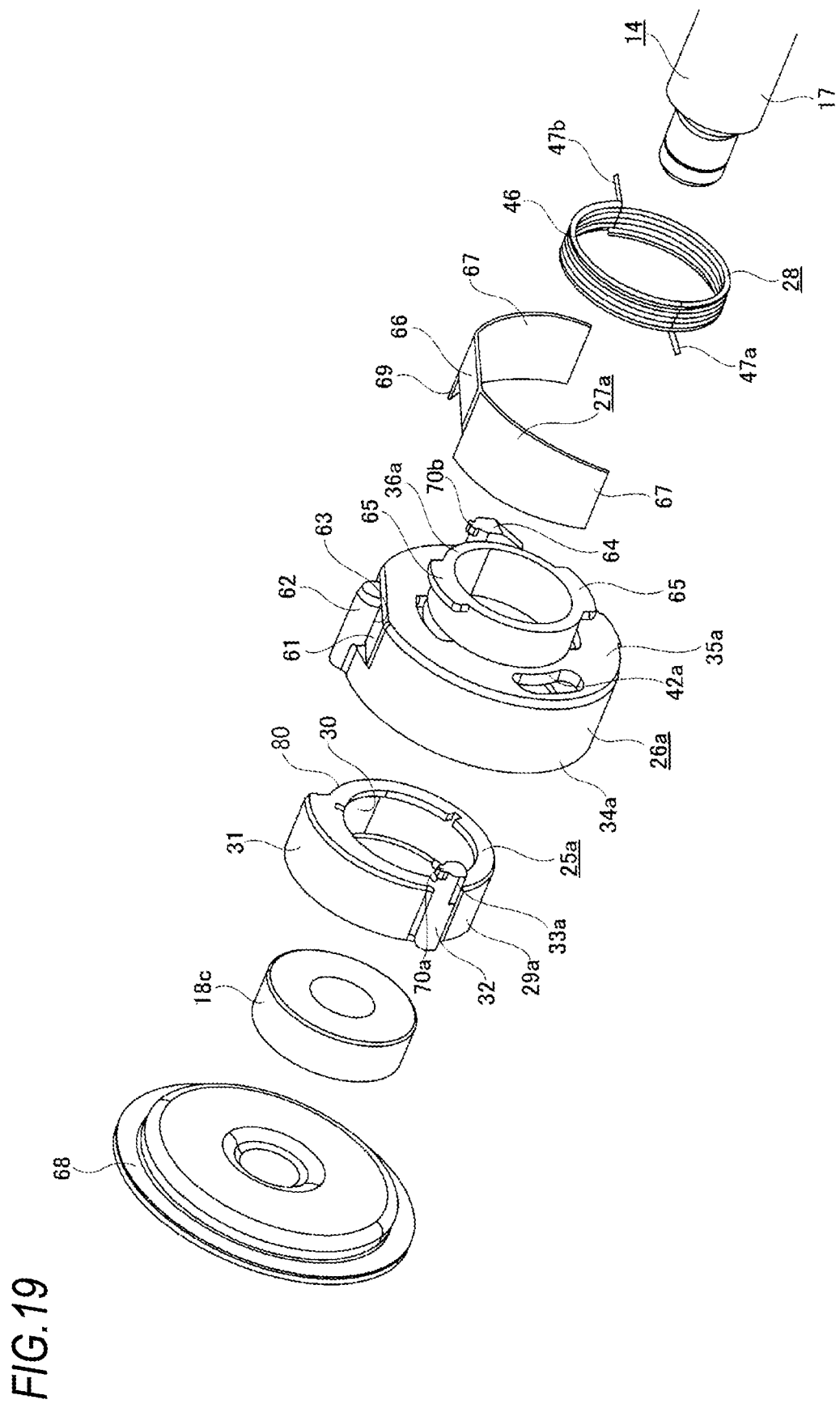
FIG. 19 is an enlarged perspective diagram of main parts illustrating a state in which members constituting the worm reduction gear according to the second embodiment of the present invention are respectively disassembled.
Figure 20:
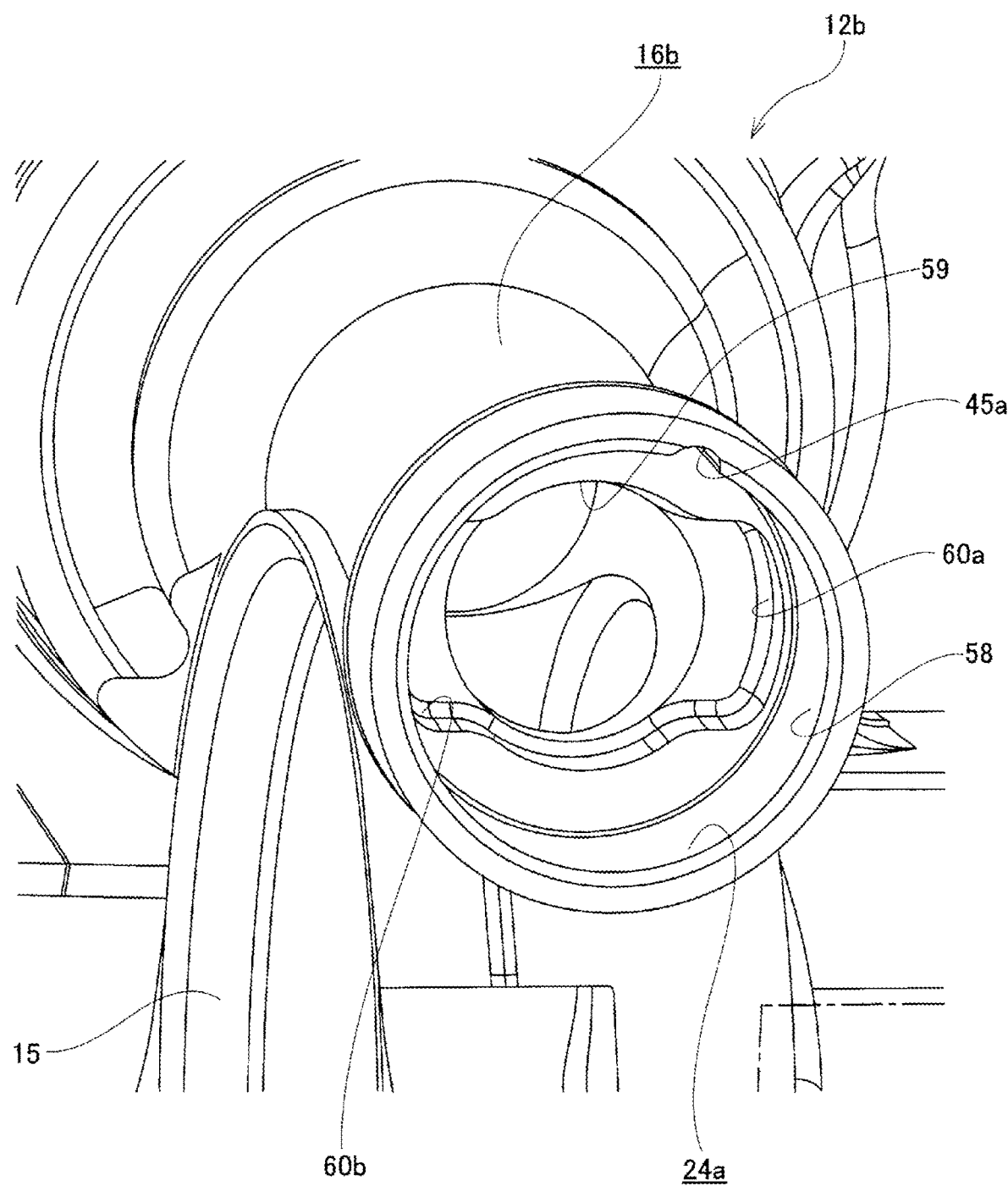
FIG. 20 is a perspective diagram illustrating a housing taken out.
Figure 21:
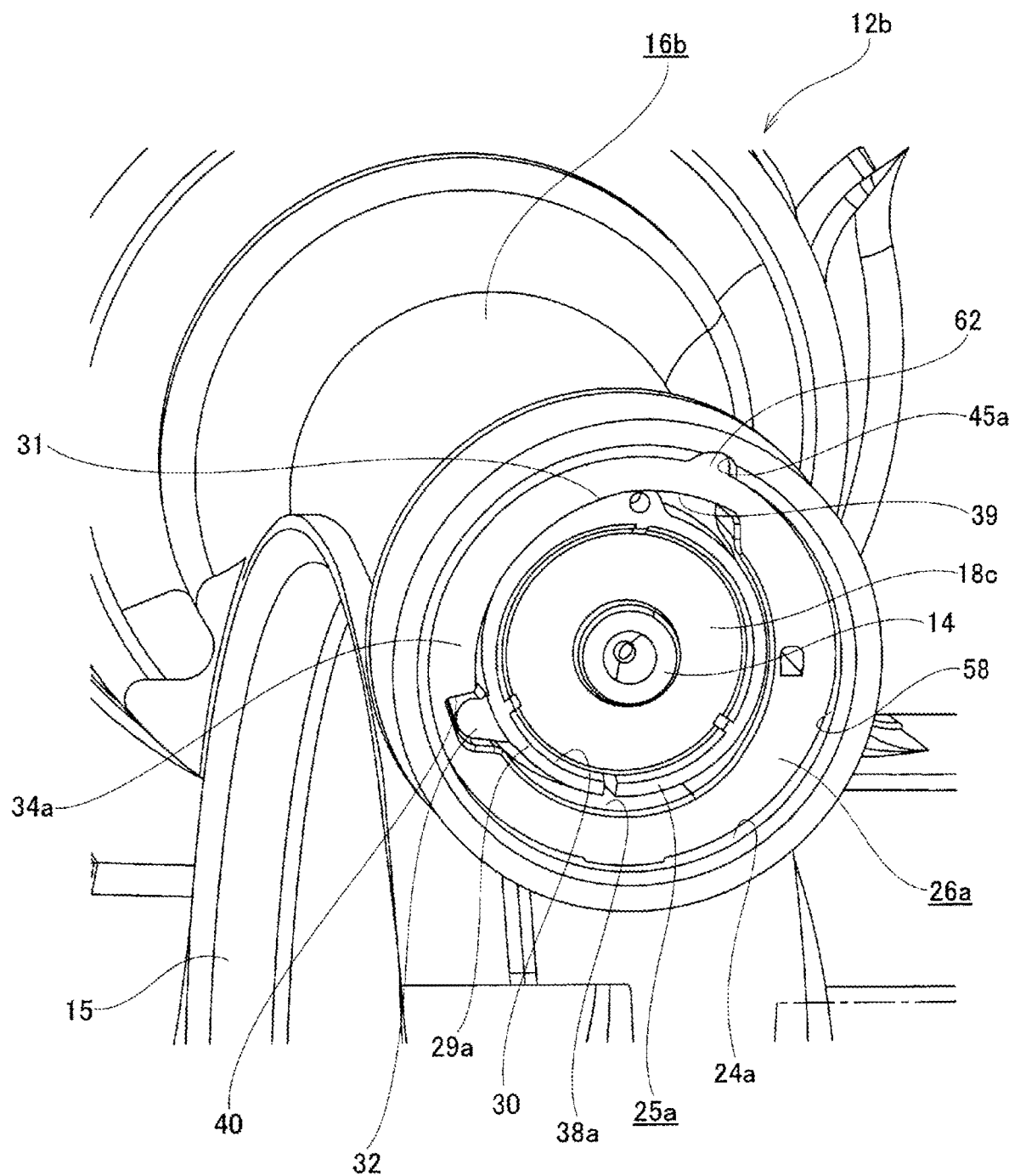
FIG. 21 is a perspective diagram illustrating a state in which a cover is removed.

The tip part (the left end part in FIG. 2) of the worm 14 is supported in the holding recessed part 24 of the worm housing part 16a by the rolling bearing 18c on the tip side so as to be able to perform rotation and slight perspective movement with respect to the worm wheel 13. Specifically, the inner ring constituting the rolling bearing 18c on the tip side is externally fitted and fixed to the tip part of the worm 14 by the interference fitting. However, it is also possible to adopt a structure in which the inner ring of the rolling bearing 18c on the tip side is loosely and externally fitted to the tip part of the worm 14 so as not to be shaken in the diameter direction. On the other hand, an inner diameter side holder 25, an outer diameter side holder 26, a leaf spring 27 which is an elasticity imparting member in the diameter direction, and a torsion coil spring 28 which is the elastic urging member in the circumferential direction are provided between the outer ring of the rolling bearing 18c on the tip side and the holding recessed part 24 of the worm housing part 16a. Further, the opening part on one side in the axial direction of the holding recessed part 24 is closed by a disk-shaped cover (refer to a cover 68 in FIG. 19) after assembly is completed.

The inner diameter side holder 25 is constituted of a synthetic resin such as PPS (polyphenylene sulfide), PA (polyamide), POM (polyacetal), or the like, or a light alloy such as an aluminum-based alloy or a magnesium-based alloy, or the like, and a whole structure thereof is formed in an approximately cylindrical shape. The inner diameter side holder 25 is provided with a cylindrical holder main body 29, and a bearing holding part 30 for internally fitting and holding the outer ring constituting the rolling bearing 18c on the tip side is provided on an inner circumferential surface of the holder main body 29. The inner diameter of the bearing holding part 30 is slightly smaller than the outer diameter of the outer ring of the rolling bearing 18c on the tip side, and the outer ring of the rolling bearing 18c on the tip side is internally fitted to the bearing holding part 30 by the interference fitting. However, the inner diameter of the bearing holding part 30 is set to be equal to or slightly larger than the outer diameter of the outer ring of the rolling bearing 18c on the tip side, such that the outer ring of the rolling bearing 18c on the tip side can be configured to be loosely and internally fitted and held so as not to be shaken in the diameter direction with respect to the bearing holding part 30.

With respect to a first direction D1 (an up-and-down direction in FIGS. 1, 3, 7, and 9) orthogonal to a center axis of the worm wheel 13 and a center axis of the worm 14, among the outer circumferential surfaces of the holder main body 29, an inner diameter side cam part 31 constituting an inner diameter side curved surface part of the present invention, an outer diameter of which becomes larger as moving toward one circumferential direction (a front in a clockwise direction in FIGS. 1, 3, 7, and 9) with respect to a center of the rolling bearing 18c, that is, a center axis $O_{14}$ of the worm 14, is provided at a portion (an upper part in FIGS. 1, 3, 7, and 9) positioned on a side far from a meshing part between the worm teeth 17 and the wheel teeth 48. In other words, thickness (thickness in the diameter direction) of a half part on the side opposite to the side of the worm wheel 13 (an upper half part in FIGS. 1, 3, 7, and 9) in the first direction D1 of the holder main body 29 becomes larger as moving toward a portion near one end in the circumferential direction from the other end in the circumferential direction (a rear end part in the clockwise direction in FIG. 1), and the inner diameter side cam part 31 is provided on the outer circumferential surface of the portion.

Further, a portion 80 positioned on the side opposite to the inner diameter side cam part 31 is formed on a compound curved surface where a plurality of curved surfaces having different radii of curvature from each other are smoothly continued among the outer circumferential surfaces of the holder main body 29 in the first direction D1, with respect to the portion 80 near one end in the circumferential direction of the outer circumferential surface of the half part on the side far from the meshing part between the worm teeth 17 and the wheel teeth 48, in other words, with respect to the side far from the meshing part between the wheel teeth 48 and the worm teeth 17, and a surface P passing through the center axis of the worm wheel 13 and the center axis of the worm 14.

Figure 1:
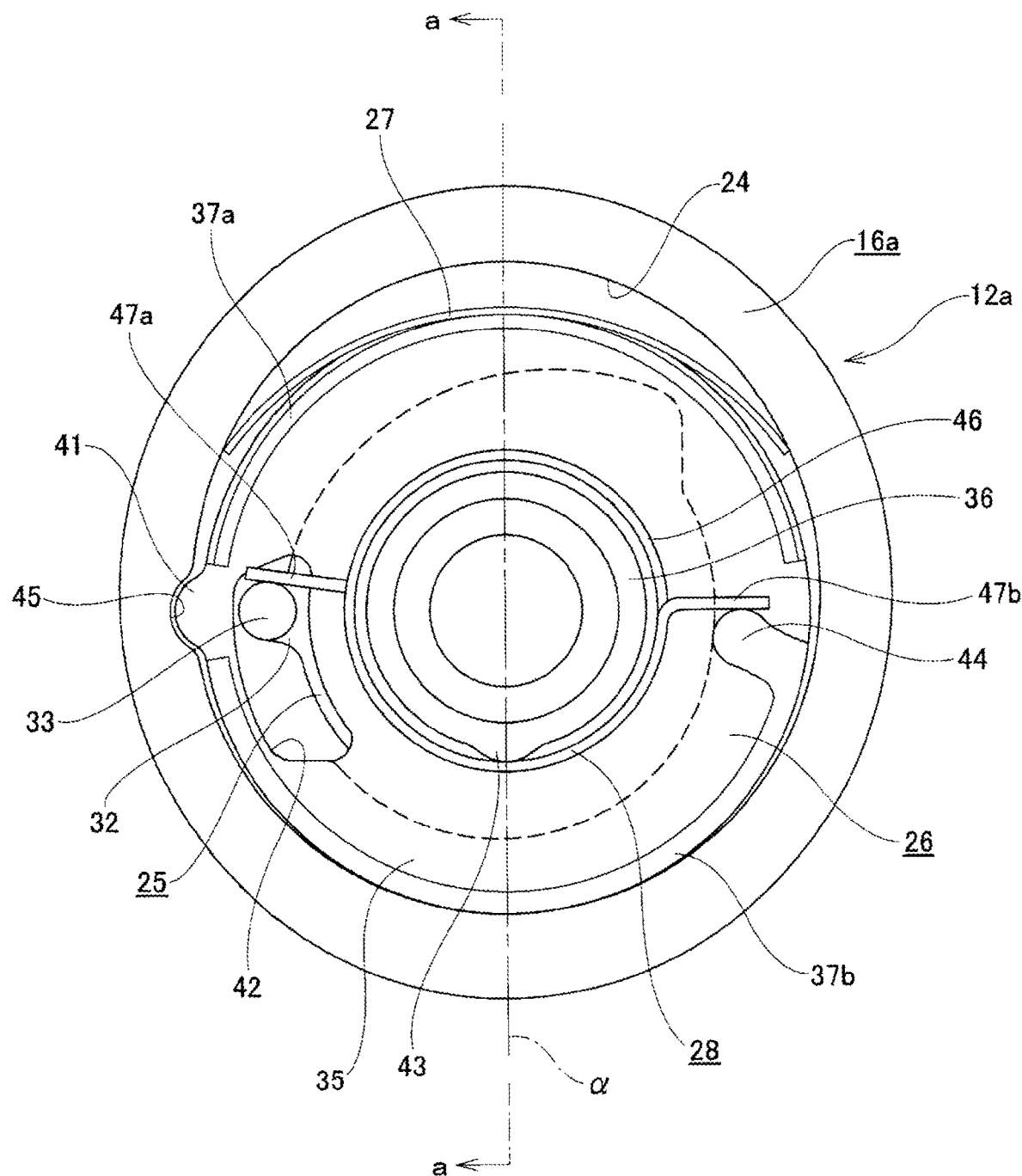
FIG. 1 is an end surface diagram illustrating a worm reduction gear according to a first embodiment of the present invention.
Figure 2:
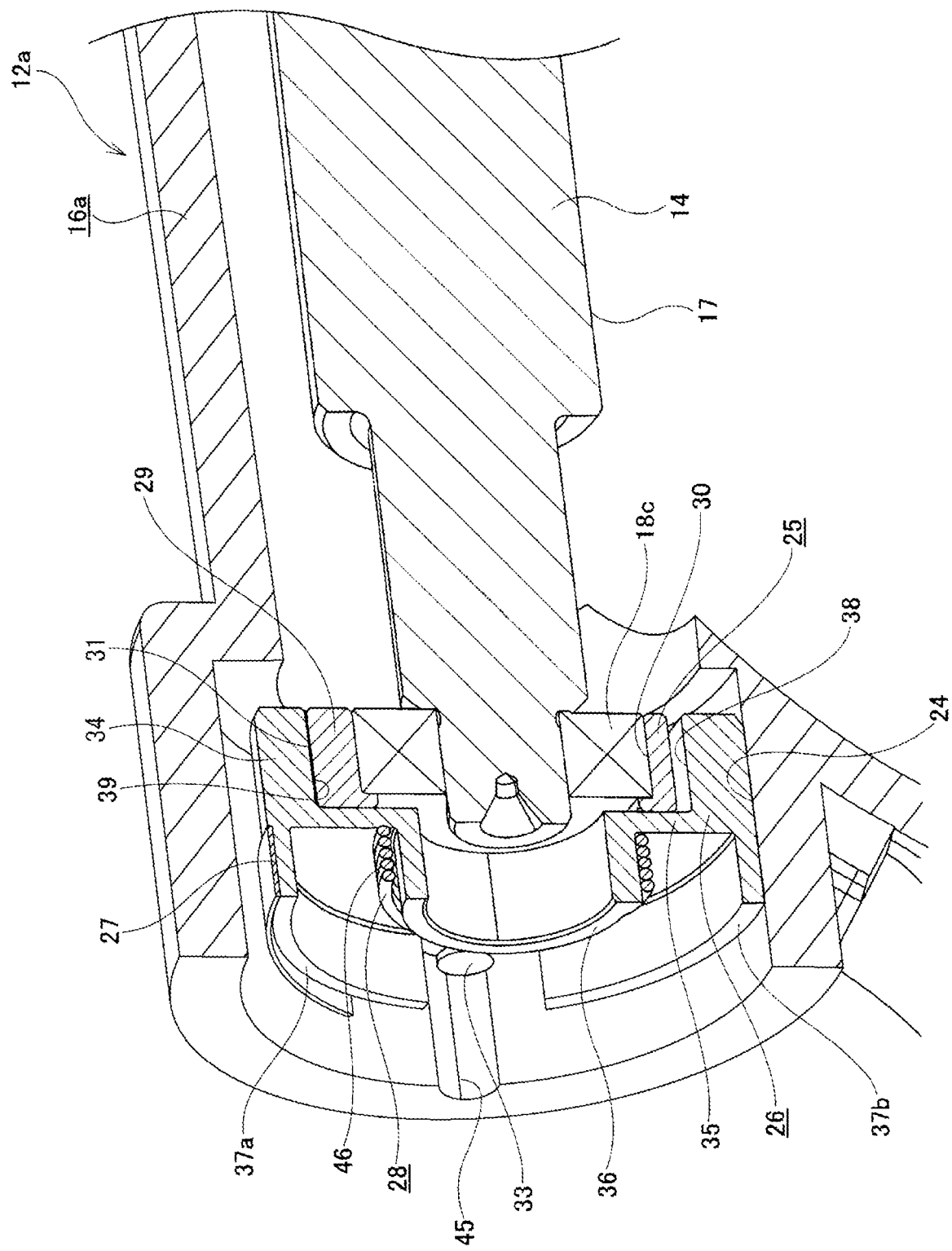
FIG. 2 is a cross-sectional diagram taken along the line a-a of FIG. 1.
Figure 3:
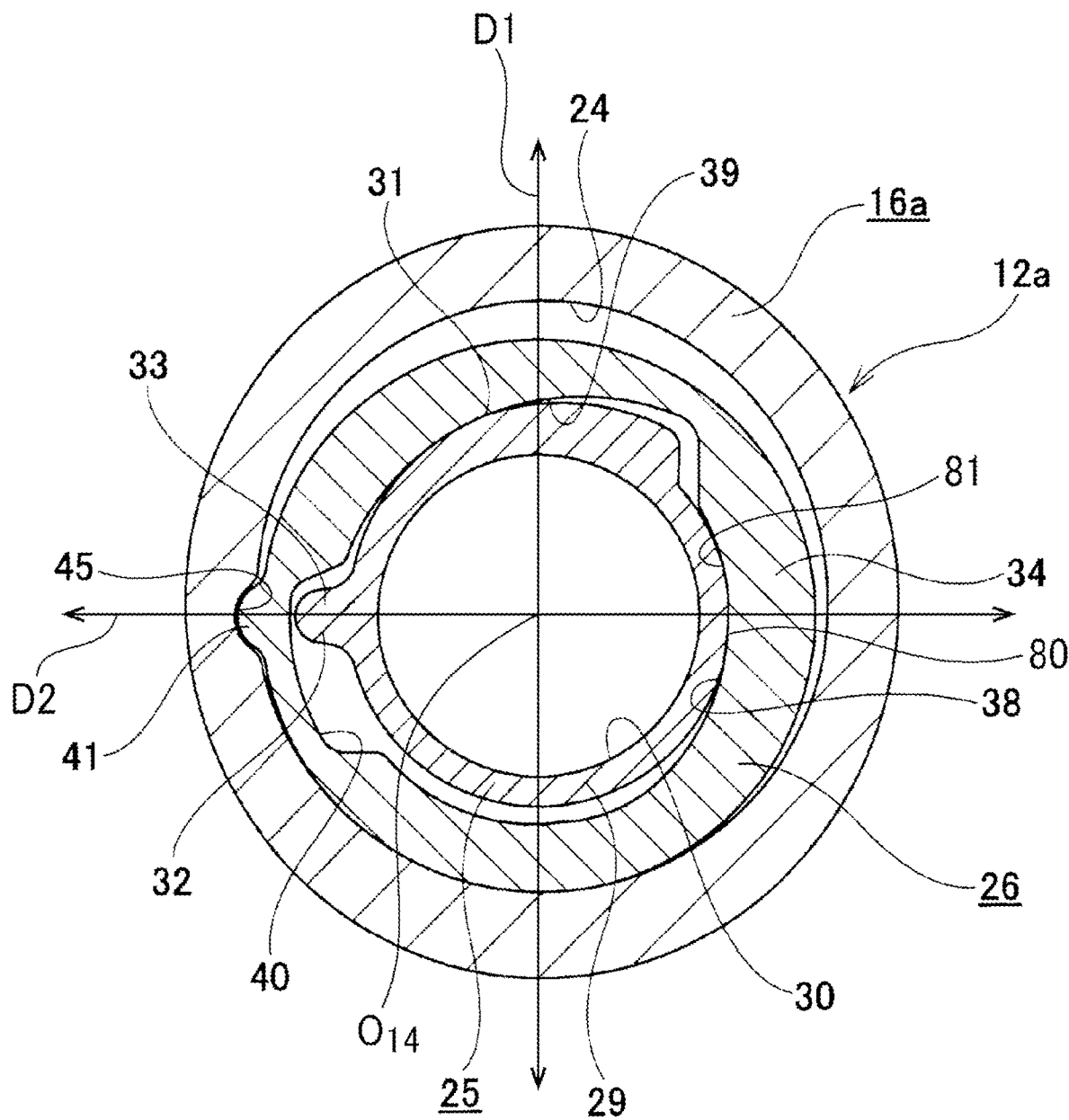
FIG. 3 is a cross-sectional diagram illustrating an inner diameter side holder, an outer diameter side holder, and a housing, all of which are taken out.
Figure 4:
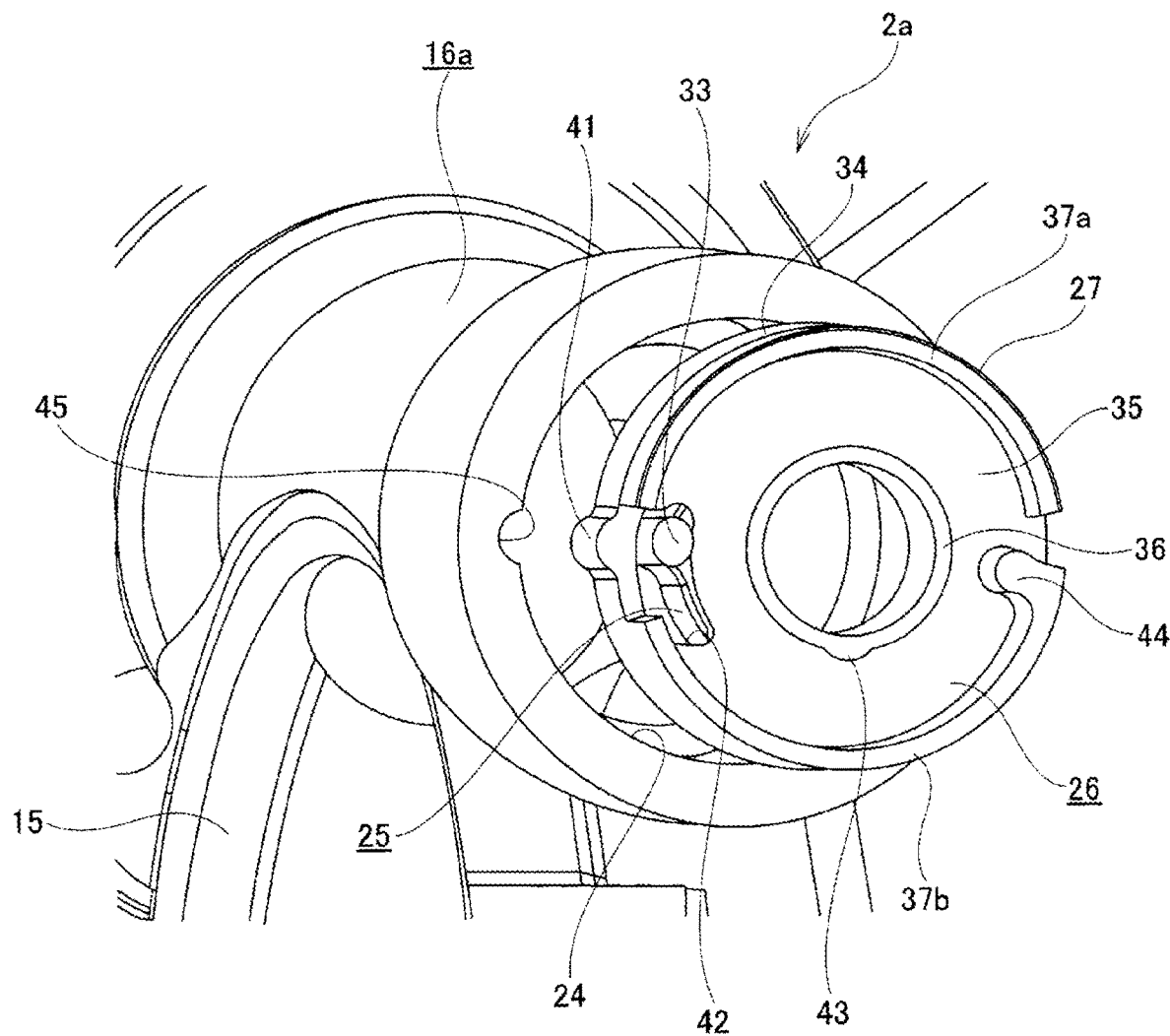
FIG. 4 is an enlarged perspective diagram of main parts illustrating a state in which the inner diameter side holder and the outer diameter side holder are not assembled to the housing.
Figure 5:
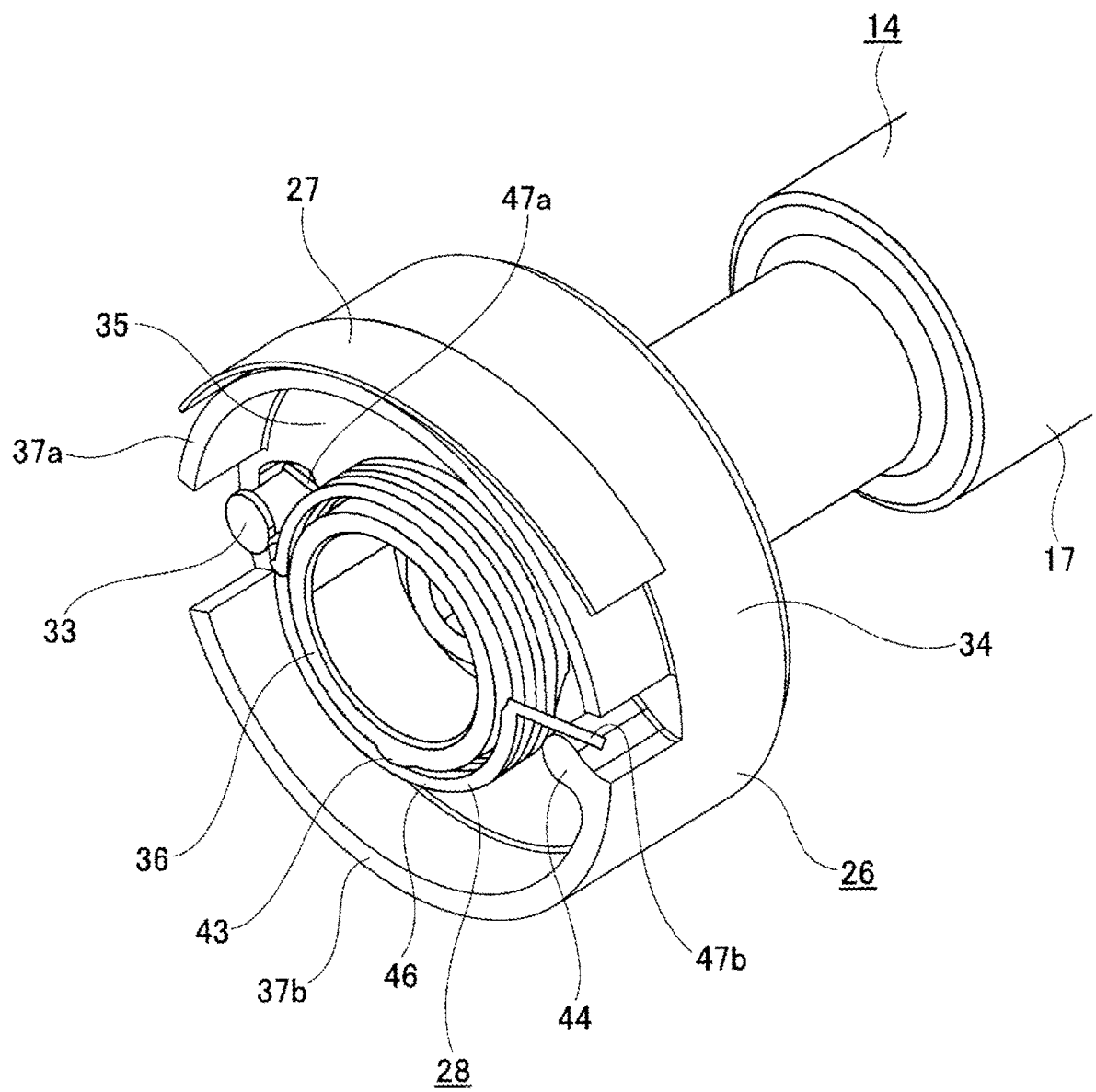
FIG. 5 is an enlarged perspective diagram of main parts illustrating the worm reduction gear according to the first embodiment of the present invention by omitting the housing.
Figure 6:
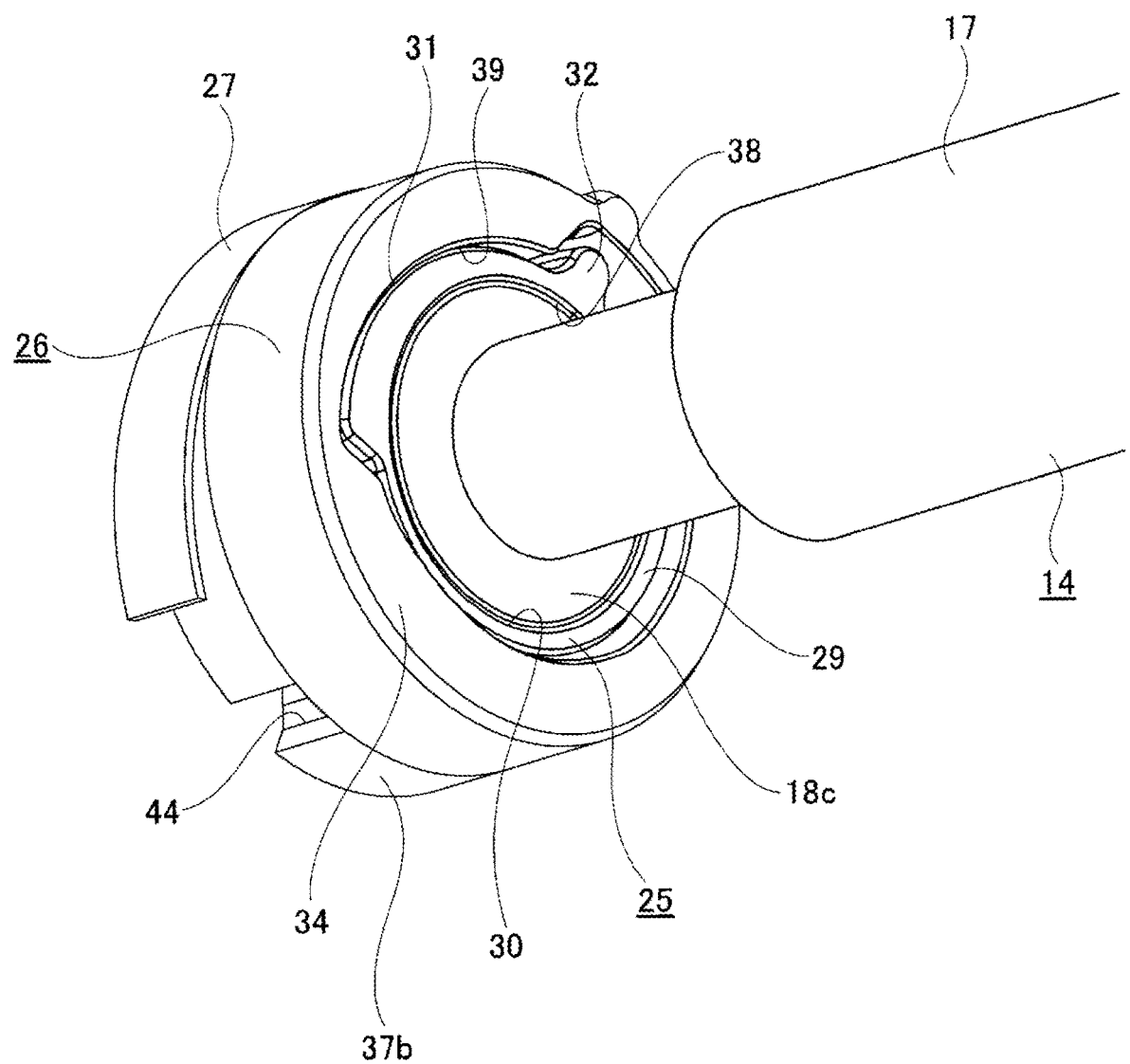
FIG. 6 is an enlarged perspective diagram of main parts illustrating a state in which the worm reduction gear according to the first embodiment of the present invention omits the housing and is viewed from a side opposite to FIG. 5 in an axial direction.
Figure 7:
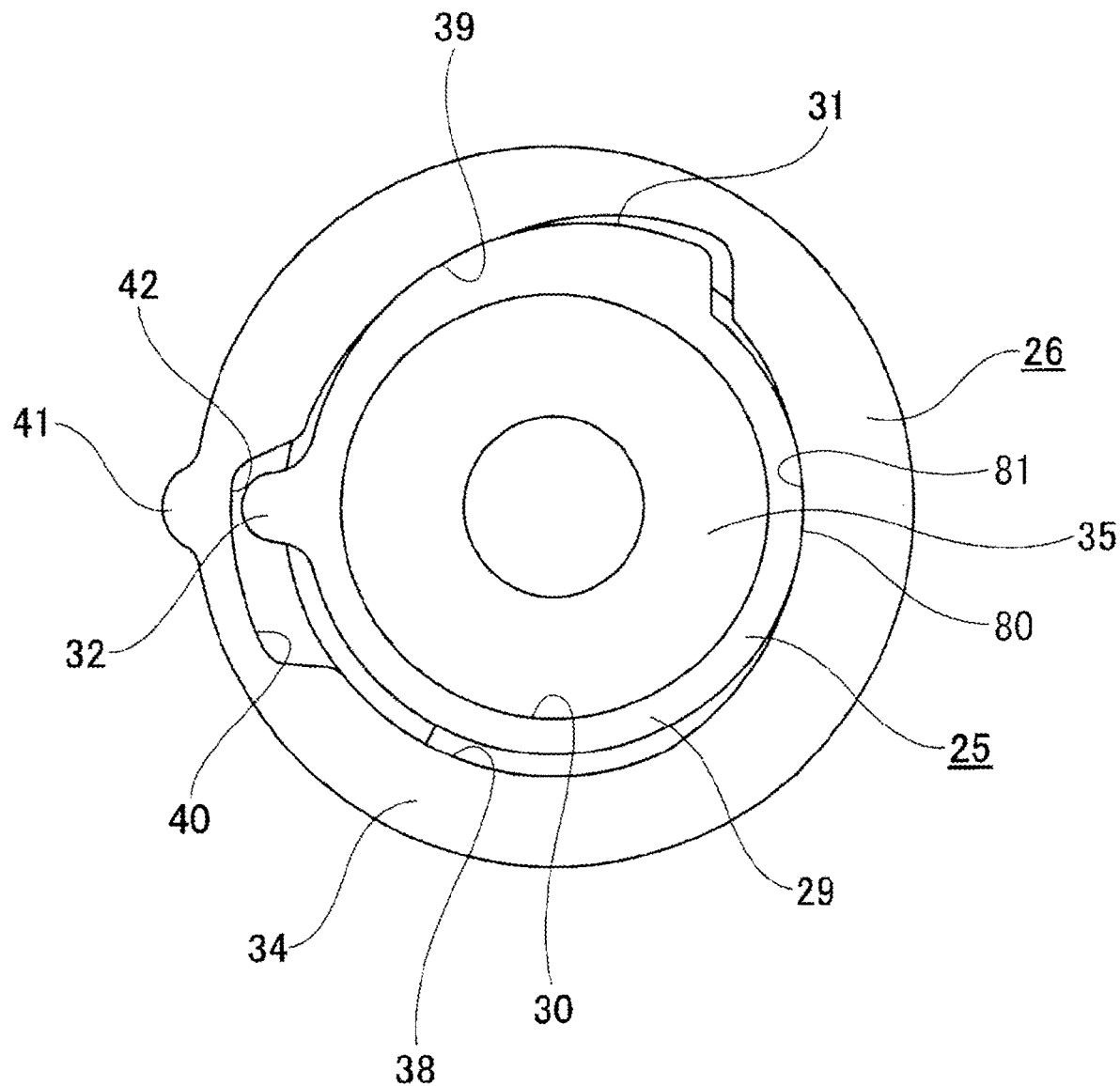
FIG. 7 is an end surface diagram illustrating a state in which the inner diameter side holder and the outer diameter side holder are taken out and viewed from a base end side of a worm.
Figure 8:
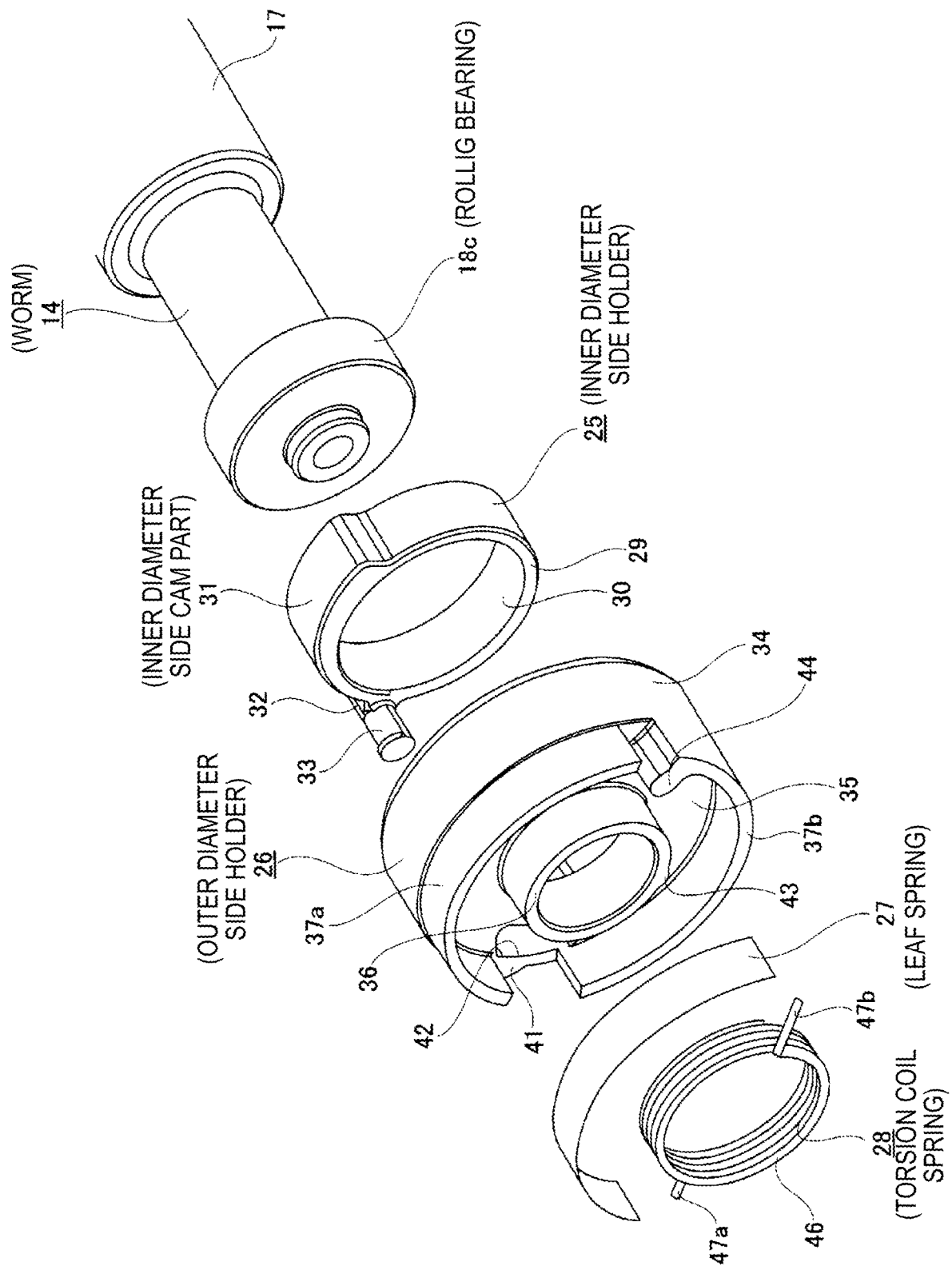
FIG. 8 is an enlarged perspective diagram of main parts illustrating a state in which members constituting the worm reduction gear of the first embodiment of the present invention are respectively disassembled.

A protruding part 32 protruding outwards in the diameter direction is provided at a portion adjacent to the other side in the circumferential direction of the inner diameter side cam part 31 among the outer circumferential surfaces of the holder main body 29, and a displacement side pin part 33 protruding in the axial direction is provided on one side surface in the axial direction of the protruding part 32 (a left side surface in FIG. 2).

The outer diameter side holder 26 is constituted of a synthetic resin such as PPS (polyphenylene sulfide), PA (polyamide), POM (polyacetal), or the like, or a light alloy such as an aluminum-based alloy, a magnesium-based alloy, or the like, and is provided with an approximately cylindrical outer diameter side cylindrical part 34, and a side plate part 35, an inner diameter side cylindrical part 36, and a pair of protruding piece parts 37a and 37b. The outer diameter side cylindrical part 34 is approximately cylindrical shape, and a holder holding part 38 is provided on the inner diameter side thereof. The holder holding part 38 serves to hold the inner diameter side holder 25 so as to be able to be shaken with the center axis of the worm 14 as a center and to be displaced in the first direction D1. An outer diameter side cam part 39 constituting an outer diameter side curved surface part of the present invention, in which the inner diameter thereof becomes larger as moving toward one circumferential direction with respect to the center of the rolling bearing 18c, that is, the center axis $O_{14}$ of the worm 14, and the curvature of the inner diameter thereof is smaller than the curvature of the outer diameter of the inner diameter side cam part 31, is provided at a portion facing the inner diameter side cam part 31 among the inner circumferential surfaces of the holder holding part 38. In other words, the outer diameter side cam part 39 is provided on the inner circumferential surface of the portion in which thickness of the half part on the side far from the meshing part in the first direction D1 becomes smaller as moving from the other end part in the circumferential direction toward a portion near the one end in the circumferential direction in the outer diameter side cylindrical part 34. In the embodiment, the inner diameter side cam part 31 is constituted of the compound curved surface where the plurality of curved surfaces having different radii of curvature from each other are smoothly continued, and the outer diameter side cam part 39 is constituted of a single partial cylindrical surface.

Further, for the outer diameter side holder 26 the same material as that of the inner diameter side holder 25 may be used, or different material may be used.

Further, an inner circumferential surface 81 that is constituted of a single partial cylindrical surface is formed at a position facing the portion 80 near one end in the circumferential direction of the holder main body 29 among the inner circumferential surfaces of the holder holding part 38. The inner circumferential surface 81 is positioned on the side opposite to the outer diameter side cam part 39 with respect to the side far from the meshing part between the wheel teeth 48 and the worm teeth 17, and the surface P passing through the center axis of the worm wheel 13 and the center axis of the worm 14.

A recessed part 40 that is recessed outwards in the diameter direction is provided on a portion adjacent to the other side in the circumferential direction of the outer diameter side cam part 39 among the inner circumferential surfaces of the holder holding part 38 in a state of being elongated in the circumferential direction. The protruding part 32 is disposed at the inside of the recessed part 40 in a state where the inner diameter side holder 25 is internally fitted and held at the inside of the holder holding part 38. Accordingly, the diameter side holder 25 can be slightly shaken and displaced with the center axis of the worm 14 as a center. A portion deviated from the outer diameter side cam part 39 and the recessed part 40 on the inner circumferential surfaces of the holder holding part 38 has an approximately elliptical shape which is elongated in the first direction D1 when viewed from the axial direction. Accordingly, the inner diameter side holder 25 is internally fitted and held in the holder holding part 38 so as to be able to be shaken with the center axis of the worm 14 as a center and to be displaced in the first direction D1 within a range where the protruding part 32 can move in the recessed part 40.

Figure 9:
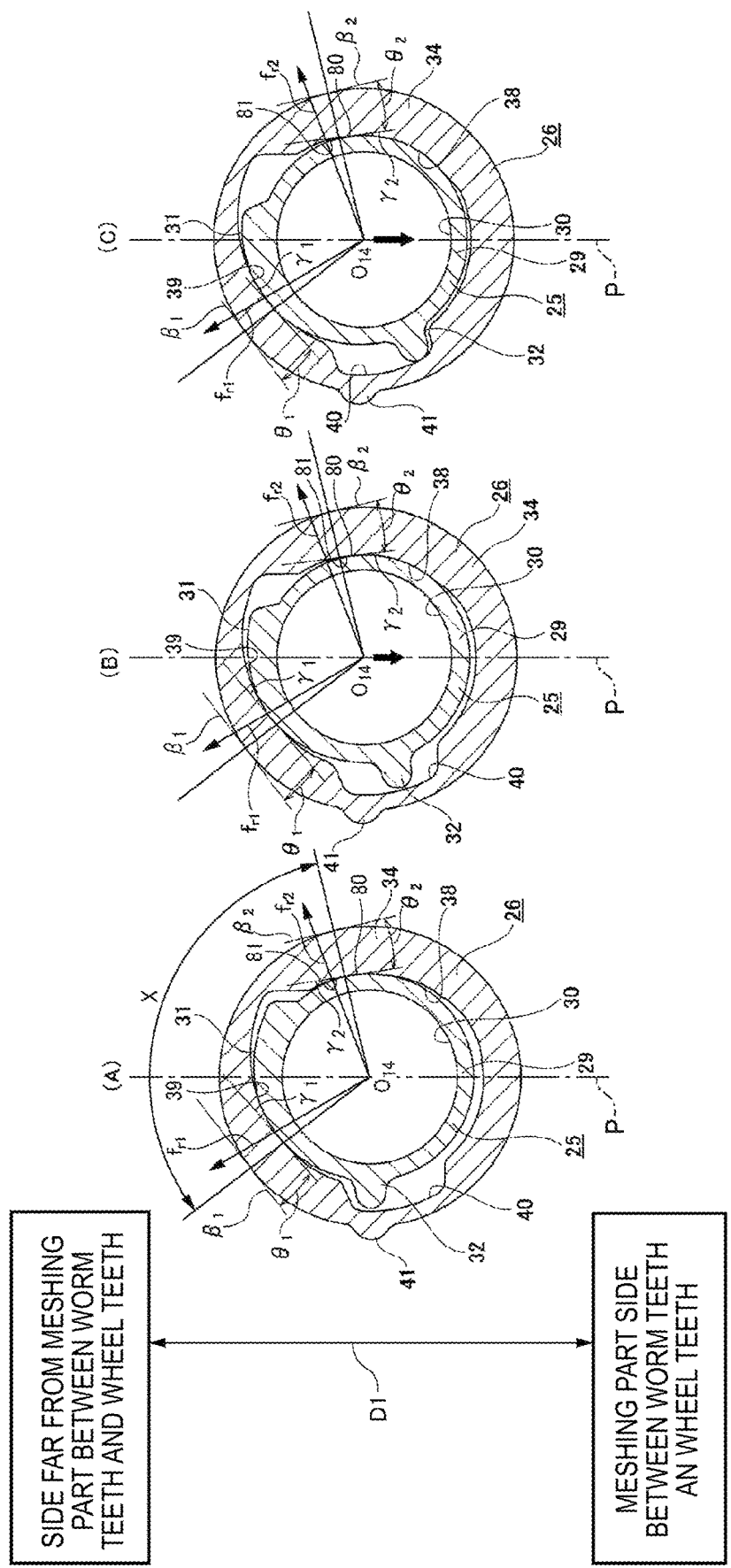
FIG. 9 is cross-sectional diagrams illustrating an abutting position of an outer circumferential surface of the inner diameter side holder and an inner circumferential surface of the outer diameter side holder.

In the embodiment, as illustrated in FIG. 9, an abutting part (sliding contact part) between the inner circumferential surface of the holder holding part 38 and the outer circumferential surface of the inner diameter side holder 25 is provided at two positions. That is, an approximately center position in the circumferential direction of the inner diameter side cam part 31 abuts on the outer diameter side cam part 39. Additionally, the portion 80 near one end in the circumferential direction of the outer circumferential surface of the half part on the side far from the meshing part between the worm teeth 17 and the wheel teeth 48 in the first direction D1 in the inner diameter side holder 25 abuts on the inner circumferential surface 81 of the holder holding part 38. An abutting part between the portion 80 near one end in the circumferential direction and the inner circumferential surface 81 of the holder holding part 38 is positioned on the side opposite to an abutting part between the inner diameter side cam part 31 and the outer diameter side cam part 39 with respect to the side far from the meshing part between the wheel teeth 48 and the worm teeth 17, and the surface P passing through the center axis of the worm wheel 13 and the center axis of the worm 14.

Further, the above-mentioned two abutting parts are provided so that directions of meshing reaction forces $f_{r1}$ and $f_{r2}$ applied to the worm 14 from the meshing parts when the worm wheel 13 rotates in both directions are positioned in a region X of an inferior angle formed by two lines connected to the center axis $O_{14}$ of the worm 14.

The region X is positioned on the side far from the meshing part between the worm teeth 17 and the wheel teeth 48 in the first direction D1.

Further, the meshing reaction forces $f_{r1}$ and $f_{r2}$ are forces generated at the tip part of the worm 14 based upon the meshing reaction forces acting on the meshing part between the worm teeth 17 and the wheel teeth 48.

Further, as illustrated in FIGS. 9A to 9C, the abutting parts at two positions are formed so as to satisfy a relationship with the directions of the meshing reaction forces $f_{r1}$ and $f_{r2}$ regardless of the circumferential position of the inner diameter side holder 25 with respect to the outer diameter side holder 26.

Further, in the embodiment, the portion 80 near one end in the circumferential direction with respect to the inner diameter side cam part 31 of the inner diameter side holder 25 is formed on the compound curved surface where the plurality of curved surfaces having different radii of curvature from each other are smoothly continued, and the inner circumferential surface 81 of the holder holding part 38 on which the portion 80 near one end in the circumferential direction abuts is constituted by the single partial cylindrical surface.

That is, in the embodiment, the outer diameter side cam part 39 and the inner circumferential surface 81 of the holder holding part 38 are constituted by the single partial cylindrical surface, and the inner diameter side cam part 31 and the portion 80 near one end in the circumferential direction are constituted by the compound curved surface where the plurality of curved surfaces having different radii of curvature from each other are smoothly continued.

Further, the portion 80 near one end in the circumferential direction of the inner diameter side holder 25 constitutes another inner diameter side curved surface part of the present invention; the inner circumferential surface 81 of the holder holding part 38 on which the portion 80 near one end in the circumferential direction abuts constitutes another outer diameter side curved surface part of the present invention; and the portion 80 near one end in the circumferential direction of the inner diameter side holder 25 and the inner circumferential surface 81 of the holder holding part 38 constitute the other abutting part of the present invention.

In the embodiment, gaps between virtual straight lines $\beta_1$ and $\beta_2$ orthogonal to the directions of meshing reaction forces $f_{r1}$ and $f_{r2}$ and tangent lines $\gamma_1$ and $\gamma_2$ of the inner circumferential surface of the holder holding part 38 at the abutting part with the outer circumferential surface of the inner diameter side holder 25 become wider as moving toward a front side in a rotating direction of the inner diameter side holder 25. That is, when the worm wheel 13 rotates in one direction, a gap between the virtual straight line $\beta_1$ orthogonal to the direction of the meshing reaction force $f_{r1}$ applied to the tip part of the worm 14 and the tangent $\gamma_1$ of the outer diameter side cam part 39 at the abutting part with the inner diameter side cam part 31 becomes wider as moving toward the other circumferential direction (a lower left side in FIG. 9). On the other hand, when the worm wheel 13 rotates in the other circumferential direction, a gap between the virtual straight line $\beta_2$ orthogonal to the direction of the meshing reaction force $f_{r2}$ applied to the tip part of the worm 14 and the tangent $\gamma_2$ of the inner circumferential surface of the holder holding part 38 at the butting part with the inner diameter side holder 25 becomes wider as moving toward one circumferential direction (a lower right side in FIG. 9). Specifically, shapes of the inner diameter side holder 25 and the outer diameter side holder 26 are restricted so that angles $\theta_1$ and $\theta_2$ formed between the virtual straight lines $\beta_1$ and $\beta_2$ and the tangent lines $\gamma_1$ and $\gamma_2$ become about 5° to about 30°.

Further, FIG. 9 illustrates a state in which the inner diameter side holder 25 rotates in the other circumferential direction (a counterclockwise direction shown in FIG. 9) in the order of Section (A)→Section (B)→Section (C). Accordingly, even when the inner diameter side holder 25 rotates in the other circumferential direction, respective phases of the abutting part between the inner diameter side cam part 31 and the outer diameter side cam part 39, and another abutting part between the portion 80 near one end in the circumferential direction of the inner diameter side holder 25 and the inner circumferential surface 81 of the holder holding part 38 are almost not changed. In this case, the inner diameter side holder 25 and the rolling bearing 18c held in the inner diameter side holder 25 are not substantially moved in the left-and-right direction in FIG. 9, but are displaced downward, that is, displaced only toward the side of the worm wheel 13 in the first direction D1. Therefore, such displacement is caused by shapes of the inner diameter side cam part 31, the outer diameter side cam part 39, the portion 80 near one end in the circumferential direction of the inner diameter side holder 25, and the inner circumferential surface 81 of the holder holding part 38.

Additionally, in the case of the parts providing such displacement, the shapes of the inner diameter side cam part 31, the outer diameter side cam part 39, the portion 80 near one end in the circumferential direction of the inner diameter side holder 25, and the inner circumferential surface 81 of the holder holding part 38 are not limited. For example, the inner diameter side cam part 31 and the portion 80 near one end in the circumferential direction of the inner diameter side holder 25, can be formed as a single partial cylindrical surface, and the outer diameter side cam part 39 and the inner circumferential surface 81 of the holder holding part 38 can be constituted by a compound curved surface where the plurality of curved surfaces having different radii of curvature from each other are smoothly continued. Alternatively, all of the inner diameter side cam part 31, the outer diameter side cam part 39, the portion 80 near one end in the circumferential direction of the inner diameter side holder 25, and the inner circumferential surface 81 of the holder holding part 38 may be constituted by the compound curved surface.

Figure 10A:
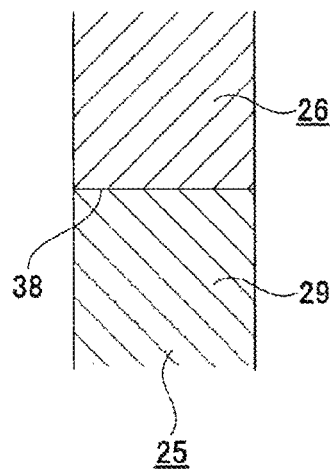
FIGS. 10A to 10C are cross-sectional diagrams illustrating three examples of shapes of the outer circumferential surface of the inner diameter side holder and the inner circumferential surface of the outer diameter side holder.
Figure 10B:
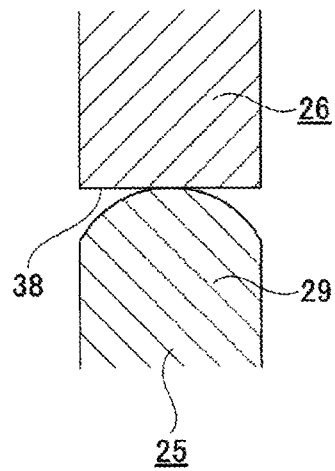
Figure 10C:
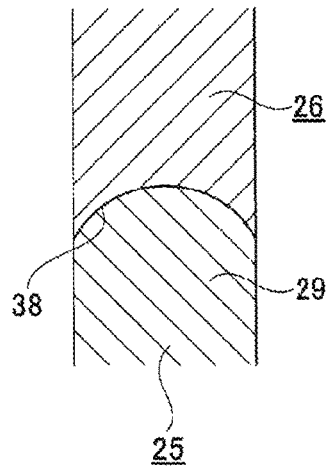

Further, in the embodiment, a cross-sectional shape (a bus line shape) in the axial direction of the inner circumferential surface of the holder holding part 38 and the outer circumferential surface of the inner diameter side holder 25 is a linear shape as illustrated in FIG. 10A. However, as illustrated in FIG. 10B, the bus line shape of the outer circumferential surface of the inner diameter side holder 25 can be a partially circular arc shape in which the intermediate part in the axial direction is curved in a direction of protruding outwards in the diameter direction, and thus sliding friction between the inner circumferential surface of the holder holding part 38 and the outer circumferential surface of the inner diameter side holder 25 can be also reduced. Alternatively, as illustrated in FIG. 10C, the bus line shape of the outer circumferential surface of the inner diameter side holder 25 may be the partially circular arc shape in which the intermediate part in the axial direction is curved in the direction of protruding outwards in the diameter direction, and the bus line shape of the inner circumferential surface of the holder holding part 38 may be a partially circular arc shape in which the intermediate part in the axial direction is curved in a direction of being recessed inwards in the diameter direction. When the bus line shapes of the inner circumferential surface of the holder holding part 38 and the outer circumferential surface of the inner diameter side holder 25 are formed as illustrated in FIG. 10C, the inner diameter side holder 25 and the outer diameter side holder 26 can be prevented from shifting in the axial direction.

Figure 11:
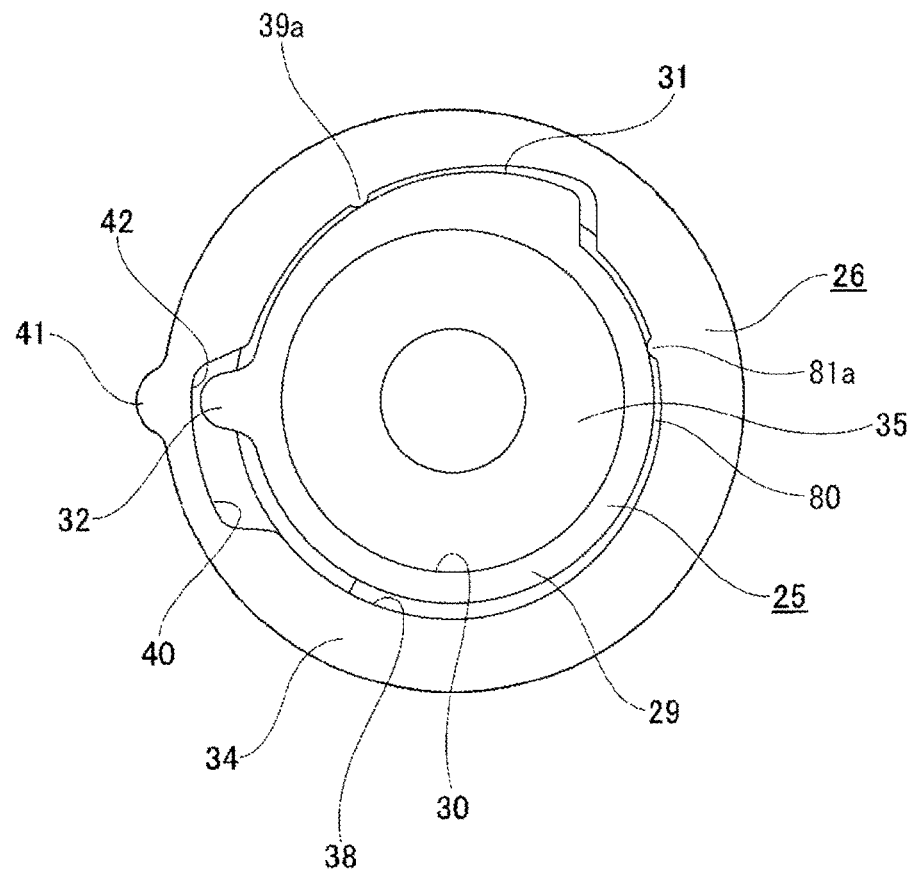
FIG. 11 is an end surface diagram illustrating a modified example of an inner circumferential surface of a holder holding part where an outer dimeter side cam part of the outer diameter side holder and a portion near one end in the circumferential direction abut on each other.
Figure 14:
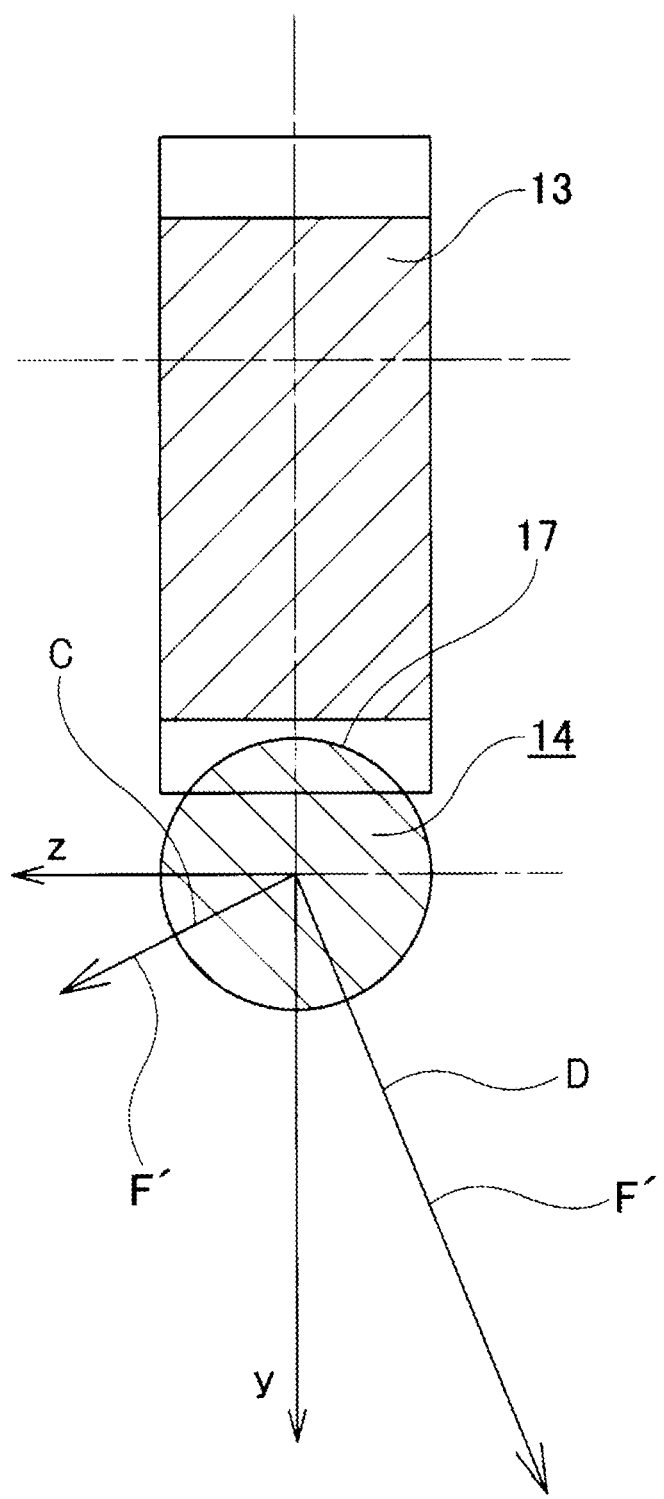
FIG. 14 is a diagram corresponding to FIG. 13B illustrating a direction of a meshing reaction force in two directions applied to the worm from the worm wheel when the electric motor is rotationally driven in both directions.

Further, as illustrated in a modified example of FIG. 11, on the inner circumferential surface of the holder holding part 38 of the outer diameter side holder 26, circular-arc shaped protruding parts 39a and 81a may be formed at a portion on which the inner diameter side cam part 31 of the inner diameter side holder 25 abuts, and a portion on which the portion 80 near one end in the circumferential direction abuts. In this case, when the inner diameter side holder 25 rotates in the other circumferential direction (the counter-clockwise direction shown in FIG. 9), respective phases of an abutting part between the inner diameter side cam part 31 and the circular-arc shaped protruding part 39a, and the other abutting part between the portion 80 near one end in the circumferential direction of the inner diameter side holder 25 and the circular-arc shaped protruding part 81a of the holder holding part 38 are almost not changed.

That is, in this example, the inner diameter side holder 25 has the inner diameter side cam part 31 constituting the inner diameter side curved surface part of the present invention in the same manner as that of the embodiment, and on the other hand, when the inner diameter side holder 25 rotates in the circumferential direction with respect to the outer diameter side holder 26, the circular-arc shaped protruding part 39a constituting the outer diameter side curved surface part of the present invention in contact with the inner diameter side cam part 31 is provided at a portion opposite to the inner diameter side cam part 31 among the inner circumferential surfaces of the holder holding part 38 of the outer diameter side holder 26.

An engagement protruding part 41 protruding outwards in the diameter direction is provided at one position in the circumferential direction among the outer circumferential surfaces of the outer diameter side cylindrical part 34.

A side plate part 35 having an approximately annular plate shape is provided in a state of being bent inwards in the diameter direction from one side edge in the axial direction of the outer diameter side cylindrical part 34. A partial circular-arc shaped through hole 42 for inserting the displacement side pin part 33 of the inner diameter side holder 25 is provided at one position in the circumferential direction aligned with the recessed part 40 among portions near an outer diameter of the side plate part 35. A tip part of the displacement side pin part 33 protrudes from one side surface in the axial direction of the side plate part 35 through the through hole 42 in a state where the inner diameter side holder 25 is internally fitted and held in the holder holding part 38.

The inner diameter side cylindrical part 36 having an approximately cylindrical shape is provided in a state of being bent toward one side in the axial direction from an inner circumferential edge of the side plate part 35. A positioning protruding part 43 protruding outwards in the diameter direction is provided at a portion where a phase in the circumferential direction coincides with the meshing part among the outer circumferential surfaces of the inner diameter side cylindrical part 36.

The pair of protruding piece parts 37a and 37b are provided in a state of protruding toward one side in the axial direction from two positions on the opposite side in the first direction D1 among the outer circumferential edge parts of one side surface in the axial direction of the side plate part 35. In other words, a cylindrical part is provided in a state of protruding toward one side in the axial direction at the outer circumferential edge part of one side surface in the axial direction of the side plate part 35. Among the cylindrical parts, notch parts are provided at two positions on the opposite sides with respect to a second direction D2 (a left-and-right direction in FIGS. 1, 3, 7, and 9) which is parallel to the center axis of the worm wheel 13 and orthogonal to the center axis of the worm 14, and the pair of protruding piece parts 37a and 37b are provided at portions separated from the notch parts among the cylindrical parts. The outer diameter of the outer circumferential surface of one protruding piece part 37a (an upper side in FIG. 1) of the pair of protruding piece parts 37a and 37b is smaller than the outer diameter of the outer diameter side cylindrical part 34 by the thickness of the leaf spring 27 or more. On the other hand, the outer diameter of the other protruding piece part 37b (a lower side in FIG. 1) of the pair of protruding piece parts 37a and 37b is the same as the outer diameter of the outer diameter side cylindrical part 34. That is, the outer circumferential surface of the other protruding piece part 37b and the outer circumferential surface of the outer diameter side cylindrical part 34 exist on the same cylindrical surface. A pedestal part 44 bent inwards in the diameter direction is provided at the other end part in the circumferential direction of the other protruding piece part 37b.

The outer diameter side holder 26 is internally fitted to the holding recessed part 24 of the worm housing part 16a in a state where the displacement in the first direction D1 and the second direction D2 is possible and the rotation with respect to the worm housing part 16a is substantially inhibited to a degree that the displacement in the first direction D1 and the second direction D2 is not disturbed. A gap for allowing the displacement of the outer diameter side holder 26, based upon the meshing reaction forces applied to the worm 14 during the operation of the worm reduction gear at opposite side portions in the second direction D2 and the end part on the side far from the meshing part between the worm teeth 17 and the wheel teeth 48 in the first direction D1 is provided between the outer circumferential surface of the outer diameter side holder 26 and the inner circumferential surface of the holding recessed part 24. Specifically, a shape of the holding recessed part 24 when viewed from the axial direction is an elliptical shape or an oval shape in which a long diameter thereof coincides with the first direction D1 and a short diameter thereof coincides with the second direction D2. The short diameter becomes larger than an outer diameter of an outer circumferential surface of a portion deviated from the engagement protruding part 41 in the outer diameter side holder 26. However, the shape of the holding recessed part 24 when viewed from the axial direction can be a circular shape, the inner diameter of which is larger than the outer diameter of the outer circumferential surface of the portion deviated from the engagement protruding part 41 in the outer diameter side holder 26. An engagement recessed part 45 recessed outwards in the diameter direction is provided at one position in the circumferential direction of the holding recessed part 24. The engagement recessed part 45 and the engagement protruding part 41 of the outer diameter side holder 26 are loosely engaged with each other, thereby substantially preventing the rotation of the outer diameter side holder 26 with respect to the worm housing part 16*a*.

The leaf spring 27 is formed by bending an elastic metal plate into a partial cylindrical shape, and is sandwiched between the holding recessed part 24 and the outer circumferential surface of one protruding piece part 37*a* in a state of being elastically compressed in the diameter direction of the rolling bearing 18*c* on the tip side. That is, opposite ends in the circumferential direction of the leaf spring 27 are elastically pressed against the inner circumferential surface of the holding recessed part 24, and the center part in the circumferential direction of the leaf spring 27 is elastically pressed against the outer circumferential surface of one protruding piece part 37. Accordingly, when the tip part of the worm 14 is displaced in a direction separating from the worm wheel 13 in the first direction D1 based upon the meshing reaction force applied to the worm 14 from the meshing part between worm teeth 17 and the wheel teeth 48, a force (elasticity) that elastically presses the tip part of the worm 14 in the first direction D1, that is, toward the worm wheel 13 in a far and near moving direction of the worm wheel 13 is imparted to the tip part of the worm 14 by the leaf spring 27. Further, a spring constant of the leaf spring 27 is set to be sufficiently small.

In the worm reduction gear of the embodiment, a meshing reaction force is not applied to the worm 14 from the meshing part between the worm teeth 17 and the wheel teeth 48, that is, an assembly position of the outer diameter side holder 26 with respect to the holding recessed part 24 is adjusted so that the outer circumferential surface of the outer diameter side holder 26 and the inner circumferential surface of the holding recessed part 24 abuts on a portion (lower end parts in FIGS. 1 and 3) where a phase in the circumferential direction coincides with the meshing part in a state where the electric motor 10 is not rotationally driven.

A torsion coil spring 28 is formed by bending and molding a metal wire, and includes a coil part 46 and a pair of arm parts 47*a* and 47*b*. The inner diameter side cylindrical part 36 of the outer diameter side holder 26 is inserted through the coil part 46. One arm part 47*a* of the pair of arm parts 47*a* and 47*b* is pressed against one side surface in the circumferential direction of the displacement side pin part 33 of the inner diameter side holder 25, and the other arm part 47*b* is pressed against the other side surface in the circumferential direction of the pedestal part 44 of the other protruding piece part 37*b*. When the displacement side pin part 33 is elastically pressed in the other circumferential direction by one arm part 47*a*, the inner diameter side holder 25 is elastically urged against the outer diameter side holder 26 in a direction of rotating in the other circumferential direction. An elastic force in the direction of rotating the inner diameter side holder 25 in the other circumferential direction with respect to the outer diameter side holder 26 is converted into a force which elastically presses the inner diameter side holder 25 and the tip part of the worm 14 against the side of the worm wheel 13 in the diameter direction by the engagement between the inner diameter side cam part 31 of the inner diameter side holder 25 and the outer diameter side cam part 39 of the outer diameter side holder 26. That is, when the inner diameter side holder 25 rotates in the other circumferential direction with respect to the outer diameter side holder 26, and a portion where the outer diameter of the inner diameter side cam part 31 is large abuts on a portion where the inner diameter of the outer diameter side cam part 39 is small, the inner diameter side holder 25 is pressed against the side of the worm wheel 13 in the first direction D1. Further, in a state where the torsion coil spring 28 applies elasticity, a tip part of the positioning protruding part 43 of the inner diameter side cylindrical part 36 abuts on the inner circumferential surface of the coil part 46. In other words, the abutting part between the outer circumferential surface of the inner diameter side cylindrical part 36 and the inner circumferential surface of the coil part 46 is determined to be positioned by the positioning protruding part 43 provided on the inner diameter side cylindrical part 36.

In the embodiment, a right-handed twisted one is used for the worm teeth 17, a right-handed winding one is used as the torsion coil spring 28, and a rotating direction of the inner diameter side holder 25 is the counterclockwise direction in FIGS. 1, 3, 7 and 9. However, a twisting direction of the worm teeth 17, a winding direction of the torsion coil spring 28, and the rotating direction of the inner diameter side holder 25 can be designed by combining the respective arbitrary directions.

Further, in the embodiment, the elasticity of the torsion coil spring 28 is adjusted so that meshing resistance at the meshing part between the worm teeth 17 and the wheel teeth 48 does not become excessively large, and thus a force for elastically pressing the tip part of the worm 14 against the side of the worm wheel 13 in the first direction D1 is sufficiently reduced based upon the elasticity of the torsion coil spring 28.

In the worm reduction gear of the embodiment, the inner diameter side cam part 31, the outer diameter of which becomes larger as moving toward one circumferential direction is provided at a portion positioned on the side far from the meshing part between the worm teeth 17 and the wheel teeth 48 in the first direction D1 on the outer circumferential surface of the inner diameter side holder 25. Further, the outer diameter side cam part 39, the inner diameter of which becomes larger as moving toward one circumferential direction, and the curvature of the inner diameter of which is smaller than the curvature of the outer diameter of the inner diameter side cam part 31, is provided at a portion facing the inner diameter side cam part 31 on the inner circumferential surface of the outer diameter side holder 26. Accordingly, the torsion coil spring 28 is capable of converting a force which elastically urges the inner diameter side holder 25 against the outer diameter side holder 26 in a direction of rotating in the other side circumferential direction into a force which elastically urges the inner diameter side holder 25 and the tip part of the worm 14 against the side of the worm wheel 13 in the first direction D1. Accordingly, a backlash at the meshing part between the worm teeth 17 and the wheel teeth 48 can be suppressed, and a variation of a meshing position between the worm teeth 17 and the wheel teeth 48 can be suppressed regardless of the dimensional errors and assembly errors of the respective members constituting the worm reduction gear, and wear of the teeth surfaces of the wheel teeth 48 and the worm teeth 17. That is, when the dimensional errors and assembly errors occur at the respective members constituting the worm reduction gear, and the teeth surfaces of the wheel teeth 48 and the worm teeth 17 are worn out, the inner diameter side holder 25 is displaced in the first direction D1 based upon the elasticity of the torsion coil spring 28, and thus a deviation of the meshing position between the wheel teeth 48 and the worm teeth 17 is corrected. Therefore, in the worm reduction gear of the embodiment, even though dimensional accuracy and assembly accuracy of the respective members constituting the worm reduction gear are not particularly high, the above-mentioned dimensional errors and assembly errors can be effectively absorbed, thereby suppressing the variation of the meshing position between the worm teeth 17 and the wheel teeth 48, and further, even when the teeth surfaces of the wheel teeth 48 are worn out, the variation of the meshing position is prevented. As a result, it is possible to effectively prevent generation of a teeth striking sound at the meshing part between the worm teeth 17 and the wheel teeth 48.

Figure 40:
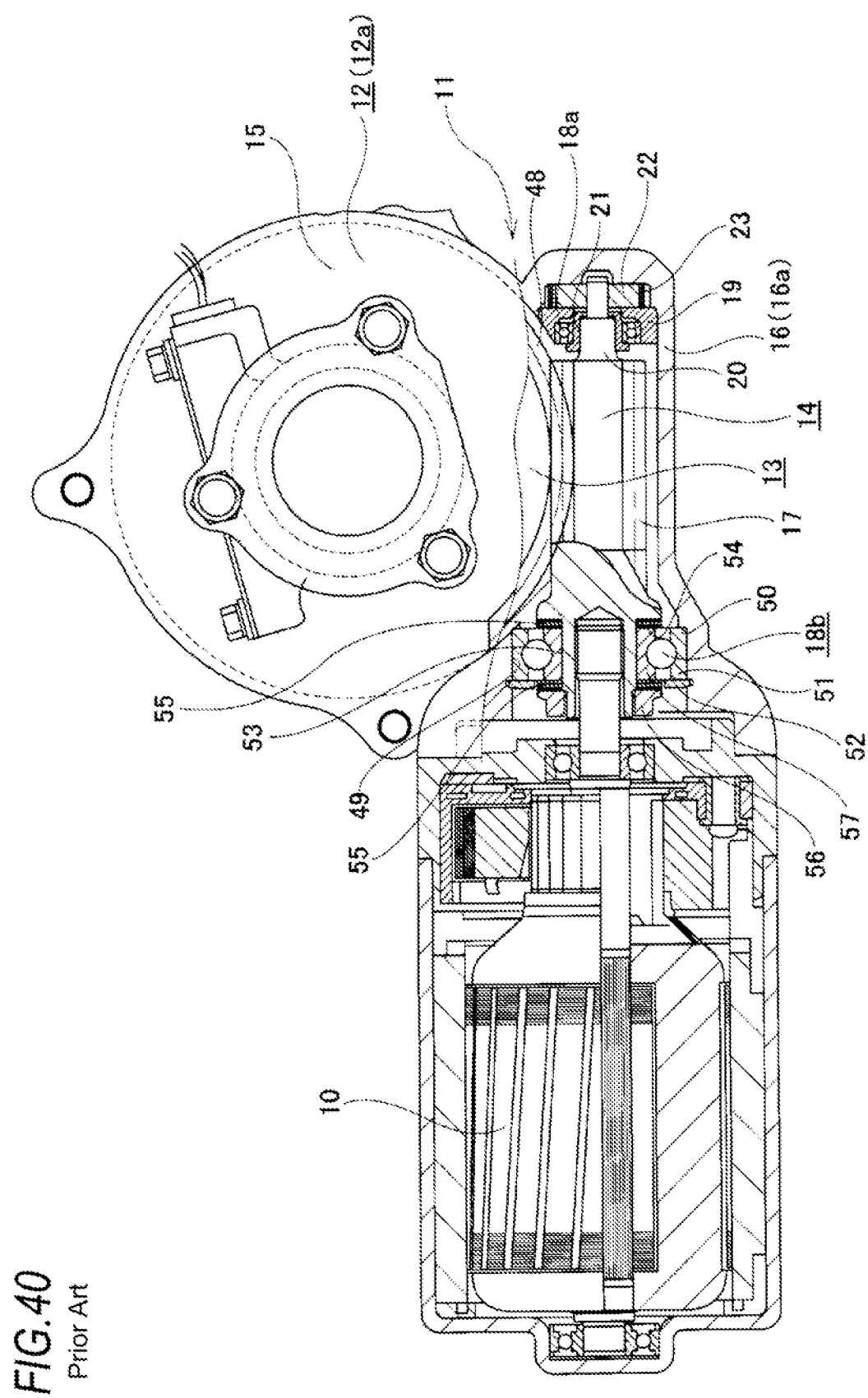
FIG. 40 is an enlarged cross-sectional diagram taken along the line e-e of FIG. 39.

Meanwhile, in a structure of the related art shown in FIG. 40, in order to adjust a force which elastically presses the tip part of the worm 14 against the side of the worm wheel 13 in the direction orthogonal to the center axis of the worm wheel 13 and the center axis of the worm 14 to an appropriate magnitude by the torsion coil spring 23, it is necessary to sufficiently secure the dimensional accuracy and assembly accuracy of the respective members constituting the worm reduction gear 11, and thus the manufacturing cost of the worm reduction gear 11 may increase. That is, in the worm reduction gear 11 in the related art, the holder 19 is press-fitted into the inside of the worm housing part 16 of the housing 12, and the outer ring of the rolling bearing 18a on the tip side is press-fitted into the holder 19. The inner ring of the rolling bearing 18a on the tip side is externally fitted into the bush 21 without a gap, and the bush 21 is externally fitted into the large diameter part 20 of the worm 14 through a minute gap in the diameter direction. The torsion coil spring 23 is provided between the preload pad 22 which is press-fitted into the tip part of the worm 14 and the holder 19. The tip part of the worm 14 is elastically pressed against the side of the worm wheel 13 in the first direction D1 by the torsion coil spring 23, whereby the backlash is suppressed. Accordingly, when a dimension in the diameter direction of the minute gap in the diameter direction varies due to the dimensional errors and assembly errors of the respective members constituting the worm reduction gear 11, there exists a possibility that the force elastically pressing the tip part of the worm 14 against the side of the worm wheel 13 cannot be adjusted to the appropriate magnitude.

In the worm reduction gear of the present invention, provided are gaps for allowing the outer diameter side holder 26 to be displaced based upon the meshing reaction force applied to the worm 14 during the operation of the worm reduction gear at the opposite side portions in the second direction D2 and the end part on the side far from the meshing part between the worm teeth 17 and the wheel teeth 48 in the first direction D1 between the outer circumferential surface of the outer diameter side holder 26 and the inner circumferential surface of the holding recessed part 24. Therefore, when the meshing reaction force is applied to the worm 14 from the meshing part between the worm teeth 17 and the wheel teeth 48 during the operation of the worm reduction gear, the tip part of the worm 14 is displaced in the direction separating from the worm wheel 13 in the first direction D1 while elastically pressing the leaf spring 27, based upon the existence of the gap at the portion positioned at the end part on the side far from the meshing part in the first direction out of the above-mentioned gaps. Accordingly, a meshing state between the wheel teeth 48 and the worm teeth 17 is appropriately maintained. Further, in the embodiment, the leaf spring 27 is sandwiched between the outer circumferential surface of one protruding piece part 37a and the inner circumferential surface of the holding recessed part 24. Therefore, when the operation of the worm reduction gear is stopped and the meshing reaction force is not applied to the worm 14 from the meshing part, the worm 14 is pressed against the side of the worm wheel 13 in the first direction D1 by the leaf spring 27, whereby the worm 14 returns to an original position. That is, the outer circumferential surface of the outer diameter side holder 26 and the inner circumferential surface of the holding recessed part 24 abut on each other at a portion where the phase in the circumferential direction coincides with the meshing part between the worm teeth 17 and the wheel teeth 48. Accordingly, out of the above-mentioned gaps, the gap at the portion positioned at the end part on the side far from the meshing part in the first direction D1 can be maintained for a long period of time.

Further, an amount in which the tip part of the worm 14 can be displaced in the first direction D1 depends on a gap dimension in the diameter direction at the portion positioned at the end part on the side far from the meshing part between the worm 17 and the wheel teeth 48 in the first direction D1, out of the gaps between the outer circumferential surface of one protruding piece part 37a and the inner circumferential surface of the holding recessed part 24. As described in the structure of the related art shown in FIG. 40, management (adjustment) of the dimension in the diameter direction can be easily performed in comparison with a case in which a size of the minute gap provided over the entire periphery between the outer circumferential surface of the large diameter part 20 and the inner circumferential surface of the bush 21 is managed. That is, in the structure of the related art, when the meshing position between the worm teeth 17 and the wheel teeth 48 varies based upon the dimensional errors and the assembly errors of the worm 14 and the worm wheel 13, or the assembly error of the holder 19 with respect to the housing 12 becomes large, there exists a possibility that it becomes difficult to secure the dimension of the minute gap in the diameter direction at the portion positioned at the end part on the side far from the meshing part between the worm teeth 17 and the wheel teeth 48 in the first direction D1, out of the above-mentioned minute gaps. On the other hand, in the embodiment, securing the dimension of the gap in the diameter direction at the portion positioned at the end part on the side far from the meshing part between the wheel teeth 48 and the worm teeth 17 in the first direction D1 out of the above-mentioned minute daps can be achieved by adjusting the assembly position of the outer diameter side holder 26 with respect to the holding recessed part 24. Accordingly, it is relatively easy to secure an amount displacement of the tip end part of the worm 14 in the first direction D1, such that an increase in the manufacturing cost of the worm reduction gear can be suppressed.

In the embodiment, since the spring constant of the leaf spring 27 is sufficiently small, a change of the meshing resistance in the meshing part can be reduced regardless of a change in a distance between the center axes of the worm wheel 13 and the worm 14 caused by rotating speed of the worm wheel 13 and the worm 14, a magnitude of the torque transmitted from the meshing part between the worm teeth 17 and the wheel teeth 48, and a temperature change inside the housing 12a.

In the embodiment, the gaps between the virtual straight lines $\beta_1$ and $\beta_2$ orthogonal to the directions of the meshing reaction forces $f_{r1}$ and $f_{r2}$ and the tangent lines $\gamma_1$ and $\gamma_2$ on the inner circumferential surface of the holder holding part 38 at the abutting part with the outer circumferential surface of the inner diameter side holder 25 becomes wider as moving toward the front side in the rotating direction of the inner diameter side holder 25. Therefore, out of the forces in which the tip part of the worm 14 is elastically pressed against the side of the worm wheel 13 in the first direction D1, even though the force based upon the elasticity of the torsion coil spring 28 is smaller than the force based upon the elasticity of the leaf spring 27, the inner diameter side holder 25 is prevented from rotating in one circumferential direction with respect to the outer diameter side holder 26 by the meshing reaction forces $f_{r1}$ and $f_{r2}$. In short, a change in a meshing distance based upon the meshing reaction forces $f_{r1}$ and $f_{r2}$ is absorbed only by elastic deformation of the leaf spring 27, such that the torsion coil spring 28 can be prevented from elastically being deformed by the change in the distance.

In the embodiment, the inner diameter side cam part 31 is provided on the outer circumferential surface of the inner diameter side holder 25, and the outer diameter side cam part 39 is provided on the inner circumferential surface of the holder holding part 38. Therefore, the outer circumferential surface of the inner diameter side holder 25 and the inner circumferential surface of the holder holding part 38 abut on each other (sliding contact) at two positions on both sides sandwiching a virtual plane $\alpha$ (refer to FIG. 1) including the meshing part between the worm teeth 17 and the wheel teeth 48 and the center axis of the worm 14. In particular, in the worm reduction gear, the abutting part (sliding contact) between the inner circumferential surface of the holder holding part 38 and the outer circumferential surface of the inner diameter side holder 25 is provided so that the directions of the meshing reaction forces $f_{r1}$ and $f_{r2}$ applied to the worm 14 are positioned in a region X of an inferior angle formed by two lines connected to the center axis $O_{14}$ of the worm 14. Accordingly, when the meshing reaction forces $f_{r1}$ and $f_{r2}$ are inputted, the reaction forces can be always received by the abutting parts at the two positions. Meanwhile, when the meshing reaction forces $f_{r1}$ and $f_{r2}$ exist outside the region X, the reaction forces are received only by the abutting part at one position, and thus one abutting part and the other abutting part are separated from each other.

Accordingly, the meshing reaction forces $f_{r1}$ and $f_{r2}$ are surely transmitted to the outer diameter side holder 26 regardless of the rotating direction of the worm 14, whereby the meshing reaction forces $f_{r1}$ and $f_{r2}$ can be supported more effectively by the housing 12a through the outer diameter side holder 26 and the leaf spring 27. Further, a component in the first direction D1 orthogonal to the center axis of the worm wheel 13 and the center axis of the worm 14 as well as a component in the second direction D2 orthogonal to the first direction D1 are included in the meshing reaction force applied to the worm 14 from the meshing part between the worm teeth 17 and the wheel teeth 48. What is described above will now be hereinafter described with reference to FIGS. 12A to 14.

The worm teeth 17 of the worm 14 are spirally formed on the outer circumferential surface of the intermediate part in the axial direction of the worm 14. Therefore, when the worm 14 is rotated and driven and a driving force is transmitted from the worm 14 to the worm wheel 13, the meshing reaction forces including components in three directions of x, y, and z in FIGS. 12A to 13B are applied to the worm 14 from the worm wheel 13. In the cases shown in FIGS. 12A to 13B, the magnitudes of the driving forces applied to the worm 14 are the same as each other, but action directions of the driving forces, that is, the rotating directions of the worm 14, are opposite to each other. Therefore, the worm wheels 13 in the cases shown in FIGS. 12A to 13B are rotated in mutually opposite directions. When the worm 14 is rotated and driven, apparent meshing reaction forces having component forces of $F_x$, $F_y$, and $F_z$ which are components in three directions of x, y, and z in FIGS. 12A to 13B are respectively applied to the worm 14 from the worm wheel 13 at the meshing part between the wheel teeth 48 and the worm teeth 17. The components $F_x$ and $F_z$ among the components $F_x$, $F_y$, and $F_z$ become opposite to each other in direction between a case in which the worm wheel 13 rotates in one direction (a direction indicated by an arrow mark A in FIG. 12A) as illustrated in FIGS. 12A and 12B, and a case in which the worm wheel 13 rotates in the other direction (a direction indicated by an arrow mark B in FIG. 13A) as illustrated in FIGS. 13A and 13B.

On the other hand, when a distance between the meshing part between the worm teeth 17 and the wheel teeth 48 and a swing center o of the worm 14 in the diameter direction of the worm 14 is defined as $d_{14}$, moment M having a magnitude of $d_{14} \cdot F_x$ acts on the worm 14. Therefore, when a distance between the meshing part and the swing center o in the axial direction of the worm 14 is defined as $L_{14}$, a force $F_r$ having a magnitude of $M/L_{14}$ based upon the moment M acts on the worm 14 in the diameter direction (an upper direction in FIGS. 12A and 12B and a lower direction in FIGS. 13A and 13B). The acting directions of the forces $F_r$ are opposite to each other in the cases shown in FIGS. 12A to 13B. Therefore, as illustrated in FIGS. 12A and 12B, when the worm wheel 13 rotates in one direction, a magnitude of an actual force $F_y'$ in a y-direction considering the moment M, which acts on the worm 14 from the worm wheel 13 at the meshing part between the worm teeth 17 and the wheel teeth 48, becomes $F_y'=F_y-F_r$ and thus becomes small, whereby as illustrated in FIGS. 13A and 13B, when the worm wheel 13 rotates in the other direction, the magnitude thereof becomes $F_y'=F_y+F_r$, and thus becomes large. Accordingly, when the worm wheel 13 rotates in one direction, an actual resultant force F' of the meshing component force in the y and z directions acting on the meshing part becomes small as illustrated by an arrow mark C in FIG. 14, and when the worm wheel 13 rotates in the other direction, the resultant force F' thereof becomes large as illustrated by an arrow mark D in FIG. 14. As can be seen from the direction of the resultant force F', even when the worm wheel 13 rotates in any direction, it is found out that the components with respect to the first direction D1 (an up-and-down direction in FIGS. 12A to 13B) and the second direction D2 (a front and rear direction in FIGS. 12A and 13A, and a left-and-right direction in FIGS. 12B, 13B, and 14) are included in the meshing reaction force applied to the worm 14 from the meshing part.

The above-mentioned meshing reaction forces $f_{r1}$ and $f_{r2}$ are forces generated at the tip part of the worm 14 based upon the meshing reaction force F' at the meshing part between the worm teeth 17 and the wheel teeth 48 indicated by the arrow marks C and D.

Further, when the worm wheel 13 rotates in one direction, the component force in a virtual plane orthogonal to the center axis of the worm 14 among the meshing reaction forces applied to the worm 14 from the meshing part, for example, 14 acts in the direction of 90° to 135° in the counterclockwise direction in FIG. 9 (about 135° in the case of FIG. 9) in the second direction D2. On the other hand, when the worm wheel 13 rotates in the other direction, the component force in the virtual plane orthogonal to the center axis of the worm 14 among the meshing reaction forces applied to the worm 14 from the meshing part, for example, acts in the direction of 0° to 45° in the counterclockwise direction in FIG. 9 (about 15° in the case of FIG. 9) in the second direction D2.

In the embodiment, the approximately center position in the circumferential direction of the inner diameter side cam part 31 abuts on the outer diameter side cam part 39, and the portion 80 near one end in the circumferential direction of the half part on the side far from the meshing part between the worm teeth 17 and the wheel teeth 48 in the first direction D1 in the inner diameter side holder 25 abuts on the inner circumferential surface 81 of the holder holding part 38. Accordingly, the meshing reaction forces applied to the worm 14 from the meshing part are surely transmitted to the outer diameter side holder 26 regardless of the rotating direction of the worm 14, whereby the meshing reaction forces can be supported more effectively by the housing 12a.

Further, in the worm reduction gear in the embodiment, in a state where the meshing reaction force is not applied to the worm 14 from the meshing part, a part where the phase in the circumferential direction coincides with the meshing part abuts on the inner circumferential surface of the holding recessed part 24 among the outer circumferential surfaces of the outer diameter side holder 26, and the leaf spring 27 is sandwiched between the holding recessed part 24 and the outer circumferential surface of one protruding piece part 37a. Therefore, when the rotating direction of the output shaft of the electric motor 10 is changed, the displacement of the tip part of the worm 14 in the second direction D2 is suppressed to be smaller in comparison with that of the structure described in the FIG. 40, whereby it is possible to more surely suppress the generation of the teeth striking sound at the meshing part.

When assembling the worm reduction gear of the embodiment, the base end part of the worm 14 is first supported in the worm housing part 16a of the housing 12a so as to be able to be rotated and slightly shaken by the rolling bearing 18b on the base end side. Next, the inner diameter side holder 25 is internally fitted and held in the outer diameter side holder 26, and the coil part 46 of the torsion coil spring 28 is inserted into the inner diameter side cylindrical part 36 of the outer diameter side holder 26, and further, the pair of arm parts 47a and 47b are pressed against the displacement side pin part 33 of the inner diameter side holder 25 and the pedestal part 44 of the outer diameter side holder 26. The leaf spring 27 is pressed against the outer circumferential surface of one protruding piece part 37a along the outer circumferential surface of one protruding piece part 37a of the outer diameter side holder 26. In this state, the outer circumferential surface of the outer diameter side holder 26 is inserted into the holding recessed part 24 from the side of the outer diameter side cylindrical part 34, and further, the outer ring of the rolling bearing 18c on the tip side is pressed into the bearing holding part 30 of the inner diameter side holder 25. Then, the outer diameter side holder 26 is internally fitted and held in the holding recessed part 24 so as to be able to be displaced in the first direction D1 by elastically restoring the leaf spring 27.

Further, an assembly method of the worm reduction gear according to the embodiment is not limited to the method described above. For example, after the rolling bearing 18c on the tip side is pressed into the bearing holding part 30 of the inner diameter side holder 25, the outer diameter side holder 26 can be also inserted into the outer diameter side of the inner diameter side holder 25.

In the worm reduction gear according to the embodiment, the outer diameter of the outer circumferential surface of one protruding piece part 37a is smaller than the outer diameter of the outer diameter side cylindrical part 34 by the thickness of the leaf spring 27 or more, and the leaf spring 27 is formed not to protrude from the outer circumferential surface of the outer diameter side holder 26 in a state where the leaf spring 27 is pressed against the outer circumferential surface of one protruding piece part 37a. Therefore, the work of inserting the outer circumferential surface of the outer diameter side holder 26 into the holding recessed part 24 can be easily performed. Alternatively, the leaf spring 27 may be held between the outer circumferential surface of the outer diameter side cylindrical part 34 and the inner circumferential surface of the holding recessed part 24. In this case, one protruding piece part 37a can be omitted.

When performing the worm reduction gear of the present invention, the elasticity imparting member in the diameter direction which imparts the elasticity in the direction toward the side of the worm wheel 13 in the first direction D1 to the outer diameter side holder 26 is not limited to the leaf spring 27. Further, the outer diameter side holder 26 can be also configured to be elastically pulled to the side of the worm wheel 13 in the first direction D1 by an elastic member provided between the outer diameter side holder 26 and the holding recessed part 24. Alternatively, the elasticity imparting member in the diameter direction may be omitted. In this case, when the tip part of the worm 14 is displaced in the direction separating from the worm wheel 13 in the first direction D1 based upon the meshing reaction force between the worm teeth 17 and the wheel teeth 48 and the operation of the worm reduction gear is stopped, the inner diameter side holder 25 is displaced in the first direction D1 based upon the elasticity of the torsion coil spring 28, thereby compensating a portion where the tip part of the worm 14 is displaced.

The elastic urging member in the circumferential direction which elastically urges the inner diameter side holder 25 against the outer diameter side holder 26 in the direction of rotating in the other circumferential direction is not limited to the torsion coil spring 28. A compression coil spring and an elastomer leaf spring can be used as well. Further, the inner diameter side holder 25 can be configured to be elastically pulled in the direction of rotating in the other circumferential direction by the elastic member provided between the inner diameter side holder 25 and the outer diameter side holder 26.

Further, a bearing for rotatably supporting the tip part of the worm 14 at the holding recessed part 24a of the housing 12a through the inner diameter side holder 25 and the outer diameter side holder 26 is not limited to the rolling bearing 18c, for example, a slide bearing can be also used. When the slide bearing is used as the bearing, the tip part of the worm 14 is pressed into the inner circumferential surface of the slide bearing, and the outer circumferential surface of the slide bearing is internally fitted and held without a rattling noise in the diameter direction by the bearing holding part 30 of the inner diameter side holder 25. Alternatively, the outer circumferential surface of the sliding bearing is press-fitted into the bearing holding part 30 of the inner diameter side holder 25, and the tip part of the worm 14 can be internally fitted to the inner circumferential surface of the sliding bearing without a rattling noise in the diameter direction.

Second Embodiment

A second embodiment of the present invention will be described with reference to FIGS. 15 to 21. In the first embodiment, the torsion coil spring 28 which elastically urges the inner diameter side holder 25 against the outer diameter side holder 26 in the circumferential direction is provided at a portion opposite to the side of the worm wheel 13 (a portion on one side in the axial direction. a left side portion in FIGS. 2, 5 and 6) out of opposite side portions in the axial direction of the rolling bearing 18c on the tip side. On the other hand, the second embodiment is different in that the torsion coil spring 28a is provided at a portion on the side of the worm wheel 13 (a portion on the other side in the axial direction. a right side portion in FIGS. 15 and 16) out of opposite side portions in the axial direction of the rolling bearing 18c on the tip side.

Figure 15:
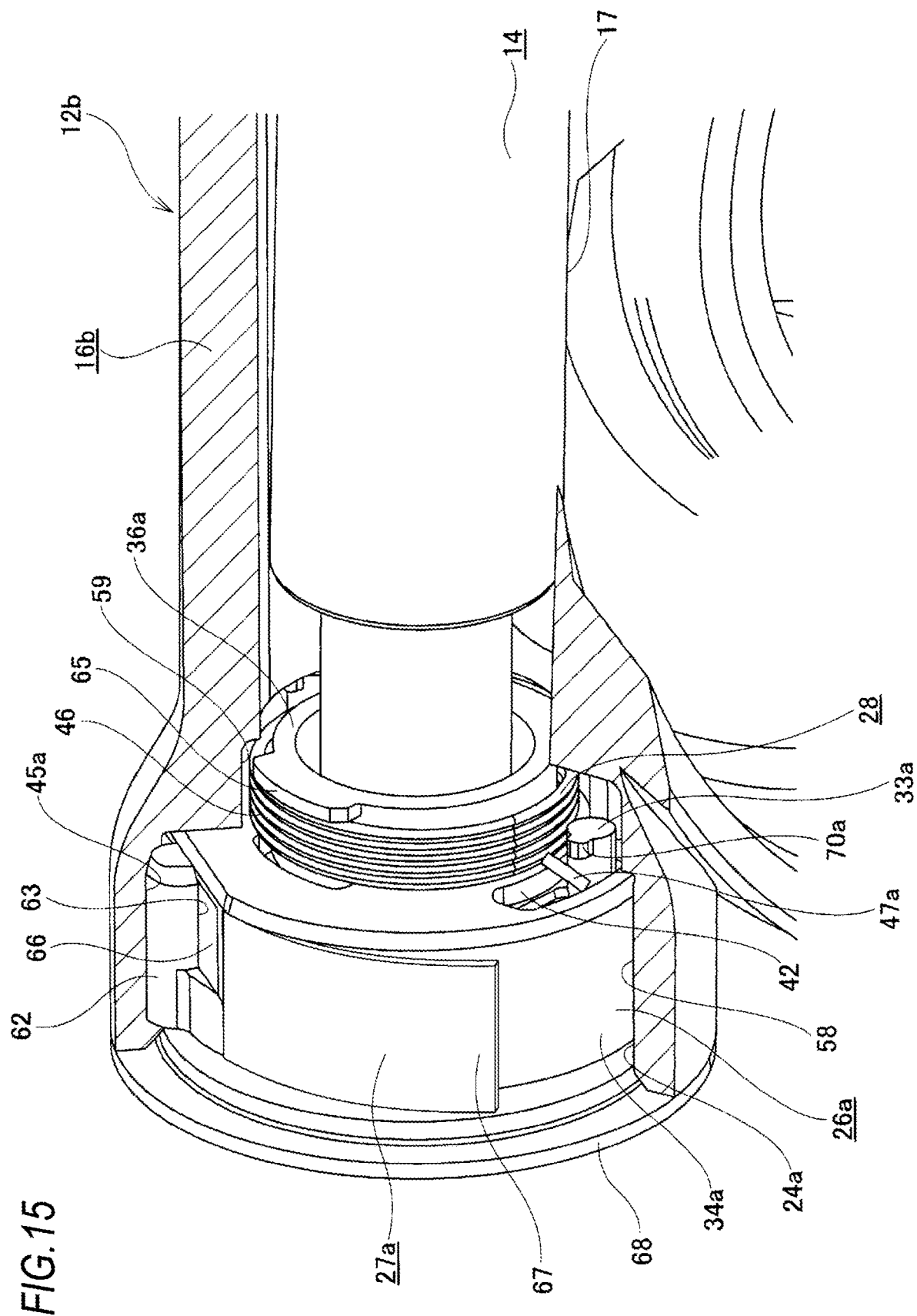
FIG. 15 is a partially cutting perspective diagram illustrating a worm reduction gear according to a second embodiment of the present invention.
Figure 16:
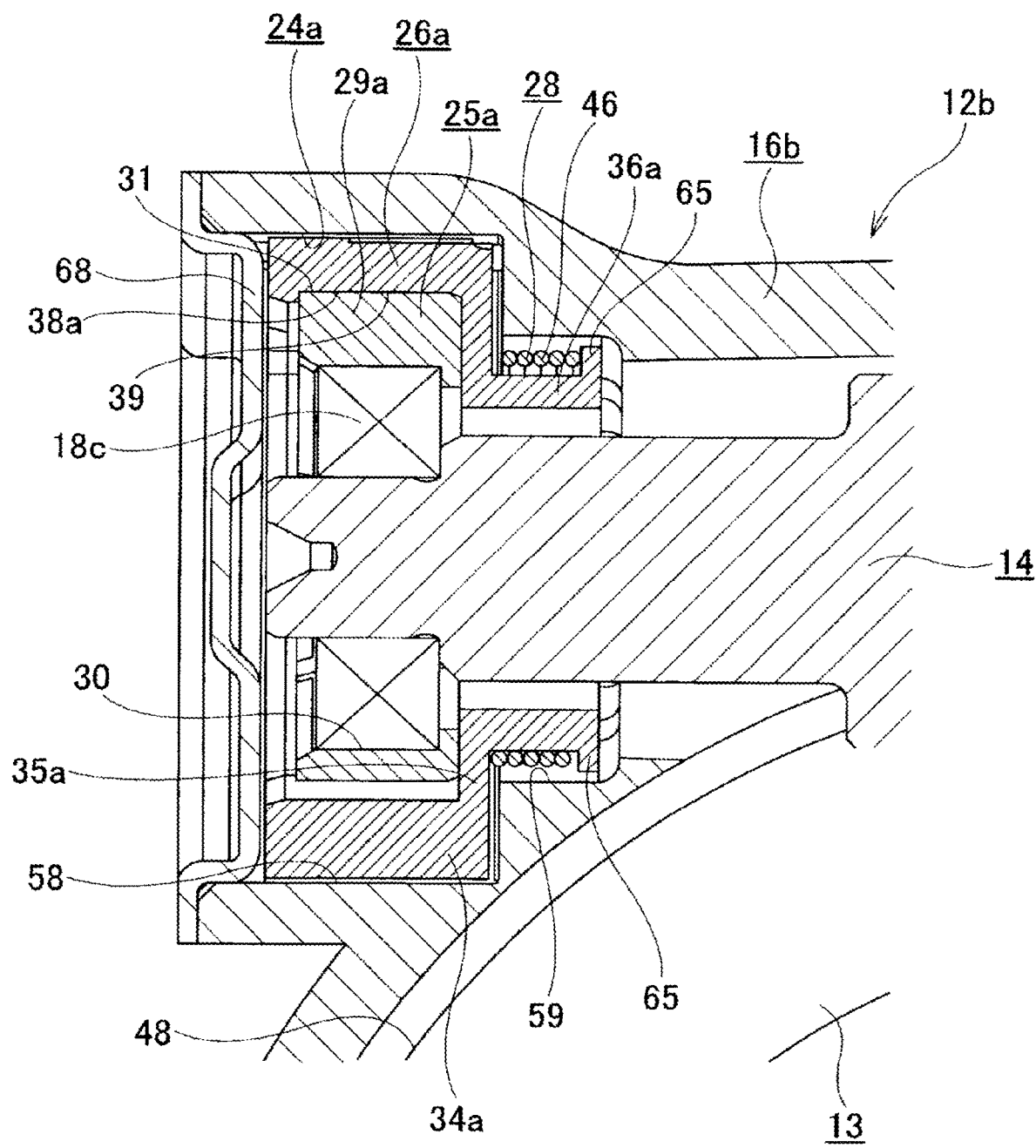
FIG. 16 is a cross-sectional diagram illustrating the worm reduction gear according to the second embodiment of the present invention.
Figure 17:
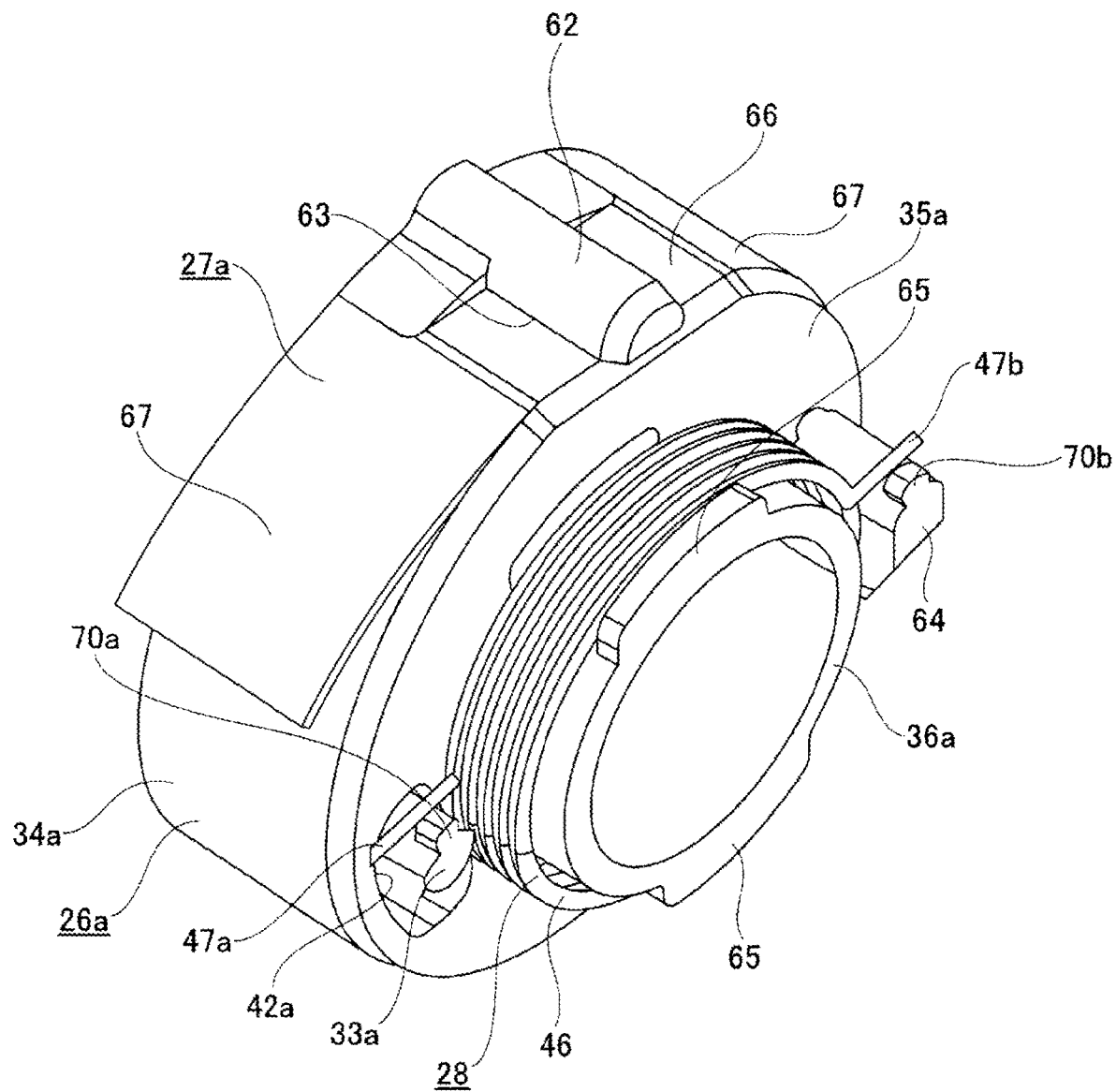
FIG. 17 is a perspective diagram illustrating an inner diameter side holder, an outer diameter side holder, a torsion coil spring, and a leaf spring, all of which are taken out.
Figure 18A:
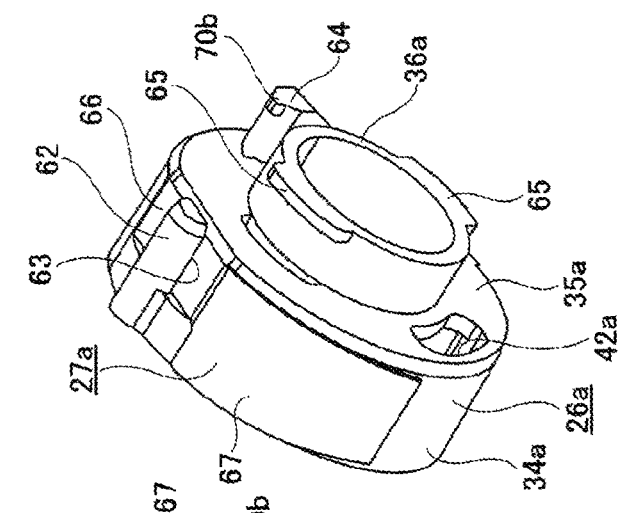
FIGS. 18A to 18C are perspective diagrams illustrating a state in which the leaf spring is mounted on the outer diameter side holder.
Figure 18B:
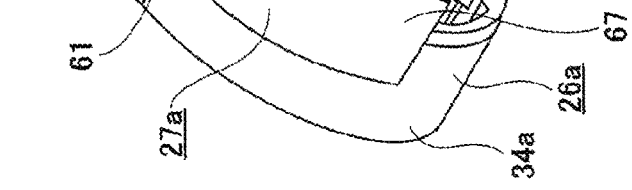
Figure 18C:
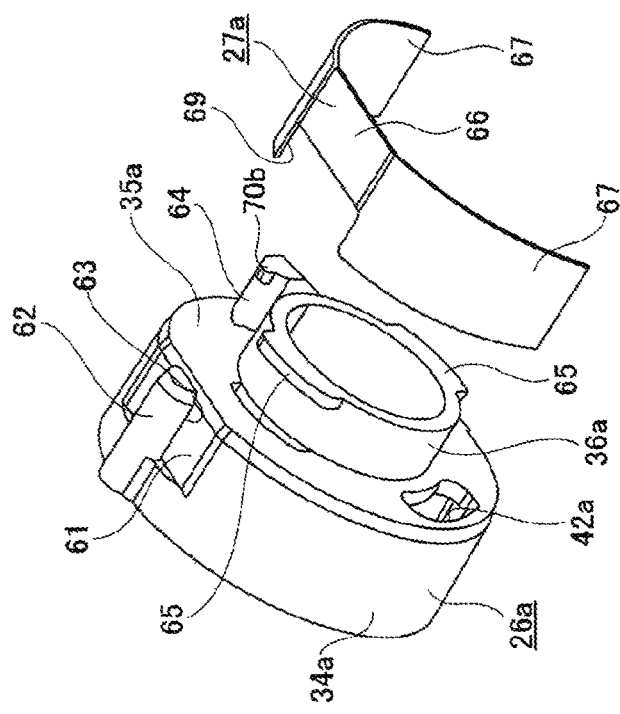

In the embodiment, the holding recessed part 24a is provided on an inner circumferential surface of a worm housing part 16b constituting a housing 12b, and the holding recessed part 24a is constituted of a large diameter part 58 on one side in the axial direction (a left side in FIGS. 15 and 16) and a small diameter part 59 on the other side in the axial direction (a right side in FIGS. 15 and 16). A pair of recessed parts 60a and 60b which are approximately partially circular arc shapes when viewed from the axial direction are provided in a state of being recessed outwards in the diameter direction at two positions on the side opposite to the first direction orthogonal to the center axis of the worm wheel 13 and the center axis of the worm 14 in the small diameter part 59. An inner diameter side holder 25a and an outer diameter side holder 26a and a leaf spring 27a which is the elasticity imparting member in the diameter direction, and the torsion coil spring 28 which is an elastic urging member in the circumferential direction are provided between the holding recessed part 24a and the rolling bearing 18c on the tip side.

The inner diameter side holder 25a is constituted of a synthetic resin, or a light alloy such as an aluminum type alloy or a magnesium type alloy, and a whole structure thereof is formed in an approximately cylindrical shape. The inner diameter side holder 25 is provided with the bearing holding part 30 for internally fitting and holding the outer ring constituting the rolling bearing 18c on the tip side on an inner circumferential surface of a cylindrical holder main body 29a. The inner diameter side cam part 31, the outer diameter of which becomes large as moving toward one circumferential direction is provided at a portion (an upper part in FIGS. 15 to 21) positioned on the side far from the meshing part between the worm teeth 17 and the wheel teeth 48 in the first direction orthogonal to the center axis of the worm wheel 13 and the center axis of the worm 14 among the outer circumferential surfaces of the holder main body 29a. In other words, thickness (thickness in the diameter direction) of a half part (an upper half part in FIGS. 15 to 21) on the side far from the meshing part between the worm teeth 17 and the wheel teeth 48 in the first direction D1 of the holder main body 29a becomes larger as moving toward a portion near one end in the circumferential direction from the other end in the circumferential direction, and the inner diameter side cam part 31 is provided on the outer circumferential surface of the portion.

Further, the portion 80 positioned on the side opposite to the inner diameter side cam part 31 is formed on a compound curved surface where a plurality of curved surfaces having different radii of curvature from each other are smoothly continued among the outer circumferential surfaces of the holder main body 29 in the first direction D1, with respect to the portion 80 near one end in the circumferential direction of the outer circumferential surface of the half part on the side far from the meshing part between the worm teeth 17 and the wheel teeth 48, in other words, with respect to the side far from the meshing part between the wheel teeth 48, and the worm teeth 17, and the surface P passing through the center axis of the worm wheel 13 and the center axis of the worm 14.

The protruding part 32 protruding outwards in the diameter direction is provided at a portion adjacent to the other side in the circumferential direction of the inner diameter side cam part 31 among the outer circumferential surfaces of the holder main body 29a, and a displacement side pin part 33a protruding toward the other side in the axial direction is provided on the other side surface in the axial direction of the protruding part 32 (a right side surface in FIGS. 15 to 18C). Further, a protruding part 70a is provided in a state of being bent from one position of the outer peripheral edge on the tip part of the displacement side pin part 33a.

The outer diameter side holder 26a is constituted of a synthetic resin, or a light alloy such as an aluminum type alloy or a magnesium type alloy, and is provided with an approximately cylindrical outer diameter side cylindrical part 34a, and a side plate part 35a, and an inner diameter side cylindrical part 36a. The outer diameter side cylindrical part 34a is an approximately cylindrical shape, and is provided with a holder holding part 38a for internally fitting and holding the inner diameter side holder 25a so as to be able to be shaken with the center axis of the worm 14 as a center and to be displaced in the first direction D1 on the inner diameter side thereof. The outer diameter side cam part 39, the inner diameter of which becomes larger as moving toward one circumferential direction (a front in a clockwise direction in FIG. 21), and the curvature of the inner diameter of which is smaller than the curvature of the outer diameter of the inner diameter side cam part 31, is provided in the portion facing the inner diameter side cam part 31 on the inner circumferential surface of the holder holding part 38a. In other words, the thickness of the half part on the side far from the meshing part between the worm teeth 17 and the wheel teeth 48 becomes smaller as moving from the other end part in the circumferential direction (a rear end part in the clockwise direction in FIG. 2) toward the portion near the one end in circumferential direction in the first direction D1 of the outer diameter side cylindrical part 34a, and the outer diameter side cam part 39 is provided on the inner circumferential surface of the portion.

The inner circumferential surface 81 that is constituted of a single partial cylindrical surface is formed at a position opposite to the portion 80 near one end in the circumferential direction of the holder main body 29 among the inner circumferential surfaces of the holder holding part 38. The inner circumferential surface 81 is positioned on the side opposite to the outer diameter side cam part 39 with respect to the side far from the meshing part between the wheel teeth 48 and the worm teeth 17, and the surface P passing through the center axis of the worm wheel 13 and the center axis of the worm 14.

The recessed part 40 that is recessed outwards in the diameter direction is provided on a portion adjacent to the other side in the circumferential direction of the outer diameter side cam part 39 on the inner circumferential surface of the holder holding part 38a in a state of being elongated in the circumferential direction. The protruding part 32 is disposed at the inside of the recessed part 40 in a state where the inner diameter side holder 25 is internally fitted and held at the inside of the holder holding part 38. A portion deviated from the outer diameter side cam part 39 and the recessed part 40 has an approximately elliptical shape which is elongated in the first direction when viewed from the axial direction on the inner circumferential surface of the holder holding part 38a. Accordingly, the holder holding part 38a is internally fitted and held in the inner diameter side holder 25a so as to be able to be shaken with the center axis of the worm 14 as a center and to be displaced in the first direction within a range where the protruding part 32 can move in the recessed part 40.

A flat surface part 61 orthogonal to the first direction is provided at the other half part in the axial direction of the end part (an upper end part in FIGS. 15 and 16) on the side far from the meshing part between the worm teeth 17 and wheel teeth 48 in the first direction on the outer circumferential surface of the outer diameter side cylindrical part 34a. Further, a base end part (a half part in the axial direction) of a pressing pin part 62 having a semi-circular shape when viewed from the axial direction is supported at one half part in the axial direction of the end part on the side far from the meshing part in the first direction on the outer circumferential surface of the outer diameter side cylindrical part 34a. A slit 63 is provided between the flat surface part 61 and the inside surface of the tip part (the other half part in the axial direction) of the pressing pin part 62. In other words, the flat surface part 61 and the inside surface of the tip part of the pressing pin part 62 are opposite to each other through a minute gap in the diameter direction. Installation positions of the flat surface part 61 and the pressing pin part 62 may be a portion slightly deviated in the circumferential direction from the end part on the side far from the meshing part between the worm teeth 17 and the wheel teeth 48 in the first direction on the outer circumferential surface of the outer diameter side cylindrical part 34a, in any case, a portion deviated in the circumferential direction from the flat surface part 61 is a single cylindrical surface, the outer diameter of which does not change in the axial direction, on the outer circumferential surface of the outer diameter side cylindrical part 34a.

Further, in the embodiment, in the same manner as that of the first embodiment, an abutting part (sliding contact part) between the inner circumferential surface of the holder holding part 38a and the outer circumferential surface of the inner diameter side holder 25a is provided at two positions. That is, an approximately center position in the circumferential direction of the inner diameter side cam part 31 abuts on the outer diameter side cam part 39. Additionally, the portion 80 near one end in the circumferential direction of the outer circumferential surface of the half part on the side far from the meshing part between the worm teeth 17 and the wheel teeth 48 in the first direction D1 of the inner diameter side holder 25 abuts on the inner circumferential surface 81 of the holder holding part 38. Further, the above-mentioned two abutting parts are provided so that the directions of the meshing reaction forces $f_{r1}$ and $f_{r2}$ applied to the worm 14 are positioned in the region X of the inferior angle formed by two lines connected to the center axis $O_{14}$ of the worm 14 regardless of the circumferential position of the inner diameter side holder 25a with respect to the outer diameter side holder 26a.

Figure 32:
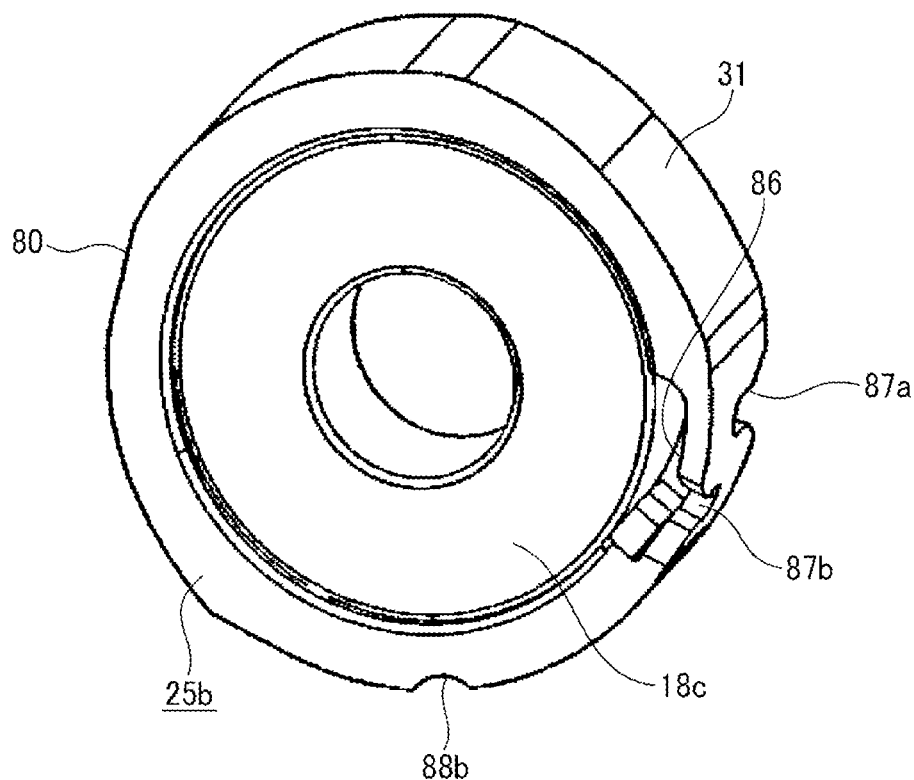
FIG. 32 is a perspective diagram illustrating an inner diameter side holder together with a bearing.
Figure 33:
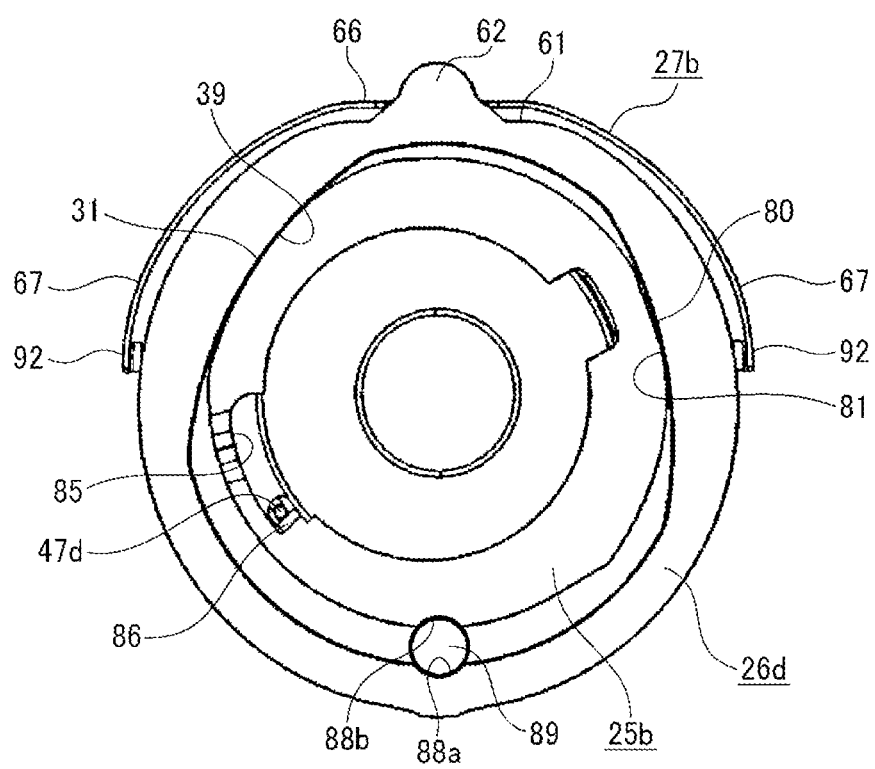
FIG. 33 is an end surface diagram of the worm reduction gear illustrating a state in which a pin is inserted into a groove of the inner diameter side holder and a groove of the outer diameter side holder.

That is, in the same manner as that of the first embodiment, even when the inner diameter side holder 25a rotates in the circumferential direction, respective phases of the abutting part between the inner diameter side cam part 31 and the outer diameter side cam part 39, and the other abutting part between the portion 80 near one end in the circumferential direction of the inner diameter side holder 25a and the inner circumferential surface 81 of the holder holding part 38 are almost not changed. In this case, the inner diameter side holder 25a and the rolling bearing 18c held by the inner diameter side holder 25a are not substantially moved in the left-and-right direction in FIG. 32, but are displaced downward, that is, only displaced toward the side of the worm wheel 13 in the first direction D1.

A side plate part 35a having an approximately annular plate shape is provided in a state of being bent inwards in the diameter direction from the other side edge in the axial direction of the outer diameter side cylindrical part 34a. A circular-arc shaped through hole 42a for inserting the displacement side pin part 33a of the inner diameter side holder 25a is provided at one position in the circumferential direction aligned with the recessed part 40 at a portion near the outer diameter of the side plate part 35a. The tip part of the displacement side pin part 33 protrudes from the other side surface in the axial direction of the side plate part 35a through the through hole 42a in a state where the inner diameter side holder 25a is internally fitted and held in the holder holding part 38a. A stationary side pin part 64 is provided in a state of protruding toward the other side in the axial direction at a portion on the side approximately opposite to the through hole 42a in the diameter direction at a portion near the outer diameter of the other side surface in the axial direction of the side plate part 35a. A protruding part 70b is provided in a state of being bent from one position of the outer peripheral edge on the tip part of the stationary side pin part 64.

The inner diameter side cylindrical part 36a having an approximately cylindrical shape is provided in a state of being bent toward the other side in the axial direction from an inner peripheral edge of the side plate part 35a. A pair of eave parts 65 and 65 are provided at the other end edge in the axial direction of the inner diameter side cylindrical part 36a in a state of being bent outwards in the diameter direction from two positions on the side opposite to the first direction. Further, the outer diameters of the pair of eave parts 65 and 65 are smaller than the inner diameter of the small diameter part 59 of the holding recessed part 24a.

The outer diameter side holder 26a is internally fitted to the holding recessed part 24a of the worm housing part 16b to be able to be displaced in the first direction D1 and the second direction parallel to the center axis of the worm wheel 13 and orthogonal to the center axis of the worm 14, and in a state where the rotation thereof with respect to the worm housing part 16b is substantially inhibited. That is, the outer diameter side cylindrical part 34a is internally fitted to the large diameter part 58, and the inner diameter side cylindrical part 36a is internally fitted to the small diameter part 59 with clearance fitting in a state where a gap is provided between opposite side portions in the second direction and the end part on the side far from the meshing part in the first direction between the outer circumferential surface of the outer diameter side cylindrical part 34*a* and the inner circumferential surface of the large diameter part 58. Further, in this state, the stationary side pin part 64 and the displacement side pin part 33*a* protruding from the other side surface in the axial direction of the side plate part 35*a* through the through hole 42*a* are disposed at the inside of the pair of recessed parts 60*a* and 60*b*. An engagement recessed part 45*a* recessed outwards in the diameter direction is provided at one position in the circumferential direction of the large diameter part 58, and the engagement recessed part 45*a* and the pressing pin part 62 of the outer diameter side holder 26*a* are loosely engaged with each other, thereby substantially inhibiting the rotation of the outer diameter side holder 26*a* with respect to the worm housing part 16*b*.

The leaf spring 27*a* is constituted of an elastic metal plate and is provided with a flat base part 66 and a pair of partially cylindrical arm parts 67 and 67 which is elongated in the circumferential direction from opposite side edges of the base part 66. An axial length of the base part 66 is shorter than an axial length of the pair of arm parts 67 and 67. In other words, a notch part 69 opening to one side edge in the axial direction is provided at the center part in the circumferential direction of the leaf spring 27*a*. The leaf spring 27*a* is supported with respect to the outer diameter side holder 26*a* by inserting the base part 66 into the slit 63 of the outer diameter side holder 26*a*. Further, the curvature of the pair of arm parts 67 and 67 becomes smaller than the curvature of the inner circumferential surface of the large diameter part 58 of the holding recessed part 24*a*. Accordingly, in a state where the outer diameter side holder 26*a* is internally fitted in the holding recessed part 24*a*, opposite end parts in the circumferential direction of the pair of arm parts 67 and 67 constituting the leaf spring 27*a* are elastically pressed against the inner circumferential surface of the large diameter part 58. Therefore, when the tip part of the worm 14 is displaced in the direction separating from the worm wheel 13 in the first direction based upon the meshing reaction force applied to the worm 14 from the meshing part between the wheel teeth 48 and the worm teeth 17, a force (elasticity) that elastically presses the tip part of the worm 14 against the side of the worm wheel 13 in the first direction is imparted to the tip part of the worm 14 by the leaf spring 27*a*.

Further, in the case of the embodiment, in the same manner as that of the first embodiment, in a state where the meshing reaction force is not applied to the worm 14 from the meshing part, dimensions of respective component members are adjusted so that the outer circumferential surface of the outer diameter side cylindrical part 34*a* of the outer diameter side holder 26*a* and the inner circumferential surface of the large diameter part 58 of the holding recessed part 24*a* abut on each other at a portion (a lower end part in FIGS. 15 and 16) where the phase in the circumferential direction coincides with the meshing part.

The torsion coil spring 28 is formed by bending and molding a metal wire, and includes the coil part 46 and the pair of arm parts 47*a* and 47*b*. The inner diameter side cylindrical part 36*a* of the outer diameter side holder 26*a* is inserted through the coil part 46. Further, in the embodiment, the inner diameter of the coil part 46 in a free state where the torsion coil spring 28 does not apply the elasticity is smaller than the outer diameter of the pair of eave parts 65 and 65. One arm part 47*a* of the pair of arm parts 47*a* and 47*b* is pressed against one side surface in the circumferential direction of the displacement side pin part 33*a* of the inner diameter side holder 25*a*, and the other arm part 47*b* is pressed against the other side surface in the circumferential direction of the stationary side pin part 64 of the outer diameter side holder 26*a*. In this state, the coil part 46 is engaged (is opposite to) with the pair of eave parts 65 and 65, and the pair of arm parts 47*a* and 47*b* are engaged with the protruding part 70*a* of the displacement side pin part 33*a* and the protruding part 70*b* of the stationary side pin part 64. Accordingly, the torsion coil spring 28 is prevented from coming out from the inner diameter side cylindrical part 36*a*. When the displacement side pin part 33*a* is elastically pressed against the other circumferential direction by one arm part 47*a*, the inner diameter side holder 25*a* is elastically urged against the outer diameter side holder 26*a* in a direction of rotating in the other circumferential direction. An elastic force in the direction of rotating the inner diameter side holder 25*a* in the other circumferential direction with respect to the outer diameter side holder 26*a* is converted into a force which elastically presses the inner diameter side holder 25*a* and the tip part of the worm 14 against the side of the worm wheel 13 in the first direction by the engagement between the inner diameter side cam part 31 of the inner diameter side holder 25*a* and the outer diameter side cam part 39 of the outer diameter side holder 26*a*.

Further, when assembling the worm reduction gear of the embodiment, the inner diameter side holder 25*a* is internally fitted and held in the outer diameter side holder 26*a*, and the coil part 46 of the torsion coil spring 28 is inserted into the inner diameter side cylindrical part 36*a* of the outer diameter side holder 26*a*, and further, the pair of arm parts 47*a* and 47*b* are pressed against the displacement side pin part 33 of the inner diameter side holder 25*a* and the stationary side pin part 64 of the outer diameter side holder 26*a*. Additionally, the base part 66 of the leaf spring 27*a* is inserted into the slit 63 of the outer diameter side holder 26*a*, and the leaf spring 27*a* is supported in the outer diameter side holder 26*a*. Accordingly, a subassembly unit is assembled between the holding recessed part 24*a* and the rolling bearing part 18*c* on the tip side in a state where the inner diameter side holder 25*a*, the outer diameter side holder 26*a*, the leaf spring 27*a*, and the torsion coil spring 28*a* are inseparably combined with each other as the subassembly unit. Further, in the embodiment, an opening part on one side in the axial direction of the holding recessed part 24*a* is closed by a disk-shaped cover 68.

In the worm reduction gear of the embodiment, the torsion coil spring 28 is also capable of converting a force which elastically urges the inner diameter side holder 25*a* against the outer diameter side holder 26*a* in a direction of rotating in the other circumferential direction into a force which elastically urges the inner diameter side holder 25*a* and the tip part of the worm 14 towards the side of the worm wheel 13 in the first direction. Therefore, it is possible to more effectively prevent the generation of the teeth striking sound at the meshing part.

In the embodiment, the leaf spring 27*a* for imparting the elasticity in a direction toward the side of the worm wheel 13 in the first direction is provided at the outer diameter side holder 26*a*, and the tip part of the worm 14. Accordingly, during the operation of the worm reduction gear, the meshing state between the wheel teeth 48 and the worm teeth 17 is desirably maintained regardless of the meshing reaction force applied from the worm 14. Further, the gap existing at the portion positioned at the end part on the side far from the meshing part between the wheel teeth 48 and the worm teeth 17 in the first direction is maintained over a long period of time between the outer circumferential surface of the outer diameter side cylindrical part 34a of the outer diameter side holder 26a and the inner circumferential surface of the large diameter part 58 of the holding recessed part 24a.

Further, in the embodiment, the torsion coil spring 28a is installed at the portion on the side of the worm wheel 13 (the portion on the other side in the axial direction) out of the opposite side portions in the axial direction of the rolling bearing 18c on the tip side. Therefore, the dimension in the axial direction of the worm housing part 16a of the housing 12b is suppressed to be small, whereby a size and a weight of the worm reduction gear are easily reduced.

Further, since the sub-assembly unit in which the inner diameter side holder 25a, the outer diameter side holder 26a, the leaf spring 27a, and the torsion coil spring 28a are inseparably combined with each other can be implemented, it is possible to easily perform the assembly work of the worm reduction gear.

The configuration and action of other portions are same as those of the first embodiment.

Third Embodiment

Figure 22:
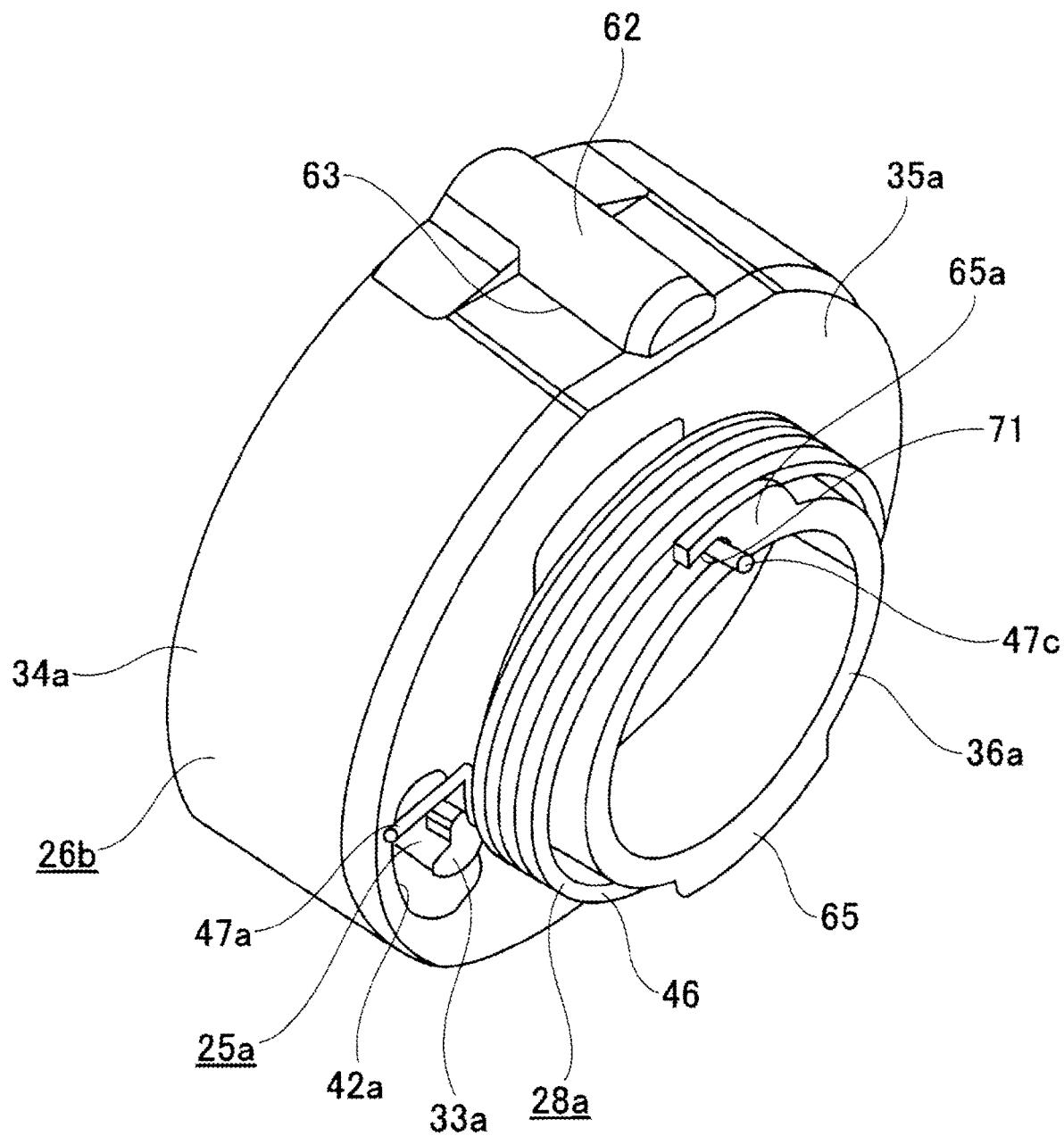
FIG. 22 is a perspective diagram illustrating an inner diameter side holder, an outer diameter side holder, and a torsion coil spring, all of which are taken out, according to a third embodiment of the present invention.
Figure 23:
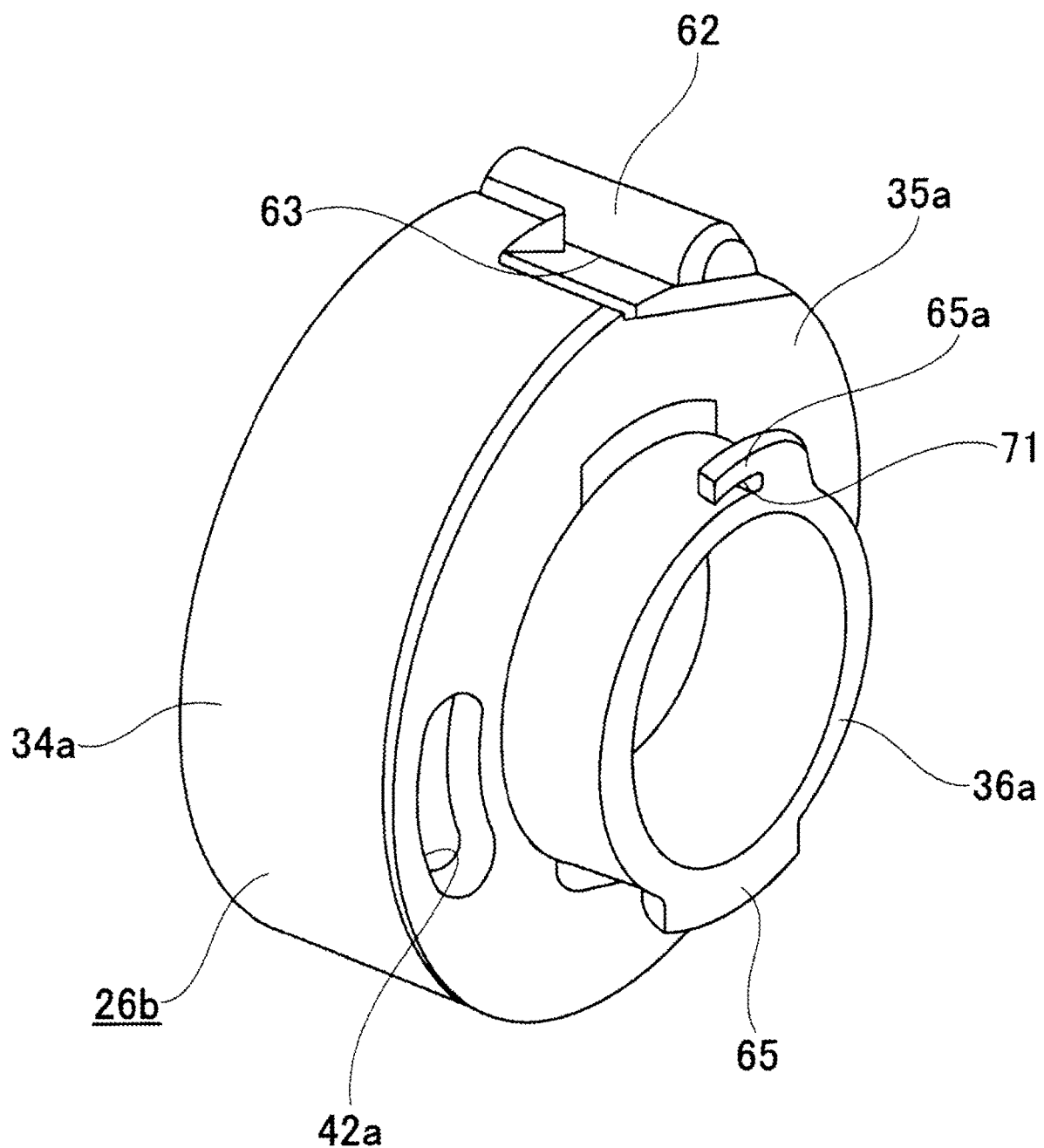
FIG. 23 is a perspective diagram illustrating the outer diameter side holder taken out.
Figure 24:
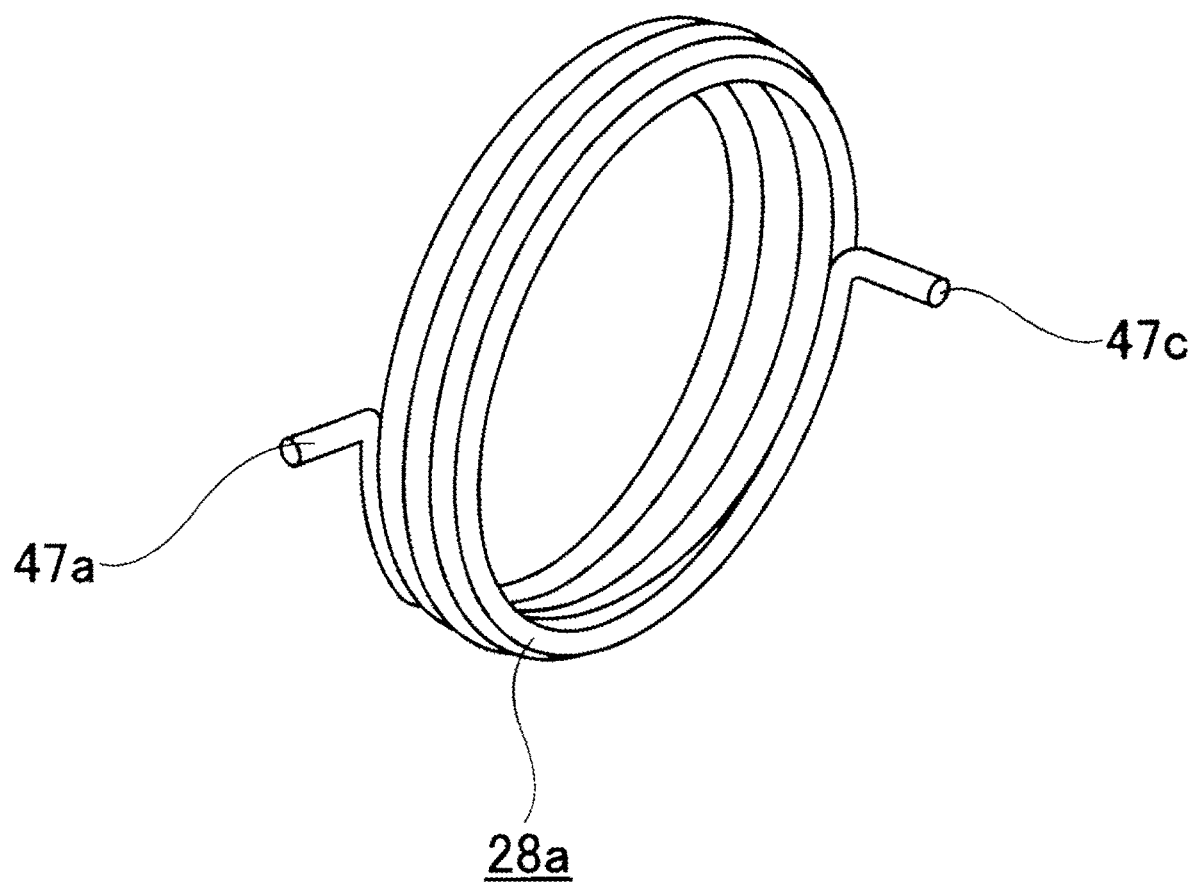
FIG. 24 is a perspective diagram illustrating the torsion coil spring taken out.
Figure 25:
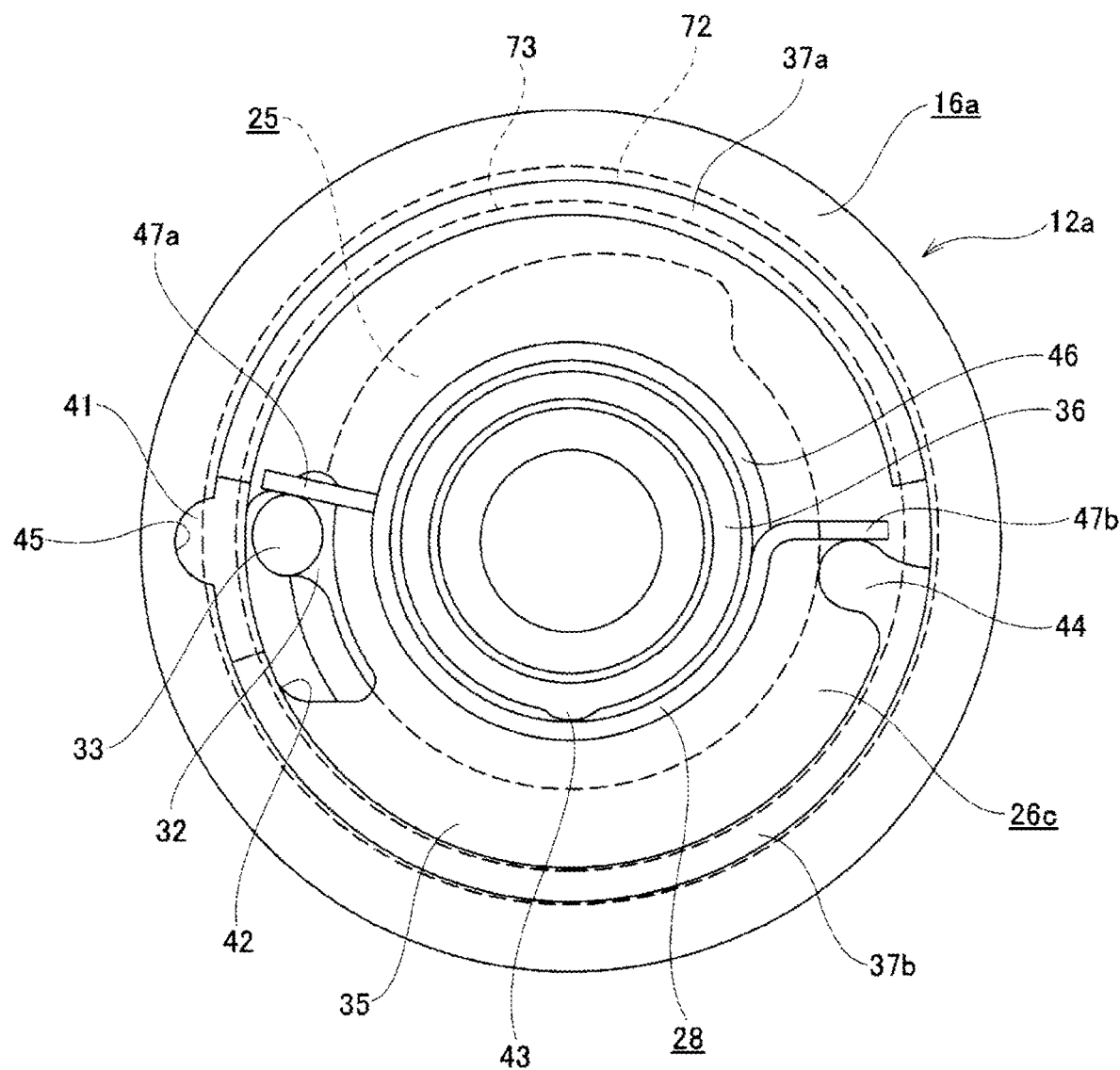
FIG. 25 is an end surface diagram illustrating a worm reduction gear according to a fourth embodiment of the present invention.
Figure 26:
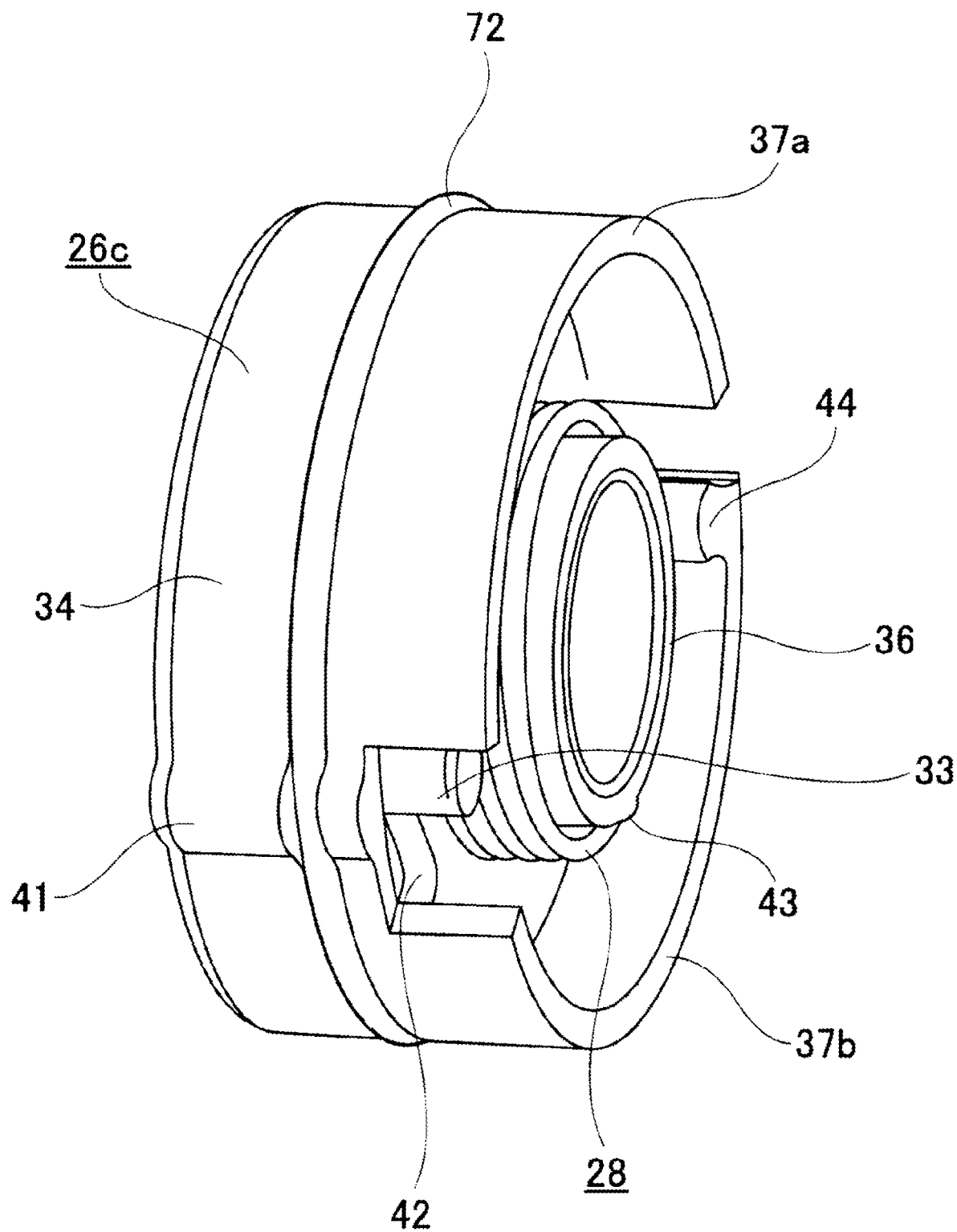
FIG. 26 is a perspective diagram illustrating an inner diameter side holder, an outer diameter side holder, a torsion coil spring, and an O-ring, all of which are taken out.
Figure 27:
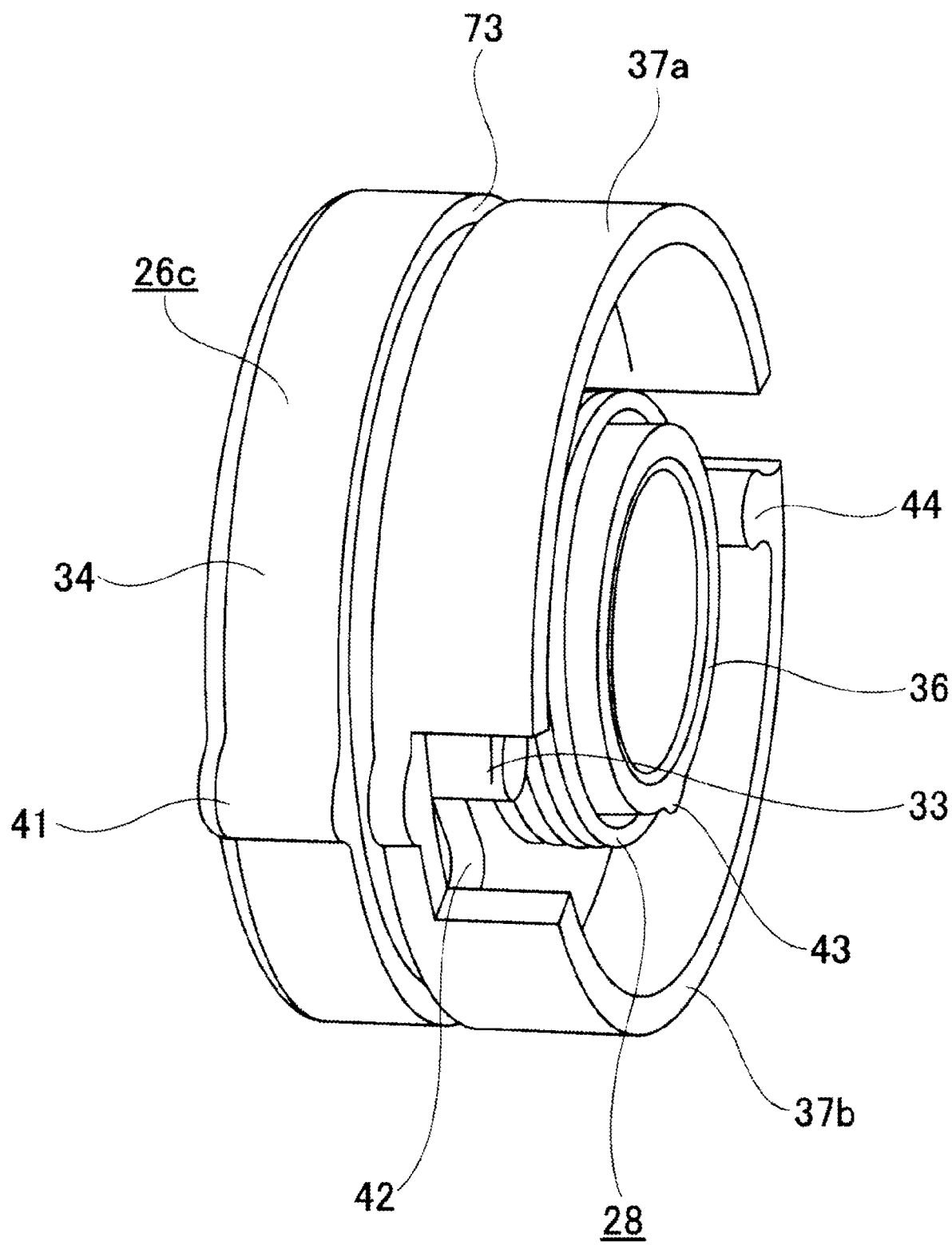
FIG. 27 is a perspective diagram illustrating the inner diameter side holder, the outer diameter side holder, and the torsion coil spring, all of which are taken out.
Figure 28:
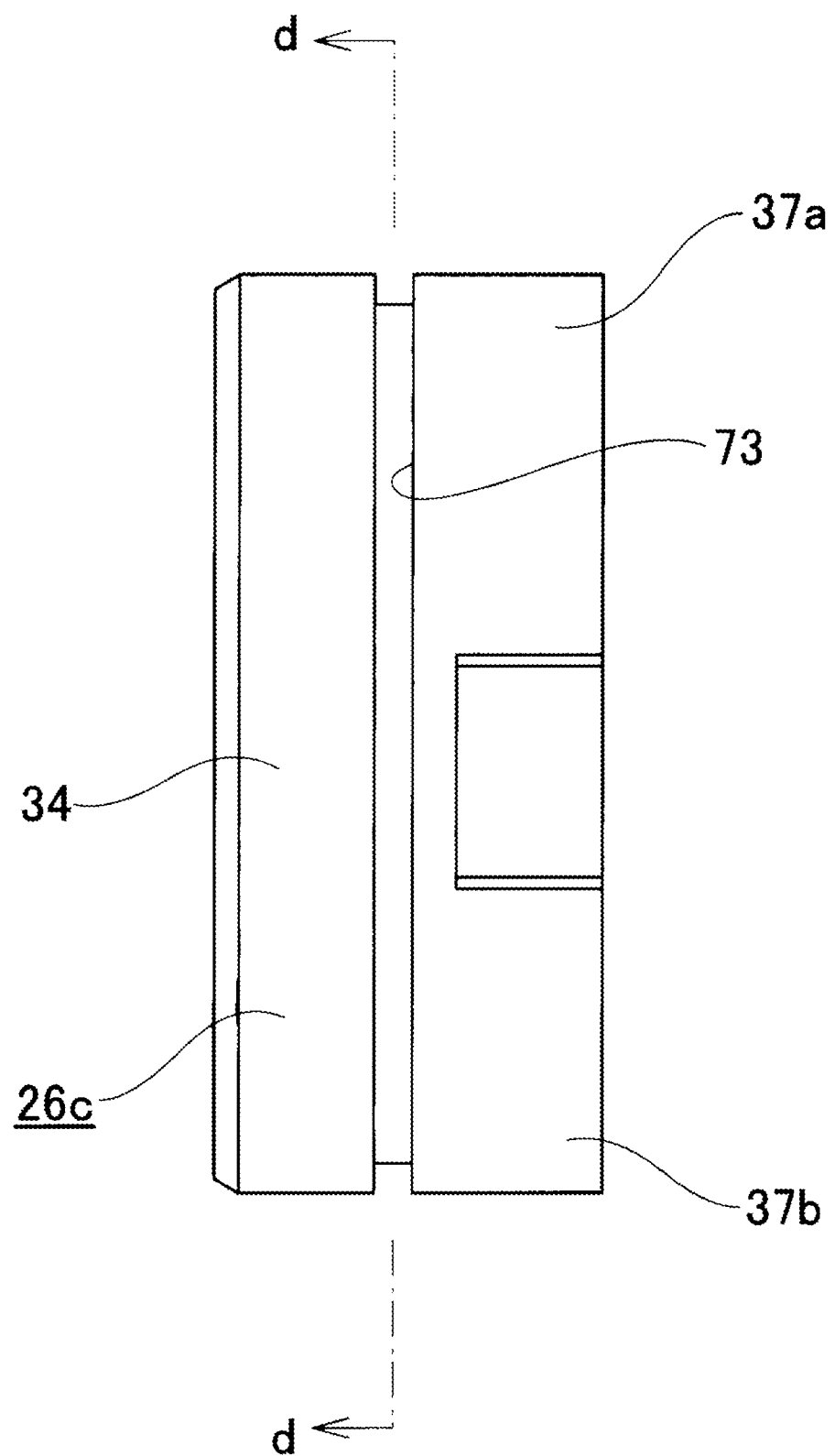
FIG. 28 is a side surface diagram illustrating the outer diameter side holder.

A third embodiment will be described with reference to FIGS. 22 to 24. In the worm reduction gear of the embodiment, a locking notch part 71 is provided at the other side edge in the circumferential direction of the eave part 65a on the side far from the meshing part between the worm teeth 17 and the wheel teeth 48 out of the pair of eave parts 65 and 65a constituting the outer diameter side holder 26b. Further, the other arm part 47c constituting the torsion coil spring 28a is provided in a state of being elongated in the axial direction. In the worm reduction gear of the embodiment, one arm part 47a of the torsion coil spring 28a is pressed against one side surface in the circumferential direction of the displacement side pin part 33a of the inner diameter side holder 25a, and the other arm part 47c is locked to the locking notch part 71. Thus, the inner diameter side holder 25a is urged against the outer diameter side holder 26b in the direction of rotating in the other circumferential direction.

The configuration and action of other portions are same as those of the first and second embodiments.

Fourth Embodiment

A fourth embodiment of the present invention will be described with reference to FIGS. 25 to 29B. According to the embodiment, in the outer diameter side holder 26c, an O-ring 72 constituted of an elastic material such as rubber is used as the elasticity imparting member in the diameter direction which imparts the elasticity in a direction toward the side of the worm wheel 13 in the first direction orthogonal to the center axis of the worm wheel 13 and the center axis of the worm 14. Specifically, the O-ring 72 is locked to a locking groove 73 provided over the whole periphery on the outer circumferential surface of the outer diameter side holder 26c.

Figure 29A:
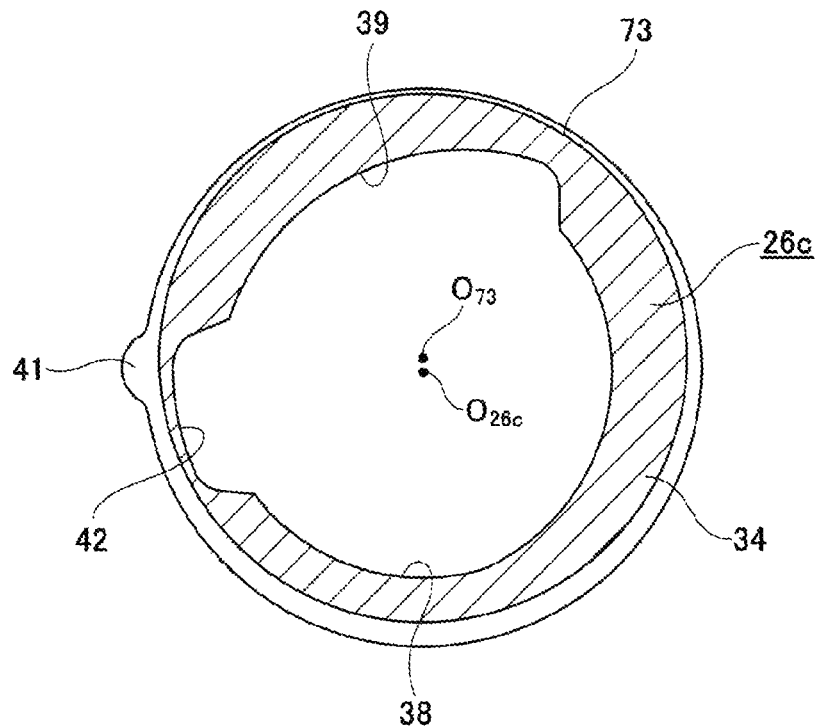
FIGS. 29A and 29B are diagrams illustrating two examples of a cross-sectional shape taken along the line d-d of FIG. 28.
Figure 29B:
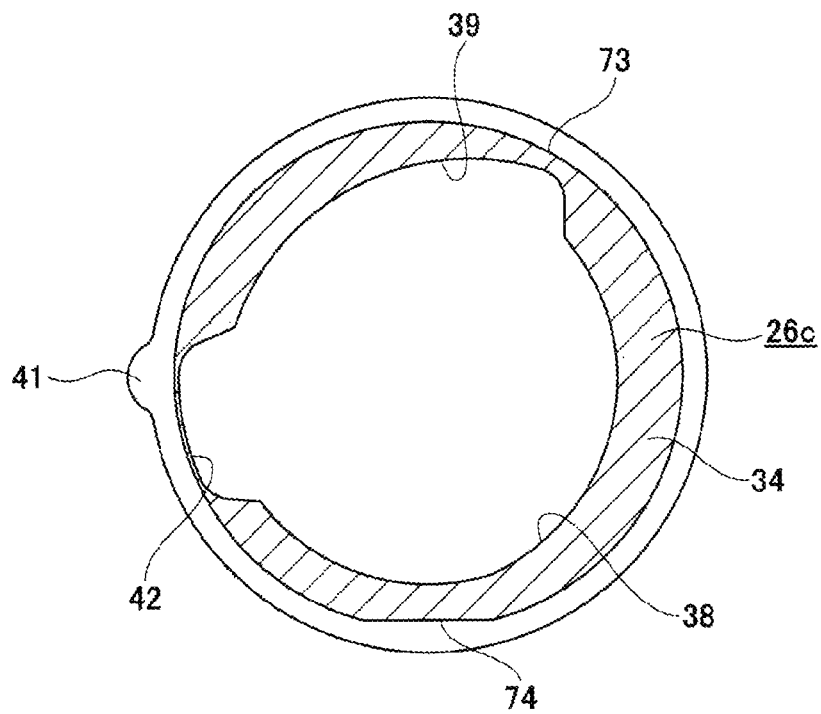

In the embodiment, as illustrated in FIG. 29A, a center axis $O_{73}$ of the locking groove 73 is offset to the side far from the meshing part in the first direction with respect to a center axis $O_{26c}$ of the outer circumferential surface of the outer diameter side holder 26c. Accordingly, on the O-ring 72 locked in the locking groove 73, a crushing margin is secured at the end part on the side far from the meshing part in the first direction. However, as illustrated in FIG. 29B, a flat surface part 74 is provided at the end part on the side close to the meshing part in the first direction of the locking groove 73, such that it is possible to secure the crushing margin at the end part on the side far from the meshing part in the first direction of the O-ring 72. Alternatively, a shape of the locking groove 73 viewed from the axial direction is designed as a non-circular shape such as an elliptical shape, such that the crushing margin may be secured at the end part on the side far from the meshing part in the first direction of the O-ring 72.

In any case, in the embodiment, based upon the meshing reaction force applied to the worm 14 from the meshing part between the worm teeth 17 and the wheel teeth 48, when the tip part of the worm 14 is displaced in the direction separating from the worm wheel 13 in the first direction, the end part on the side far from the meshing part in the first direction of the O-ring 72 is elastically crushed, and the force elastically pressing the tip part of the worm 14 towards the side of the worm wheel 13 in the first direction is imparted to the tip part of the worm 14 by a reaction force accompanying by the crushing.

The configuration and action of other portions are same as those of the first embodiment.

Fifth Embodiment

A fifth embodiment of the present invention will be described with reference to FIGS. 30A to 34. In the worm reduction gear of the embodiment, in an outer diameter side holder 26d, the eave parts 65, 65, and 65a are provided at three positions equally disposed in the circumferential direction at the other end edge in the axial direction of the inner diameter side cylindrical part 36a. Further, the locking notch part 71 is provided at one eave part 65a. Further, in the side plate part 35a of the outer diameter side holder 26d, a slit 85 penetrating in the axial direction is provided at a portion approximately opposite to the locking notch part 71 in the diameter direction. That is, the slit 85 is provided at the portion adjacent to the other side in the circumferential direction of the outer diameter side cam part (an outer diameter side curved surface part) 39.

In the inner diameter side holder 25b, a locking groove 86 is formed at a portion of the inner circumferential surface adjacent to the other side in the circumferential direction of the inner diameter side cam part 31. The locking groove 86 is formed so that when the inner diameter side holder 25b is held in the outer diameter side holder 26d, the other side end surface in the circumferential direction faces the slit 85.

Further, in the inner diameter side holder 25b, slits 87a and 87b in the axial direction extending from an end surface in the axial direction toward the axial direction are formed over the whole diameter direction. Accordingly, it is possible to mitigate stress when the bearing 18c is press-fitted into the inner diameter side holder 25b. Further, in the embodiment, the slits 87a and 87b in the axial direction are respectively formed in the axial direction from opposite end surfaces in the axial direction.

Further, in the torsion coil spring 28b of the embodiment, one arm part 47d is provided in a state of being elongated in the axial direction, and the other arm part 47c is provided in a state of being elongated in the axial direction on the side opposite to one arm part 47d.

One arm part 47d penetrates the slit 85 of the outer diameter side holder 26d and is pressed against the end surface on the other side in the circumferential direction of the locking groove 86 of the inner diameter side holder 25b, and the other arm part 47c is locked to the locking notch part 71. Accordingly, the inner diameter side holder 25b is urged against the outer diameter side holder 26d in a direction of rotating in the other circumferential direction.

Further, pin insertion grooves 88a and 88b are formed at positions opposite to each other on the side of the worm wheel 13 rather than the center axis $O_{14}$ of the worm 14 in the first direction on the inner circumferential surface of the outer diameter side holder 26d and the outer circumferential surface of the inner diameter side holder 25b. Accordingly, the inner diameter side holder 25b and the outer diameter side holder 26d are phase-determined by inserting the pin 89 into the pin insertion grooves 88a and 88b. Accordingly, the inner diameter side holder 25b and the outer diameter side holder 26d are temporarily performed to be positioned in the up-and-down direction and to be phase-determined in the rotational direction at two abutting parts between the inner circumferential surface of the outer diameter side holder 26d and the outer circumferential surface of the inner diameter side holder 25b, and a portion into which the pin 89 is inserted. In this state, the bearing 18c, the inner diameter side holder 25b, and the outer diameter side holder 26d can be easily mounted on the housing, whereby the assembly of the worm 14 can be easily performed. Further, when the pin 89 is removed from the pin insertion grooves 88a and 88b after assembling the worm 14, the inner diameter side holder 25b rotates, and the worm 14 is urged.

Further, in the embodiment, the pin 89 is used for relatively positioning the outer diameter side holder 26d and the inner diameter side holder 25b as a positioning member, and the pin insertion grooves 88a and 88b are provided on the inner circumferential surface of the outer diameter side holder 26d and the outer circumferential surface of the inner diameter side holder 25b, however, the positioning member is not limited to the pin. Further, an engagement portion into which the positioning member can be inserted is not limited thereto. For example, an engagement protruding pan may be formed on the inner circumferential surface of the outer diameter side holder 26d and the outer circumferential surface of the inner diameter side holder 25b as a portion into which the positioning member can be inserted into.

Further, in the embodiment, the pin insertion grooves 88a and 88b are provided at the outer diameter side holder 26d and the inner diameter side holder 25b as a positioning means for relatively positioning the outer diameter side holder 26d and the inner diameter side holder 25b, however, the present invention is not limited thereto, and a protruding part may be used therefor.

Further, in the embodiment, the outer diameter side cam part 39 and the inner circumferential surface 81 of the holder holding part 38 are constituted of a single partial cylindrical surface, and the inner diameter side part 31 and the part 80 near one end in the circumferential direction are constituted of a compound curved surface where the plurality of curved surfaces having different radii of curvature from each other are smoothly continued.

Additionally, that is, in the same manner as that of the first embodiment, even when the inner diameter side holder 25b rotates in the circumferential direction, respective phases of an abutting part between the inner diameter side cam part 31 and the outer diameter side cam part 39, and the other abutting pan between the portion 80 near one end in the circumferential direction of the inner diameter side holder 25 and the inner circumferential surface 81 of the holder holding part 38 are almost not changed. Also, in this case, the inner diameter side holder 25b and the rolling bearing 18c held in the inner diameter side holder 25b are not substantially moved in the left-and-right direction in FIG. 32, but are displaced downward, that is, displaced only toward the side of the worm wheel 13 in the first direction D1.

Further, the recessed groove 90 for the leaf spring is formed on the flat surface part 61 formed on the outer circumferential surface of the outer diameter side cylindrical part 34a of the outer diameter side holder 26d. In the leaf spring 27b, the protruding part 91 which is engaged with the recessed groove 90 for the leaf spring is formed at the base part 66 having a flat plate shape, and the recessed groove 90 for the leaf spring and the protruding part 91 are engaged with each other, whereby the leaf spring 27b is determined to be positioned more reliably with respect to the outer diameter side holder 26d.

Further, in the leaf spring 27b, an inwardly directed piece 92 bent from one end part in the axial direction to the inner diameter side is provided at opposite end parts in the circumferential direction of the pair of arm parts 67 and 67. When the leaf spring 27b is supported with respect to the outer diameter side holder 26d, the inwardly directed piece 92 is disposed to be opposite to the side plate part 35a, thereby being positioned in the axial direction.

Figure 34:
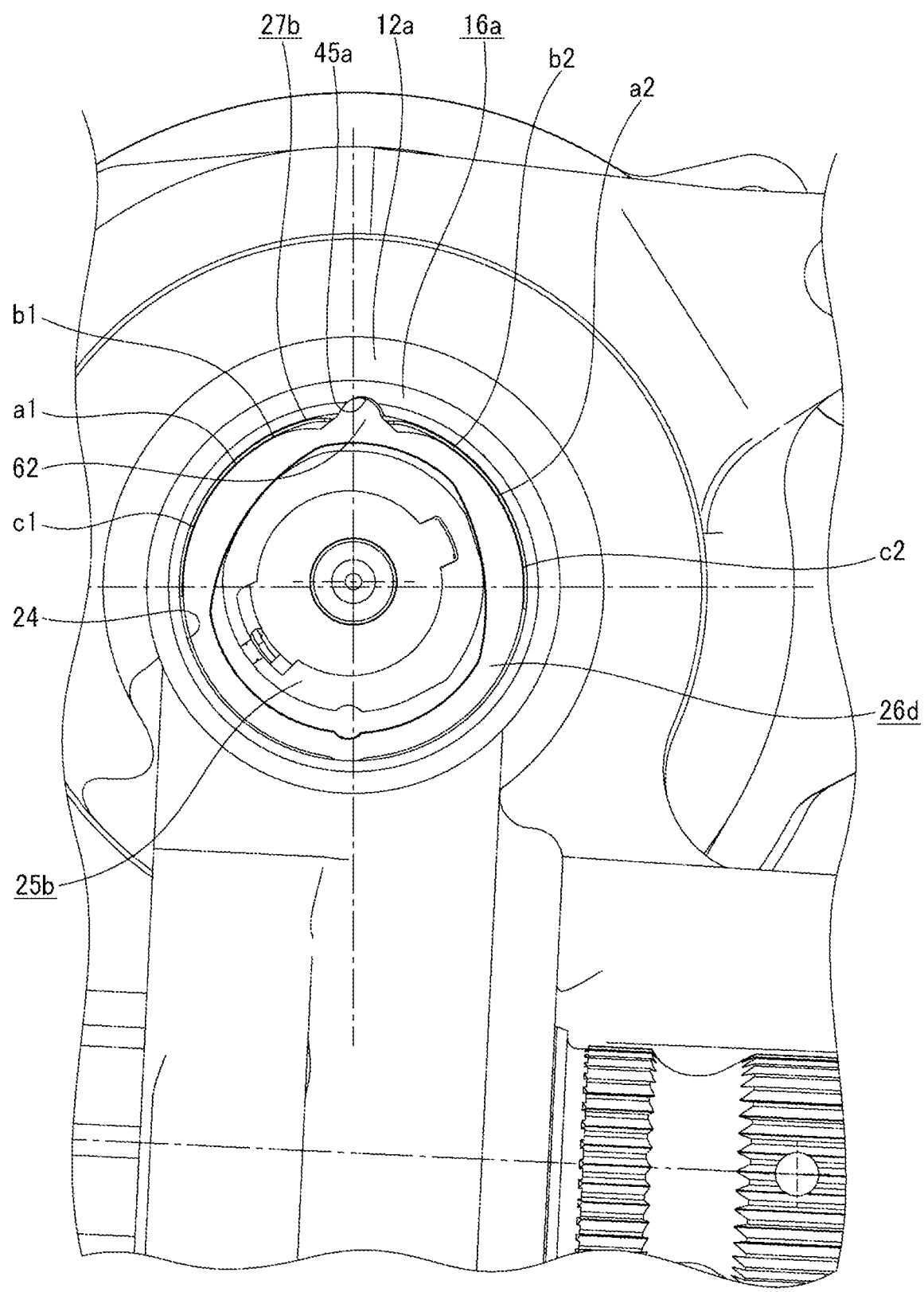
FIG. 34 is the end surface diagram of the worm reduction gear illustrating a state in which the outer diameter side holder is held in a housing.
Figure 35A:
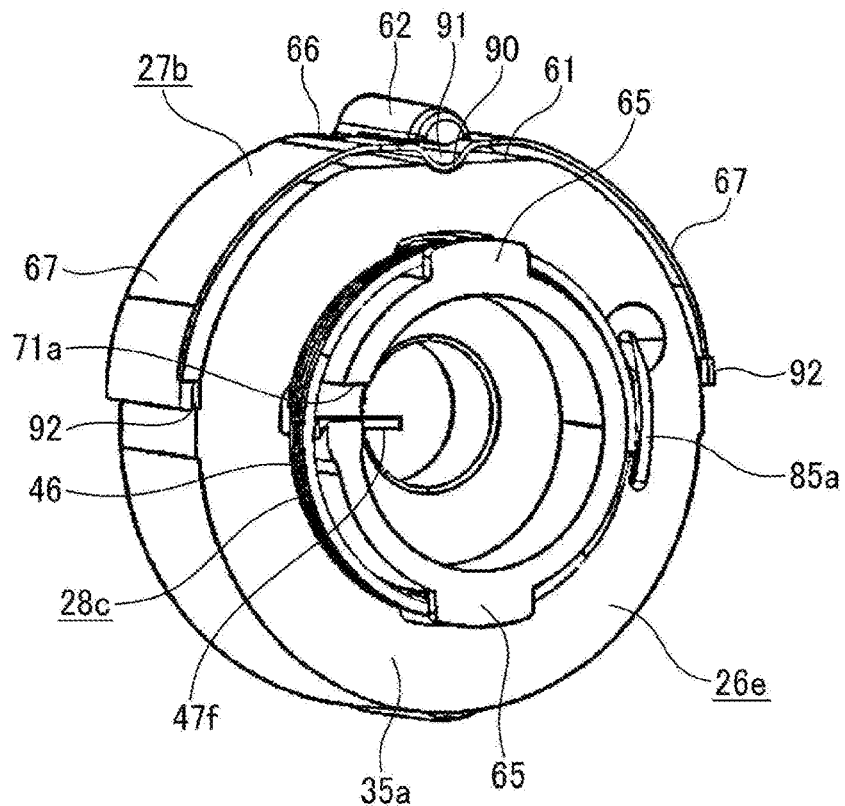
FIG. 35A is a perspective diagram illustrating an outer diameter side holder on which a leaf spring and a torsion coil spring are mounted in a worm reduction gear according to a sixth embodiment of the present invention.
Figure 35B:
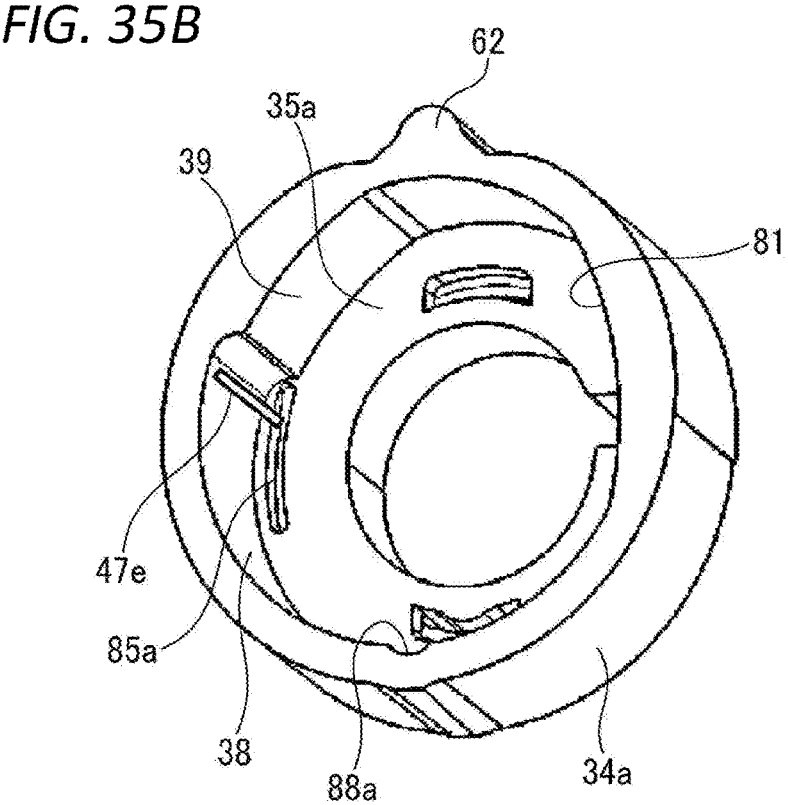
FIG. 35B is a perspective diagram of the outer diameter side holder when viewed from an opposite side to FIG. 35A in an axial direction.
Figure 36:
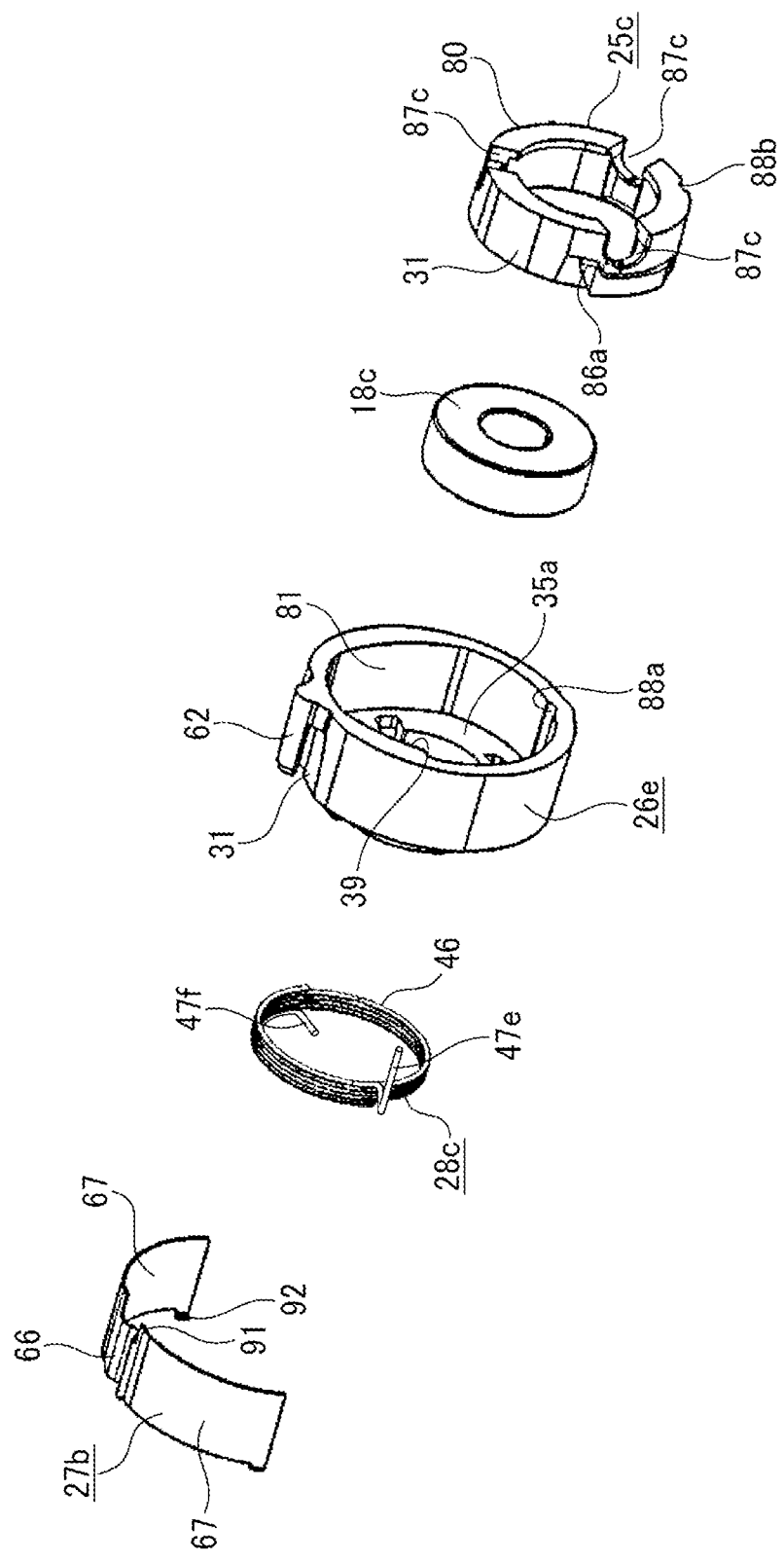
FIG. 36 is an enlarged perspective diagram of main parts illustrating a state in which members constituting the worm reduction gear according to the sixth embodiment of the present invention are respectively disassembled.
Figure 37:
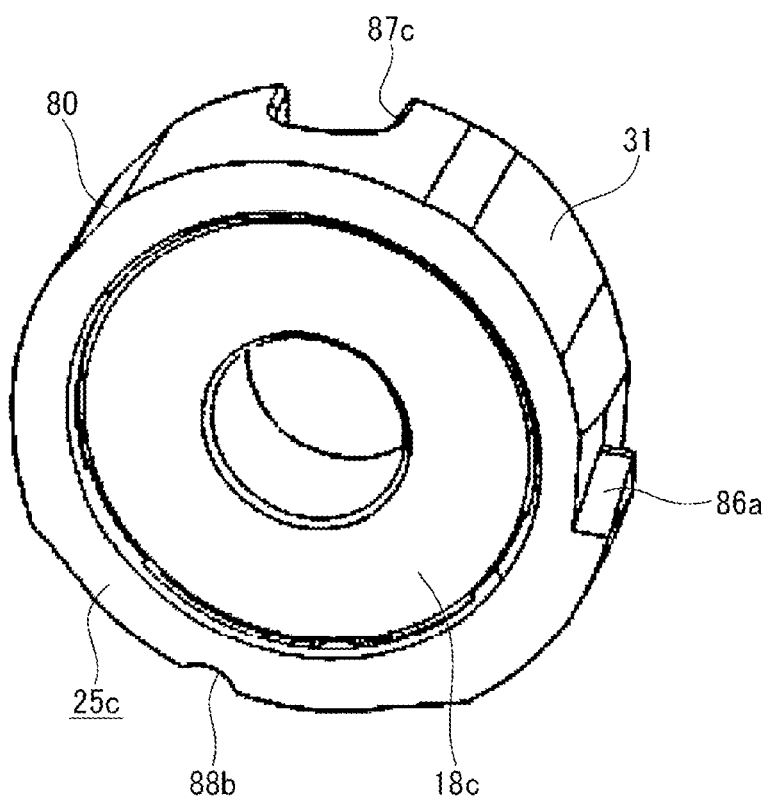
FIG. 37 is a perspective diagram illustrating an inner diameter side holder together with a bearing.
Figure 38:
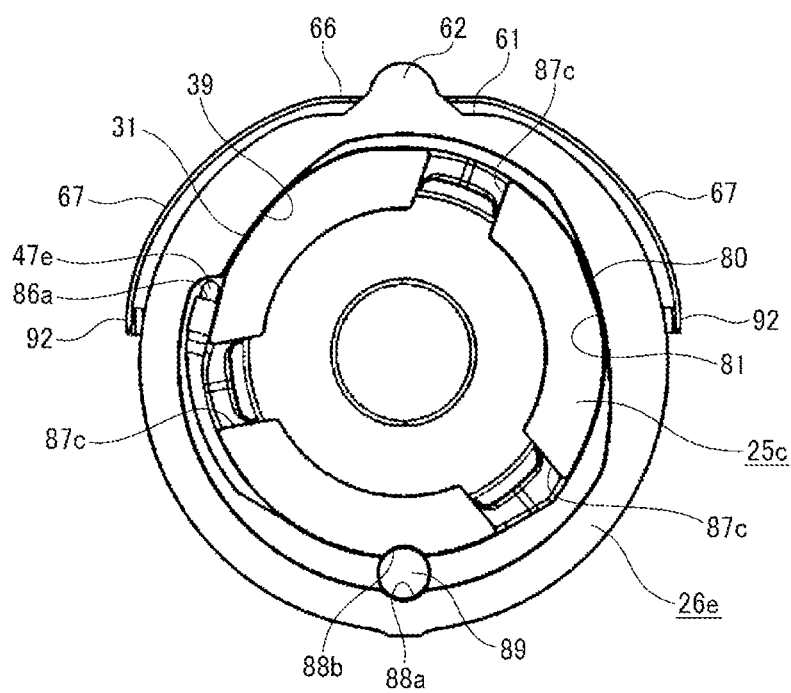
FIG. 38 is an end surface diagram of the worm reduction gear illustrating a state in which a pin is inserted into a groove of the inner diameter side holder and a groove of the outer diameter side holder.
Figure 39:
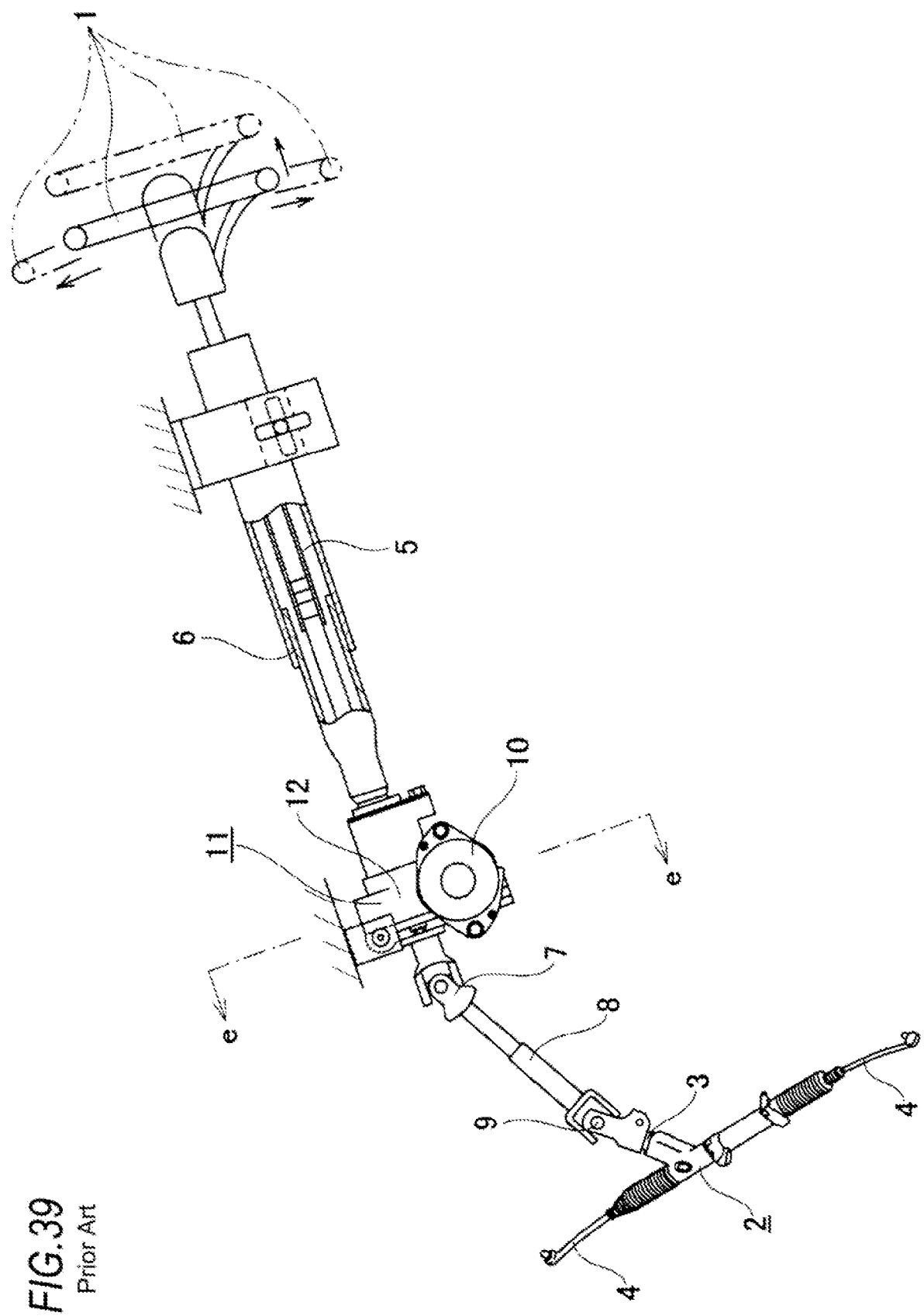
FIG. 39 is a partially cutting side surface diagram illustrating one example of a steering apparatus of a structure of a related art.

Additionally, as illustrated in FIG. 34, in a state where the outer diameter side holder 26d is assembled to the holding recessed part 24 of the housing 12a, the arm parts 67 and 67 of the leaf spring 27b come into contact with the holding recessed pan 24 of the housing 12a at contact positions a1 and a2, and respectively come into contact with the outer diameter side holder 26 and two positions b1, b2, c1, and c2 at opposite sides in the circumferential direction of the contact positions a1 and a2 with the holding recessed parts 24.

Further, the pressing pin part 62 of the outer diameter side holder 26d and the engagement recessed part 45a of the large diameter part 58 are loosely engaged with each other with a gap so that the outer diameter side holder 26d can be displaced to the side far from the meshing part in the first direction.

The configuration and action of other portions are same as those of the first and second embodiments.

Sixth Embodiment

A sixth embodiment of the present invention will be described with reference to FIGS. 35A to 38. In the worm reduction gear of the embodiment, a locking notch part 71a, the other end edge in the axial direction of which is recessed in the axial direction, is provided at a different position in the circumferential direction with respect to the pair of eave parts 65 and 65 provided at the other end edge in the axial direction of the inner diameter side cylindrical part 36a of an outer diameter side holder 26e. Further, in the side plate part 35a of the outer diameter side holder 26e, a slit 85a penetrating in the axial direction is provided at a portion approximately opposite to the locking notch part 71a in the diameter direction.

In the inner diameter side holder 25c, a locking groove 86a is formed at a portion of the outer circumferential surface adjacent to the other side in the circumferential direction of the inner diameter side cam part 31. When the inner diameter side holder 25c is held in the outer diameter side holder 26e, the locking groove 86a is formed so that the other side end surface in the circumferential direction faces the slit 85.

Further, in the inner diameter side holder 25c, a slit 87c in the axial direction extending from one end surface in the axial direction toward the axial direction are formed at three positions over the whole diameter direction. Accordingly, it is possible to mitigate stress when the bearing 18c is press-fitted into the inner diameter side holder 25c.

Further, in the torsion coil spring 28c of the embodiment, one arm part 47e is provided in a state of being elongated in the axial direction after being elongated outwards in the diameter direction, and the other arm part 47f is provided in a state of being elongated inwards in the diameter direction.

One arm part 47a penetrates the slit 80 of the outer diameter side holder 26d and is pressed against the end surface on the other side in the circumferential direction of the locking groove 81a of the inner diameter side holder 25c, and the other arm part 47c is locked to the locking notch part 71a. Accordingly, the inner diameter side holder 25c is urged against the outer diameter side holder 26d in a direction of rotating in the other circumferential direction.

The configuration and action of other portions are same as those of the first, second, and fifth embodiments.

This application is based upon Japanese Patent Application No. 2016-141370, filed on Jul. 19, 2016, Japanese Patent Application No. 2016-158373, filed on Aug. 12, 2016, and Japanese Patent Application No. 2017-092969, filed on May 9, 2017, the entire contents of which are incorporated herein by reference.

DESCRIPTION OF REFERENCE NUMERALS AND SIGNS

1: steering wheel
2: steering gear unit
3: input shaft
4: tie rod
5: steering shaft
6: steering column
7: universal joint
8: intermediate shaft
9: universal joint
10: electric motor
11: worm reduction gear
12, 12a, 12b: housing
13: worm wheel
14: worm
15: wheel housing part
16, 16a, 16b: worm housing part
17: worm teeth
18a~18c: rolling bearing
19: holder
20: large diameter part
21: bush
22: preload pad
23: torsion coil spring
24: holding recessed part
25, 25a, 25b, 25c: inner diameter side holder
26, 26a, 26b, 26c, 26d, 26e: outer diameter side holder
27, 27a, 27b: leaf spring
28, 28a, 28b, 28c: torsion coil spring
29, 29a: holder main body
30: bearing holding part
31: inner diameter side cam part
32: protruding part
33, 33a: displacement side pin pan
34, 34a: outer diameter side cylindrical part
35, 35a: side plate part
36, 36a: inner diameter side cylindrical part
37a, 37b: one protruding piece part
38, 38a: holder holding pan
39: outer diameter side cam part
40: recessed part
41: engagement protruding pan
42: through hole
43: positioning protruding part
44: pedestal part
45: engagement recessed part
46: coil part
47a, 47b, 47c, 47d, 47e, 47f: arm part
48: wheel teeth
49: bearing fitting part
50: housing side step part
51: outer ring
52: retaining ring
53: small diameter part
54: worm side step part
55: elastic body
56: nut
57: inner ring
58: large diameter part
59: small diameter part
60a, 60b: recessed part
61: flat surface part
62: pressing pin part
63: slit
64: stationary side pin part
65, 65a: eave part
66: base part
67: arm part
68: cover
69: notch part
70a, 70b: protruding part
71: locking notch part
72: O-ring
73: locking groove
74: flat surface part

The invention claimed is:
1. A worm reduction gear, comprising:
a housing including a holding recessed part on an inner circumferential surface;
a worm wheel including wheel teeth on an outer circumferential surface;
a worm including worm teeth meshed with the wheel teeth on an outer circumferential surface;
a bearing externally fitted to a tip part of the worm;
an inner diameter side holder including a bearing holding part in which the bearing is internally fitted and held; and an inner diameter side curved surface part, an outer diameter of which becomes larger as moving toward one circumferential direction, the inner diameter holder being provided at a portion positioned at a side far from a meshing part between the wheel teeth and the worm teeth in a direction orthogonal to a center axis of the worm wheel and a center axis of the worm among outer circumferential surfaces thereof;
an outer diameter side holder internally fitted and held in the holding recessed part, including a holder holding part in which the inner diameter side holder is internally fitted and held so as to be able to be relatively rotated and moved and to be displaced in the direction orthogonal to the center axis of the worm wheel and the center axis of the worm; and an outer diameter side curved surface part which is provided at a portion facing the inner diameter side curved surface part among inner circumferential surfaces of the holder holding part, and which comes into contact with the inner diameter side curved surface part when the inner diameter side holder rotates in a circumferential direction with respect to the holder holding part; and
an elastic urging member in the circumferential direction elastically urging the inner diameter side holder against the outer diameter side holder in a direction of rotating in the other circumferential direction; wherein
the inner circumferential surface of the holder holding part and the outer circumferential surface of the inner diameter side holder includes an abutting part between the inner diameter side curved surface part and the outer diameter side curved surface; and another abutting part provided on a side opposite to the abutting part at a side far from the meshing part between the wheel teeth and the worm teeth and with respect to a surface P passing through the center axis of the worm wheel and the center axis of the worm, and
the abutting part and the other abutting part are provided so that when the worm wheel rotates in both directions a direction of a meshing reaction force applied to the worm from the meshing part is positioned in a region of an inferior angle formed by two lines connected to the center axis of the worm.

2. The worm reduction gear according to claim 1, wherein the elastic urging member in the circumferential direction is a torsion coil spring bridged between the inner diameter side holder and the outer diameter side holder.

3. The worm reduction gear according to claim 1, wherein the elastic urging member in the circumferential direction is installed on a worm wheel side of opposite side portions in the axial direction of the bearing.

4. The worm reduction gear according to claim 1, wherein a positioning means for relatively positioning the outer diameter side holder and the inner diameter side holder is provided in the outer diameter side holder and the inner diameter side holder.

5. A worm reduction gear, comprising:
a housing including a holding recessed part on an inner circumferential surface;
a worm wheel including wheel teeth on an outer circumferential surface;
a worm including worm teeth meshed with the wheel teeth on an outer circumferential surface;
a bearing externally fitted to a tip part of the worm;
an inner diameter side holder including a bearing holding part in which the bearing is internally fitted and held;
an outer diameter side holder internally fitted and held in the holding recessed part, including a holder holding part in which the inner diameter side holder is internally fitted and held so as to be able to be relatively rotated and moved and to be displaced in a direction orthogonal to a center axis of the worm wheel and a center axis of the worm; and
an elastic urging member in a circumferential direction elastically urging the inner diameter side holder against the outer diameter side holder in a direction of rotating in the circumferential direction, wherein
when the inner diameter side holder rotates in the circumferential direction with respect to the outer diameter side holder, an outer circumferential surface of the inner diameter side holder and an inner circumferential surface of the outer diameter side holder are formed so that the bearing is displaced in the direction orthogonal to the center axis of the worm wheel and the center axis of the worm; wherein
a gap in a diameter direction is provided at an end part on the side far from the meshing part in the direction orthogonal to the center axis of the worm wheel and the center axis of the worm between an outer circumferential surface of the outer diameter side holder and the inner circumferential surface of the housing in a state where the meshing reaction force is not applied to the worm from the meshing part.

6. The worm reduction gear according to claim 5, wherein an elasticity imparting member in the diameter direction which imparts elasticity in a direction toward a side of the worm wheel in the direction orthogonal to the center axis of the worm wheel and the center axis of the worm is provided in the outer diameter side holder.

7. The worm reduction gear according to claim 6, wherein the elasticity imparting member in the diameter direction is a leaf spring provided in the gap in the diameter direction.

8. The worm reduction gear according to claim 6, wherein the elasticity imparting member in the diameter direction is an O-ring locked on the outer circumferential surface of the outer diameter side holder.

9. The worm reduction gear according to claim 5, wherein a protruding part is provided on one circumferential surface of the outer circumferential surface of the outer diameter side holder and the inner circumferential surface of the housing; a recessed part is provided on the other circumferential surface; and the protruding part and the recessed part are engaged with each other.

10. A worm reduction gear, comprising:
a housing including a holding recessed part on an inner circumferential surface;
a worm wheel including wheel teeth on an outer circumferential surface;
a worm including worm teeth meshed with the wheel teeth on an outer circumferential surface;
a bearing externally fitted to a tip part of the worm;
an inner diameter side holder including a bearing holding part in which the bearing is internally fitted and held; and an inner diameter side curved surface part, an outer diameter of which becomes larger as moving toward one circumferential direction, the inner diameter side holder being provided at a portion positioned at a side far from a meshing part between the wheel teeth and the worm teeth in a direction orthogonal to a center axis of the worm wheel and a center axis of the worm among outer circumferential surfaces thereof;
an outer diameter side holder internally fitted and held in the holding recessed part, including a holder holding part in which the inner diameter side holder is internally fitted and held so as to be able to be shaken with the center axis of the worm as a center and to be displaced in the direction orthogonal to the center axis of the worm wheel and the center axis of the worm; and an outer diameter side curved surface part, which is provided at a portion facing the inner diameter side curved surface part among inner circumferential surfaces of the holder holding part an inner diameter of which becomes larger as moving toward one circumferential direction, and curvature of the inner diameter of which is smaller than curvature of the outer diameter of the inner diameter side curved surface part; and
an elastic urging member in the circumferential direction elastically urging the inner diameter side holder against the outer diameter side holder in a direction of rotating in the other circumferential direction; wherein
the inner circumferential surface of the holder holding part and the outer circumferential surface of the inner diameter side holder includes an abutting part between the inner diameter side curved surface part and the outer diameter side curved surface; and another abutting part provided on a side opposite to the abutting part at a side far from the meshing part between the wheel teeth and the worm teeth and with respect to a surface P passing through the center axis of the worm wheel and the center axis of the worm, and the abutting part and the other abutting part are provided so that when the worm wheel rotates in both directions a direction of a meshing reaction force applied to the worm from the meshing part is positioned in a region of an inferior angle formed by two lines connected to the center axis of the worm.

\* \* \* \* \*